(12) United States Patent
Ferguson et al.

(10) Patent No.: US 7,688,727 B1
(45) Date of Patent: Mar. 30, 2010

(54) FILTERING AND ROUTE LOOKUP IN A SWITCHING DEVICE

(75) Inventors: Dennis C. Ferguson, Palo Alto, CA (US); Rajiv Patel, Los Altos, CA (US); Gerald Cheung, Palo Alto, CA (US); Pradeep Sindhu, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 658 days.

(21) Appl. No.: 11/614,583

(22) Filed: Dec. 21, 2006

Related U.S. Application Data

(63) Continuation of application No. 10/017,719, filed on Dec. 14, 2001, now Pat. No. 7,215,637.

(51) Int. Cl.
*H04L 12/26* (2006.01)
(52) U.S. Cl. .................................. 370/230.1
(58) Field of Classification Search .......... None
See application file for complete search history.

(56) References Cited

U.S. PATENT DOCUMENTS

| | | | |
|---|---|---|---|
| 4,916,655 | A | 4/1990 | Ohsone et al. |
| 5,774,739 | A | 6/1998 | Angle et al. |
| 5,905,725 | A | 5/1999 | Sindhu et al. |
| 5,917,821 | A | 6/1999 | Gobuyan et al. |
| 5,940,597 | A | 8/1999 | Chung |
| 5,951,649 | A | 9/1999 | Dobbins et al. |
| 5,951,651 | A | 9/1999 | Lakshman et al. |
| 6,009,475 | A | 12/1999 | Shrader |
| 6,115,802 | A | 9/2000 | Tock et al. |
| 6,226,687 | B1 | 5/2001 | Harriman et al. |
| 6,253,321 | B1 | 6/2001 | Nikander et al. |
| 6,308,218 | B1 | 10/2001 | Vasa |
| 6,349,338 | B1 | 2/2002 | Seamons et al. |
| 6,359,879 | B1 | 3/2002 | Carvey et al. |
| 6,424,659 | B2 | 7/2002 | Viswanadham et al. |
| 6,567,379 | B1 | 5/2003 | Walker et al. |
| 6,580,712 | B1 | 6/2003 | Jennings et al. |
| 6,598,034 | B1 | 7/2003 | Kloth |
| 6,704,290 | B1 | 3/2004 | Ushirozawa |
| 6,744,776 | B1 | 6/2004 | Kalkunte et al. |

(Continued)

FOREIGN PATENT DOCUMENTS

WO    WO 99/14904    3/1999

OTHER PUBLICATIONS

Ferguson, et at "Defeating Denial of Service Attacks which employ IP source address spoofing" RFC 2267, Jan. 1998, pp. 1-10.

(Continued)

*Primary Examiner*—Anh-Vu Ly
(74) *Attorney, Agent, or Firm*—Harrity & Harrity, LLP

(57) ABSTRACT

Methods and devices for processing packets are provided. The processing device may Include an input interface for receiving data units containing header information of respective packets; a first module configurable to perform packet filtering based on the received data units; a second module configurable to perform traffic analysis based on the received data units; a third module configurable to perform load balancing based on the received data units; and a fourth module configurable to perform route lookups based on the received data units.

16 Claims, 28 Drawing Sheets

U.S. PATENT DOCUMENTS

| | | |
|---|---|---|
| 6,781,991 B1 | 8/2004 | Anderlind |
| 6,798,777 B1 * | 9/2004 | Ferguson et al. ............ 370/392 |
| 6,831,893 B1 | 12/2004 | Ben Nun et al. |
| 6,850,521 B1 | 2/2005 | Kadambi et al. |
| 6,873,600 B1 | 3/2005 | Duffield et al. |
| 6,917,620 B1 | 7/2005 | Sindhu et al. |
| 6,970,462 B1 | 11/2005 | McRae |
| 6,977,930 B1 | 12/2005 | Epps et al. |
| 7,068,652 B2 | 6/2006 | Lin et al. |
| 7,068,656 B2 | 6/2006 | Sainomoto et al. |
| 7,215,637 B1 | 5/2007 | Ferguson et al. |
| 2001/0043614 A1 | 11/2001 | Viswanadham et al. |
| 2002/0126672 A1 | 9/2002 | Chow et al. |
| 2002/0150093 A1 | 10/2002 | Ott et al. |
| 2002/0191622 A1 * | 12/2002 | Zdan ......................... 370/401 |
| 2005/0018682 A1 | 1/2005 | Ferguson et al. |
| 2006/0007860 A1 * | 1/2006 | Komisky .................... 370/230 |

OTHER PUBLICATIONS

Claims of co-pending U.S. Appl. No. 10/920,237, filed Aug. 18, 2004, Dennis C. Ferguson et al., 7 pages.

* cited by examiner

| RULE | IP DESTINATION ADDRESS | DIFFSERV BYTE | PEC |
|---|---|---|---|
| 2 | 192.100/16 | EXPEDITED FORWARDING PHB (101110) | 2 |
| 1 | 208.197.169/24 | ASSURED FORWARDING 2 MEDIUM DROP PHB (010100) | 1 |
| 0 | * | * | 0 |

FILTERING AND ROUTE LOOKUP IN A SWITCHING DEVICE

RELATED APPLICATIONS

This is a continuation of U.S. patent application Ser. No. 10/017,719 entitled "Filtering and Route Lookup in a Switching Device" for Ferguson et al. filed on Dec. 14, 2001 which is a continuation-in-part of co-pending U.S. patent application Ser. No. 09/550,413 entitled "Filtering and Route Lookup in a Switching Device" for Ferguson et al. filed on Apr. 17, 2000, the content of which are hereby incorporated by reference.

Moreover, this application claims the benefit of the filing dates of the following provisional patent applications for any inventions disclosed therein in the manner provided by 35 U.S.C. §112, ¶1: U.S. Provisional Application No. 60/258,882 entitled "Internet Processor" for Ferguson et al. filed on Jan. 2, 2001; U.S. Provisional Application No. 60/258,886 entitled "Internet Processor" for Ferguson et al. filed on Jan. 2, 2001; U.S. Provisional Application No. 60/258,887 entitled "Internet Processor" for Ferguson et al. filed on Jan. 2, 2001; and U.S. Provisional Application No. 60/258,888 entitled "Internet Processor" for Ferguson et al. filed on Jan. 2, 2001. The contents of these provisional patent applications are hereby incorporated by reference.

BACKGROUND

The present invention relates generally to data routing systems, and more particularly to methods and apparatus for efficiently routing packets through a network.

In packet switched communication systems, a router is a switching device which receives packets containing data or control information on one port, and based on destination information contained within the packet, routes the packet out another port to the destination (or an intermediary destination).

Conventional routers perform this switching function by evaluating header information contained within a first data block in the packet in order to determine the proper output port for a particular packet.

Efficient switching of packets through the router is of paramount concern. Referring now to FIG. 1A, a conventional router includes a plurality of input ports 2 each including an input buffer (memory) 4, a switching device 6 and a plurality of output ports S.

Data packets received at an input port 2 are stored, at least temporarily, in input buffer 4 while destination information associated with each packet is decoded to determine the appropriate switching through the switching device 6. The size of input buffer 4 is based in part on the speed with which the destination information may be decoded. If the decoding process takes too long as compared to the rate at which packets are received, large sized memory elements may be required or packets may be dropped.

In addition, the size of input buffer may be influenced by a condition referred to as "blocking". Packets may be forced to remain in the input buffer after the destination information is decoded if the switching device cannot make the connection. Blocking refers to a condition in which a connection cannot be made in the switch due to the unavailability of the desired output port (the port is busy, e.g., routing another packet from a different input port). In summary, the size of input buffer 4 is dependent on a number of factors including the line input rate, the speed of the lookup process, and the blocking characteristics for the switching device. Unfortunately, conventional routers are inefficient in a number of respects. Each input port includes a dedicated input buffer and memory sharing between input ports is not provided for in the design. Each input buffer must be sized to meet the maximum throughput requirements for a given port. However, design trade-offs (cost) often necessitate smaller buffers for each port. With the smaller buffers, the possibility arises for packets to be dropped due to blocking conditions. While excess memory capacity typically exists in the router (due to the varied usage of the input ports), no means for taking advantage of the excess is afforded.

To minimize the occurrence of dropping packets, designers developed non head-of-line blocking routers. Referring now to FIG. 1B, a conventional non head-of-line blocking router includes a plurality of input ports 2 each including an input buffer (memory) 4, a switching device 6 and a plurality of output ports 8 each having an output buffer (memory) 9. In order to provide non head-of-line blocking, each output port 8 is configured to include an output buffer so that each output port can simultaneously be outputting packets as well as receiving new packets for output at a later time. As the size of the output buffer is increased, fewer packets are dropped due to head-of line blocking at input ports.

However, these designs are even more inefficient in terms of memory capacity and cost. Again, each output port includes a dedicated output buffer and memory sharing between output ports is not provided for in the design. Each output buffer must be sized to meet the maximum throughput requirements for a given port (in order to maintain its non head-of-line blocking characteristics). Even more excess memory capacity typically exists in the router (due to the varied usage of the input ports and output ports), yet no means for taking advantage of the excess is afforded. Twice the amount and bandwidth of memory has to be used than required to support the amount of data being moved through these types of devices.

What is desirable is to produce a router where the data packets can flow to a common memory, while routing decisions are made off-line. By separating the data path, the path along which the packet data traverses through the router, and the control path, a path used in evaluating the packet headers, memory can be conserved. In addition, by separating the data and control path, advanced filtering, policing and other operations can be performed without incurring expensive increases in the memory requirements for the router due to the additional time required to perform the extra operations.

SUMMARY OF THE INVENTION

In one aspect the invention provides a method for performing a lookup in a switching device of a packet switched network where the lookup includes a plurality of distinct operations each of which returns a result that includes a pointer to a next operation in a sequence of operations for the lookup. The method includes determining a first lookup operation to be executed, executing the first lookup operation including returning a result and determining if the result includes a pointer to another lookup operation in the sequence of operations. If the result includes a pointer to another lookup operation, the lookup operation indicated by the result is executed. Else, the lookup is terminated.

Aspects of the invention can include one or more of the following features. A lookup operation can be selected from the group of a tree search, an index search and a filter. A lookup operation can include a function list that specifies one or more functions to execute during the execution of the lookup operation. The function can be selected from the group of a management function, accounting function and policing function. The method can include identifying when a lookup operation specifies a function and executing the function including returning a result that indicates a next lookup operation in the sequence of operations to be executed. The execution of the function includes determining when a packet should be sampled for further processing and including in the result a designation that indicates the packet is to be sampled.

In another aspect the invention provides a method for performing a lookup to determine routing for a packet through a switching device in a packet switched network. The method includes chaining a plurality of lookup operations in a sequence including linking each operation to a successive operation in the sequence such that an arbitrary sequence of operations can be specified to determine the routing of a packet through the switching device and executing the chain of lookup operations.

In another aspect the invention provides a method for performing a lookup in a switching device. The method includes identifying a first lookup operation in a sequence of lookup operations to be performed on a packet, executing the first lookup operation including returning a result that is a pointer to a subsequent lookup operation in the sequence, executing the subsequent lookup including returning a result that is a pointer to a next lookup operation in the sequence, continuing to execute lookup operations in the sequence until a lookup operation in the sequence returns a result that indicates that no more operations are to be processed and when a result indicates that no more operations are to be processed, returning a notification to the switching device that includes routing information for the routing of the packet through the switching device.

In another aspect the invention provides a method for policing a stream in a switching device in a packet switched network. The method includes, in a single read operation, determining a data rate for the stream in a time interval and a policing decision for a current packet in the stream and, in a single write operation, writing the policy decision and count information for the stream without requiring global overhead to clear the count at each time interval.

In another aspect the invention provides a method for updating a lookup data structure in a lookup process. The lookup data structure includes an arbitrary sequence of lookup operations for determining the routing of a packet through a switching device in a packet switched network. Each lookup operation invokes a distinct lookup algorithm that calls a data structure that when executed returns a result that links to a next lookup operation in the arbitrary sequence. The method includes determining a location in the sequence of lookup operations where an update is desired. If the update adds a lookup operation to the sequence at the location, the added lookup operation is written to memory and linked to a next lookup operation after the location. Thereafter, a pointer in a lookup operation preceding the location is updated to point to the added lookup operation. If the update deletes a lookup operation from the sequence at the location, a pointer in a lookup operation preceding the location is updated to point to a next operation after the location and thereafter the lookup operation can be deleted from the memory.

In another aspect the invention provides a data structure for a lookup operation. The lookup operation is in a sequence of lookup operations that, when executed by a switching device in a packet switched network, determines routing for a packet through the switching device. The packet includes a key to be used in a lookup operation. The data structure includes a next hop identifier for linking operations in an arbitrary sequence to determine the routing of the packet through the switching device. The next hop identifier includes a pointer, an update and an offset. The pointer points to a particular lookup operation selected from a group of lookup operations. The update includes data for updating a pointer that points to a starting byte in the key to be used in the lookup operation. The offset indicates an offset bit down from the starting byte bit location to use for the lookup operation.

In another aspect the invention provides a method for performing a lookup to determine routing for a packet through a switching device in a packet switched network. The method includes providing plural algorithms in a lookup engine for performing distinct lookup operations, specifying an arbitrary sequence of lookup operations to be performed when the packet is received and executing lookup operations defined in the sequence in the order specified.

In another aspect the invention provides a route lookup engine for performing a lookup in a packet switched network where the lookup includes a plurality of distinct operations each of which returns a result that includes a pointer to a next operation in a sequence of operations for the lookup. The apparatus includes one or more lookup operation engines for executing lookup operations including returning a result and a lookup engine The lookup engine is operable to determine a first lookup operation in the sequence to be executed, evaluate the result returned from the execution of the first lookup operation to determine if the result includes a pointer to another lookup operation in the sequence of operations, invoke a particular lookup operation engine from the group of lookup operation engines based on the pointer to execute a next lookup operation in the sequence of operations and terminate the lookup and return a result to be used in routing the packet through the packet switched network.

Aspects of the invention can include one or more of the following features. The lookup operation engines can be selected from the group of a tree search look up engine, a index search index engine and a filter engine. The route lookup engine can include a memory configurable to store one or more tree data structures and where the pointer returned for invoking the tree search engine includes an indicator pointing to a particular tree data structure stored in the memory to be searched in the lookup operation. The memory can include one or more index data structures and where the pointer returned for invoking the index search engine includes an indicator pointing to a particular index data structure stored in the memory to be searched in the lookup operation. The memory can store one or more filter data structures and where the pointer returned for invoking the filter engine includes an indicator pointing to a particular filter data structure stored in the memory to be searched in the lookup operation.

A lookup operation can include a function list that specifies one or more functions to execute during the execution of the lookup operation and where the lookup engine can be operable to read the function list and execute the one or more functions in the lookup. The function can be selected from the group of a management function, accounting function and policing function. The lookup engine can be operable to identify when a lookup operation specifies a function and execute the function including returning a result that indicates a next lookup operation in the sequence of operations to be executed. The execution of the function can include determining when a packet should be sampled for further processing and including in the result a designation that indicates the packet is to be sampled.

In another aspect the invention provides an apparatus for policing a stream in a switching device in a packet switched network and includes a buffer for storing a count and a threshold for the stream and a policing engine. The policing engine is operable to, in a single read operation, determine a data rate for the stream in a time interval and a make policing decision for a current packet in the stream and, in a single write operation, write count information for the stream after each packet in a stream is processed without requiring global overhead to clear the count at each time interval.

Aspects of the invention can include one or more of the following features. The buffer can include four values including a last time adjustment value that is written in the single write operation to indicate a last time that the data rate was calculated, a current count value that indicates an amount of data that had been written as of the last adjustment time, a threshold value that indicates the threshold amount of data that can be passed in the stream before policing is required, and a credit value indicating the amount of counts to be applied to the current count per unit time. The policing engine can be operable to read, in the read operation, the four values and make the policing decision, and operable to write, in the write operation, a new value for the last time adjustment value and the current count value that reflects the processing of a current packet.

Aspects of the invention can include one or more of the following advantages. A technique is provided to implement traffic policing based on a fixed window monitoring mechanism with a minimal use of memory bandwidth. A method and apparatus are provided for implementing a general purpose packet filter within a lookup engine for longest match lookups. An apparatus is provided that supports chained lookup operations. The apparatus includes a route lookup engine that includes plural engines each for performing a different type of lookup operation. An apparatus is provided to allow for the chaining of plural lookup techniques in a switching device.

Other advantages and features will be apparent from the following description and claims.

DETAILED DESCRIPTION

Figure 1A:
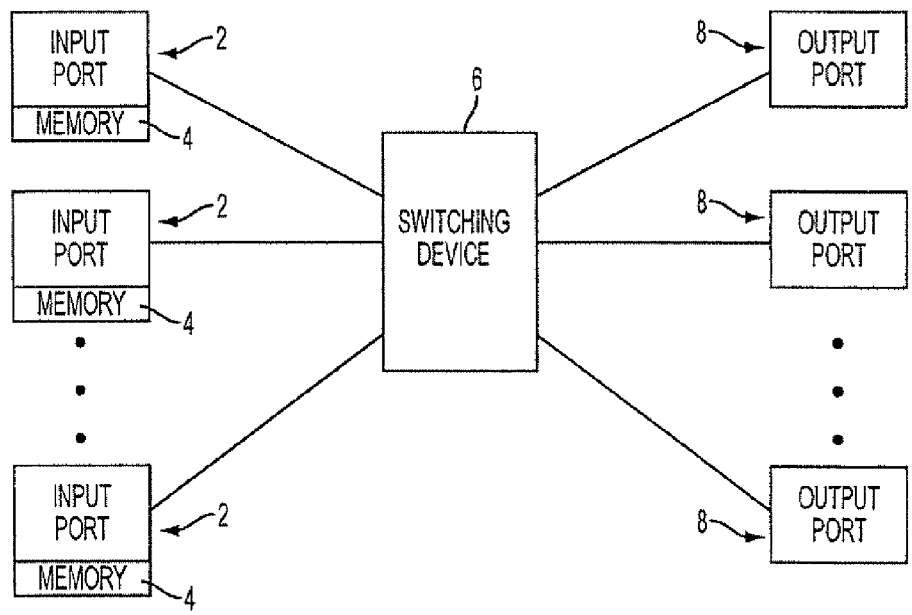
FIGS. 1A and 1B are block diagrams of conventional router devices.
Figure 1B:
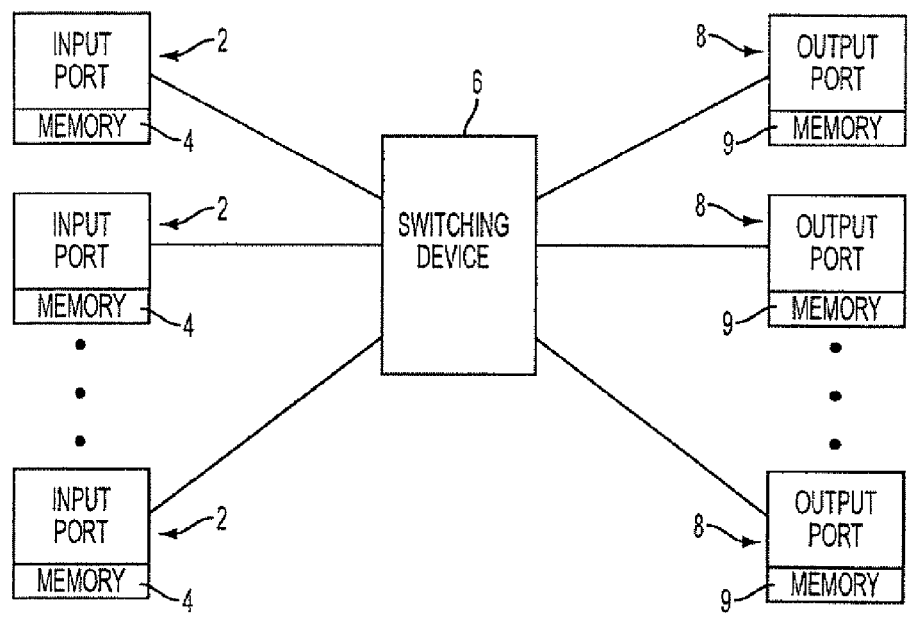
Figure 2A:
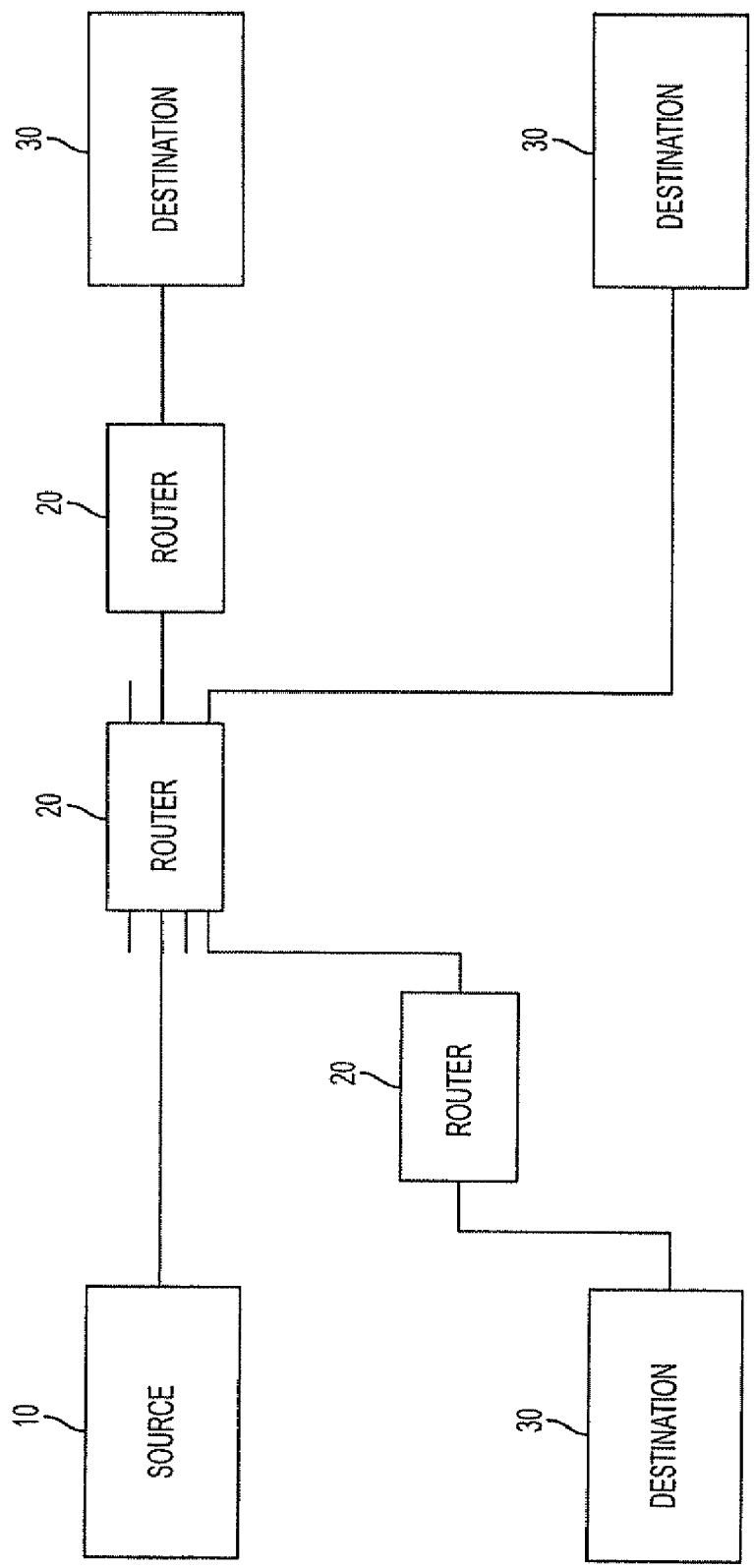
FIG. 2A is a schematic block diagram of a data routing system.

Referring to FIG. 2A, in a packet switching system, a source 10 is connected to one or more routers 20 for transmitting packets to one or more destinations 30. Each router includes a plurality of multi-function multiports that are connected to various sources and destinations. A packet from source 10 may pass through more than one router 20 prior to arriving at its destination.

Figure 2B:
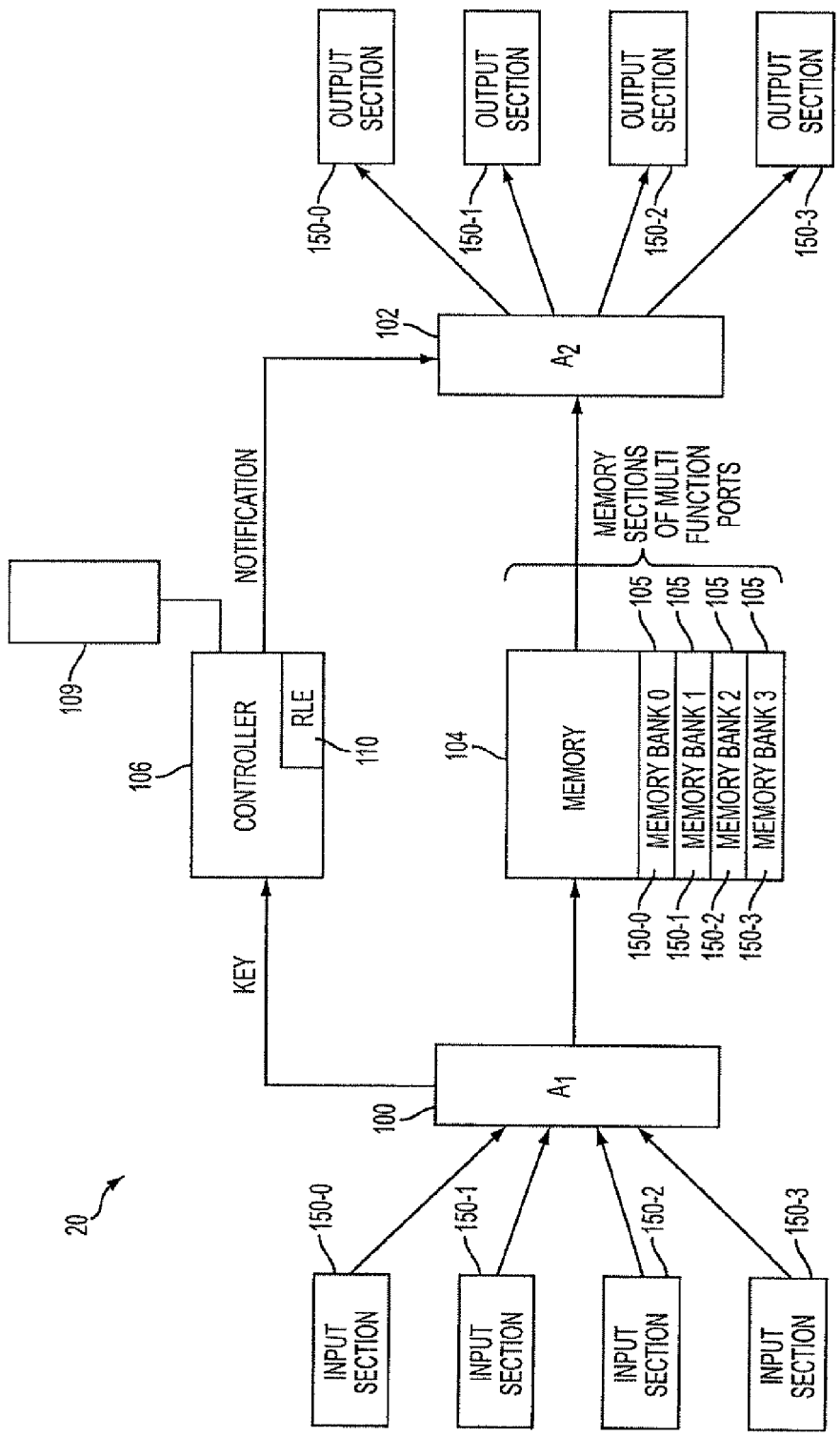
FIG. 2B is a schematic block diagram of a router.

Referring to FIG. 2B, each router 20 includes an input switch 100, an output switch 102, a global data buffer 104 including one or more memory banks 105, a controller 106 and a plurality of multi-function multiports 150 (150-0 through 150-3), respectively. Associated with the controller 106 is a controller memory 109 for storing routing information. Input switch 100 and output switch 102 are connected to each multi-function multiport 150 in router 20. In one implementation, router 20 includes plug-and-play multi-function multiports which allow for easy expansion capability. The present invention will be described with reference to a system including eight multi-function multiports 150 (even though FIG. 2B only shows four), with each multi-function multiport including up to sixteen input ports and sixteen output ports. Other configurations may be used depending on user load conditions. Each multifunction multiport includes one or more input ports, one or more output ports and a memory. The configuration and operation of the multi-function multiports will be described in greater detail below.

In operation, packets are received at a multi-function multiport 150, transferred to input switch 100 and stored temporarily in global data buffer 104. When the packet is received by input switch 100, a key and other information is read from the packet and transferred (in the form of a notification) to controller 106. The key contains destination information which is derived from the header field associated with the first block of data in a packet and other information (such as source ID, priority data and flow ID).

A route lookup engine 110 in controller 106 performs a lookup based on the notification information and returns a result which includes the output miultiport associated with the destination. The result is coupled with other information (such as source ID, flow ID and packet length) for routing the packet through router 20 and provided as a notification from controller 106 to output switch 102. Output switch 102 transfers the notification to the identified multi-function multiport 150. Upon receiving the notification information, the multi-function multiport 150 initiates the transfer of the packet from global data buffer 104 through output switch 102 to the appropriate multi-function multiport 150.

Multi-Function Multiports

Figure 3:
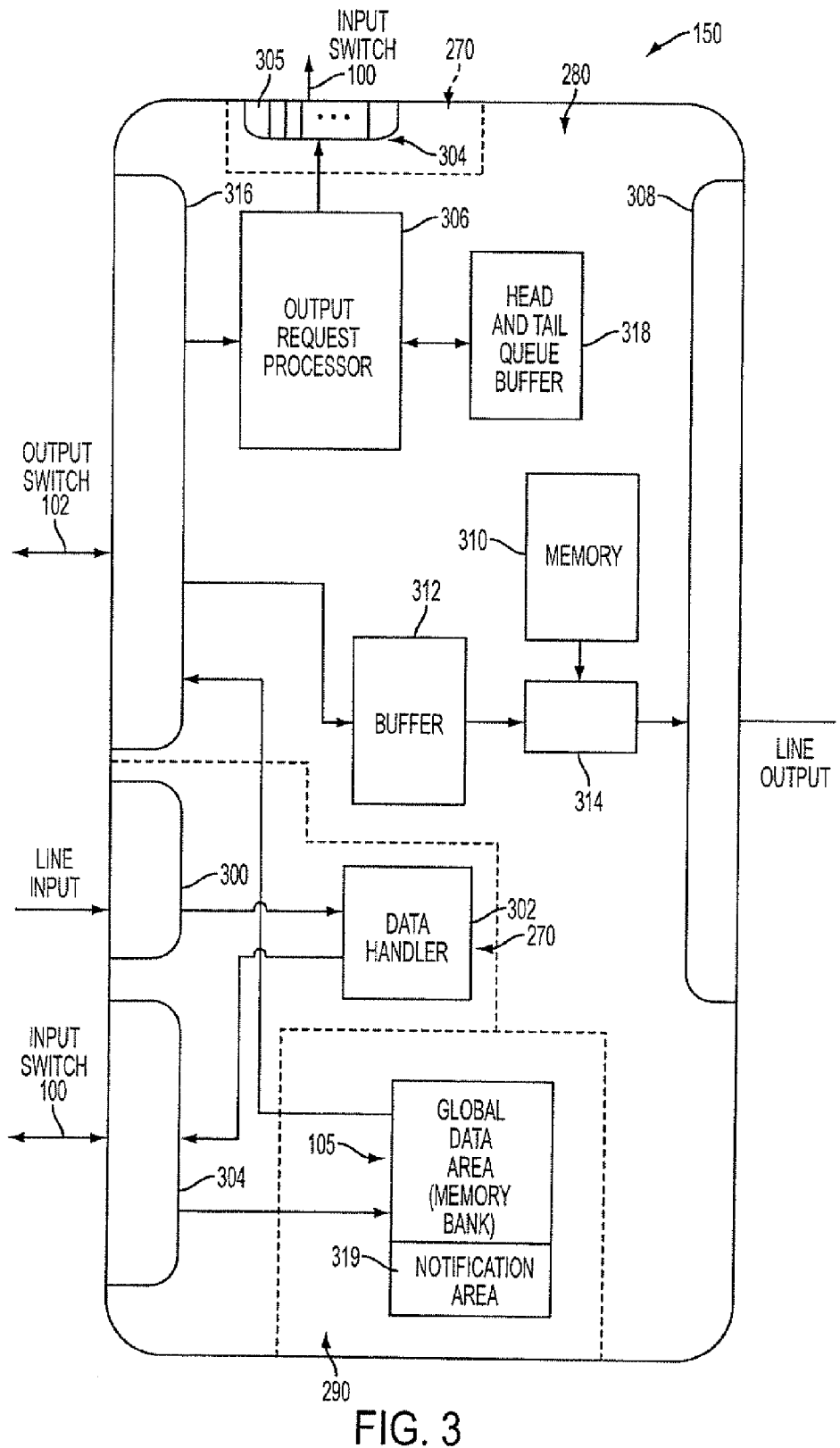
FIG. 3 is a schematic block diagram of a multi-function port.

Referring to FIG. 3, each multi-function multiport 150 includes an input section 270, an output section 280 and a memory section 290.

Input section 270 includes a line input interface 300, a data handler 302 and an input switch interface 304. Output section 280 includes an output request processor 306, a line output interface 308, a storage device (memory) 310, stream output buffers 312 (one for each output stream), output formatter 314, an output switch interface 316 and head and tail queue buffer 318. In addition, the output section includes a portion of input switch interface 304. Specifically, input switch interface 304 includes read request queues 305, one for each memory bank. The use and operation of the read request queues, stream output buffers, and head and tail queue will be discussed in greater detail below.

Memory section 290 includes a memory bank 105 (which represents a portion of the global data buffer 104) and a notification area 319. The use an operation of the memory section will be discussed in greater detail below.

Figure 4:
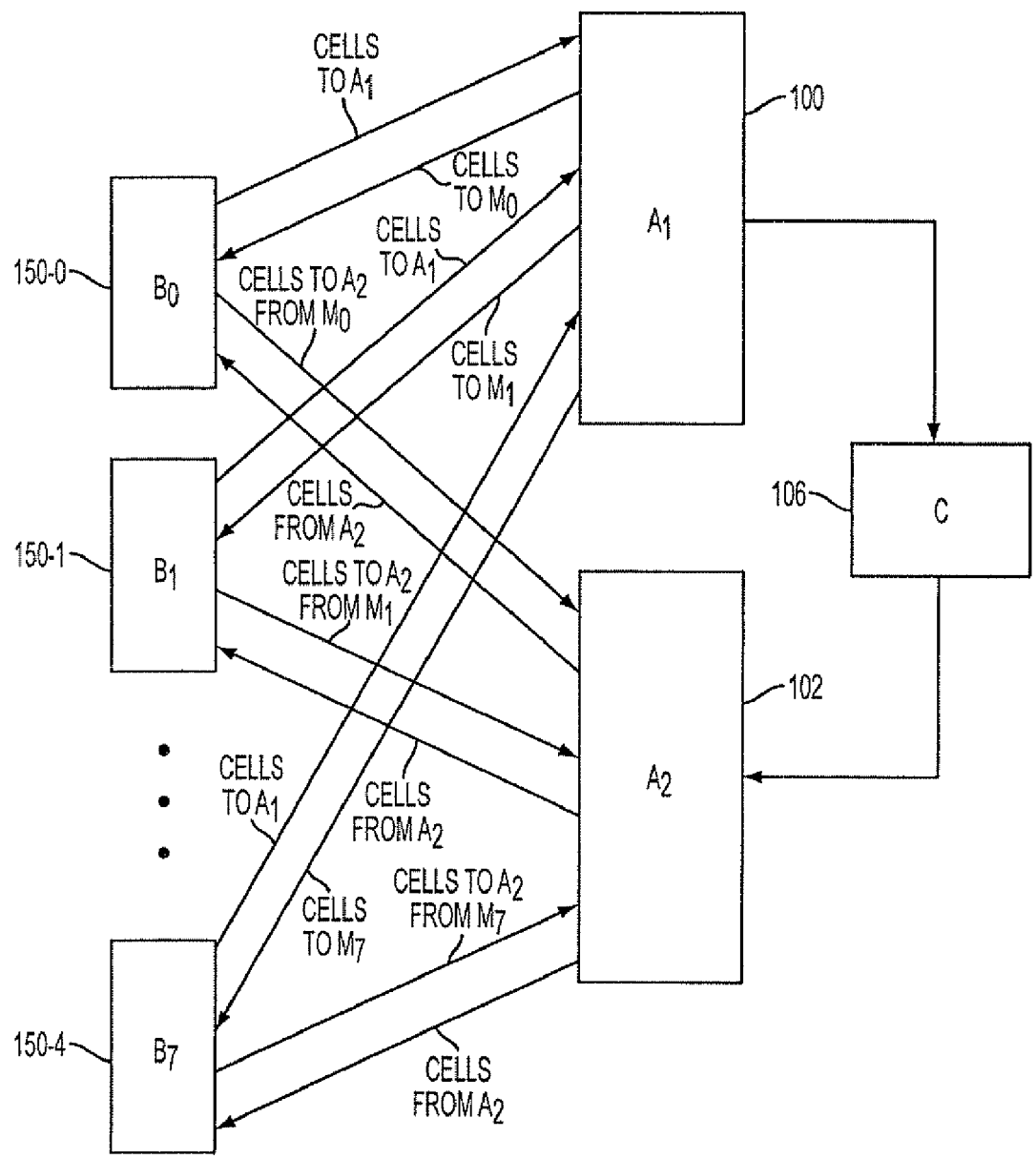
FIG. 4 is a schematic diagram showing the data transfers between components of the router of FIG. 2B.

The multi-function multiport is used in conjunction with the input switch, output switch and controller as is shown in FIG. 4. The various piece components of the input section, output section and memory section are described in greater detail below. The combination of the devices into a single unit simplifies the interfaces between the components.

Referring again to FIG. 3, packets are received at line input interface 300. As the packets are received, data handler 302 divides the packets received into fixed lengths cells. In one implementation, the length of each cell is 80 bytes, with 16 bytes of internal header (control information) and 64 bytes of cell data. As the data handler divides the incoming packets into fixed length cells, it synchronously outputs the cells to input switch 100 through input switch interface 304.

Each cell transferred from a multi-function multiport 150 to the input switch contains a cell header and cell data. The cell header can include a type field, stream field, and packet header fields. In addition, the cell header can include an independent read request in the form of a multi-function multiport identifier and address.

The type field indicates the type of cell to be transferred from the multi-function multiport. At each cell slot (20 clock cycles in one implementation), a multi-function multiport may transfer either a data cell, an indirect cell placeholder, or a delayed indirect cell placeholder. Data cells contain data associated with an incoming packet. An indirect cell placeholder is an empty cell, and is used in conjunction with indirect addressing for the storage of the cells in the global data buffer 104. Delayed indirect cell placeholders arise when a data stream that requires indirect addressing terminates at a time prior to the designated time for writing the last indirect addressing cell associated with the data stream to global data buffer 104. The generation and operation of indirect placeholders and delayed indirect placeholders will be discussed in greater detail below.

The stream field indicates the stream to which the cell data belongs. In one implementation, each multi-function multiport is capable of handling up to sixteen separate streams of data at a time, one on each of its respective 16 input ports.

The packet header field contains header information associated with a given packet and includes start offset information, packet length and interface index information.

The multi-function multiport identifier identifies the multi-function multiport which is sourcing the read request. The address indicates the address in global data buffer 104 to be read.

A single cell can be transferred from a multi-function multiport 150 to input switch 100 at each cell (time) slot "T". For a given cell slot "T", input switch 100 receives a total of "N" cells, where "N" is equal to the number of multi-function multiports. Similarly, a single cell can be transferred from the input switch 100 to memory 104, from the memory 104 to the output switch 102, and finally from the output switch 102 to a multi-function multiport 150 at each cell (time) slot "T" as is shown in FIG. 4.

In one implementation, cells from a given stream may be written to memory in an order that is different from the arrival order. These out of order writes are performed to make efficient use of scarce bandwidth between the multi-function multiports and the input switch. When a packet comes in to the multi-function multiport, it is broken up into cells as the bytes arrive and the cells are placed in per-bank output queues on the way to the input switch. These queues are designed to share scarce interconnect bandwidth between the streams of a multi-functional multiport in the most efficient way possible, but they have the detrimental effect of reordering cells at the interface between the multi-function inultiport and the input switch. Thus the cells from a given stream may arrive at the input switch out of order. The multi-function multiport marks the data cells of a stream with one of four codes: first cell (FC); intermediate data cell (DC); last cell (LC); or first cell which happens to be also a last cell (FLC).

Input Switch

Figure 5:
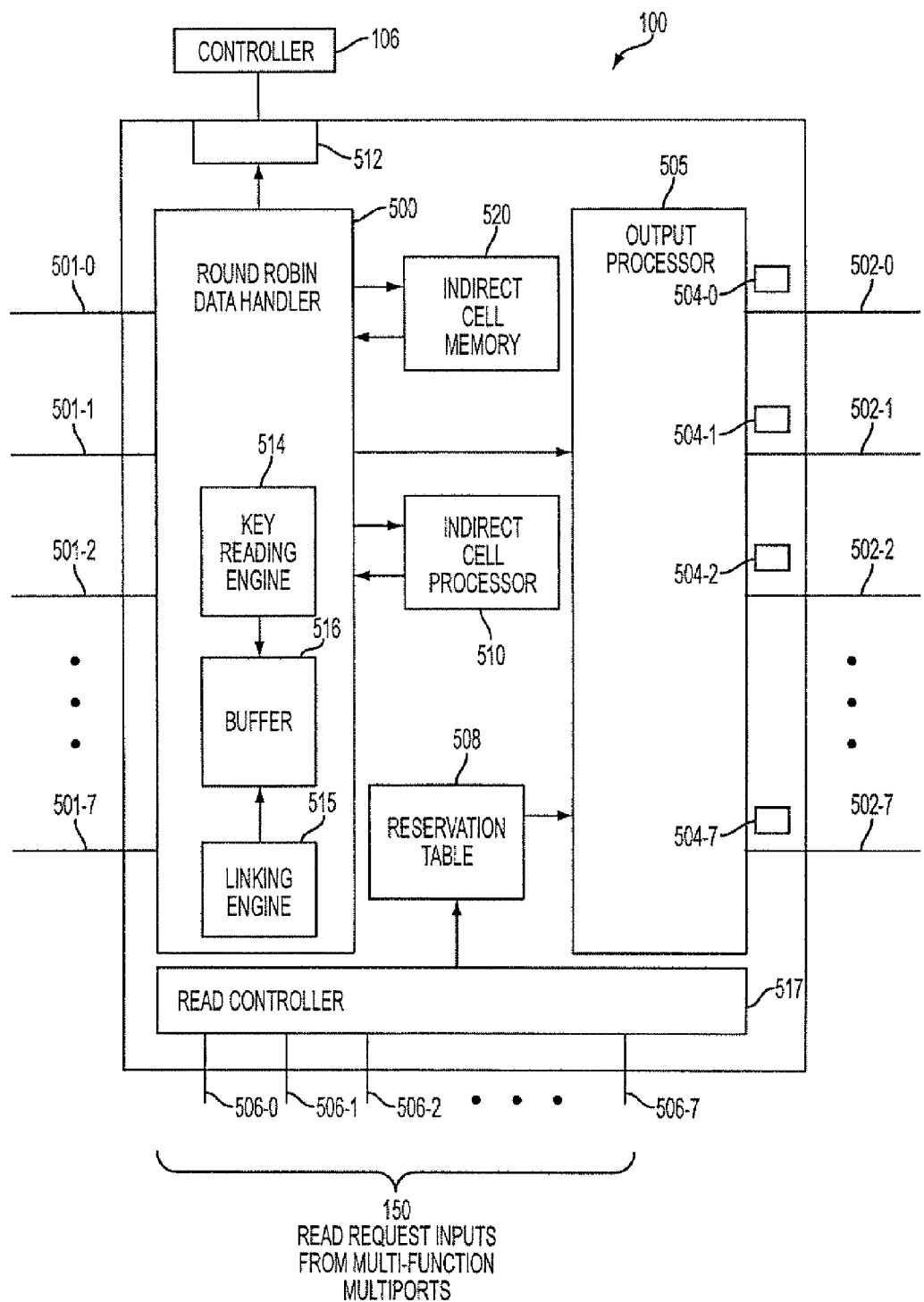
FIG. 5 is a schematic block diagram of an input switch.

Referring to FIGS. 2B and 5, input switch 100 includes a round robin data handler 500, one or more input interfaces (501-0 through 501-7, one for each multi-function multiport 150), one or more memory interfaces 502 (502-0 through 502-7, one associated with each memory bank), a like plurality of pointers 504 (504-0 through 504-7), an output processor 505, one or more output interfaces 506 (506-0 through 506-7, one for each multi-function multiport 150), a reservation table 508, an indirect cell processor 510, controller interface 512 and read controller 517.

a) Transfers Through the Input Switch

Round robin data handler 500 receives cells from each multi-function multiport and transfers them to output processor 505 for output to an appropriate memory bank 105 in global data buffer 104. Round robin data handler 500 services the inputs (cells) received on input interfaces 501 in a round robin, time division multiplexed manner. That is, for a given cell slot, one cell from each multi-function multiport is received at the round robin data handler 500 and subsequently transferred to output processor 505 for transfer at the next cell slot to a memory bank 105 in global data buffer 104. At the next time cell slot, data handler 500 transfers the next cell received from the same multi-function multiport to output processor 505 for transfer to a different memory bank. In one implementation, the next cell received is transferred to the next memory bank (next in numerical order, modulo N) in the memory array. Alternatively, another time dependent permutation may be used to control the transfer of successive cells from the same multi-function multiport.

Round robin data handler 500 and output processor 505 within the input switch 100 transfer cells out to global data buffer 104 on transmission lines. Output processor 505 outputs one cell to each memory bank in a single cell slot. One cell from each multifunction multiport is written to global data buffer 104 per cell slot. Round robin data handler 500 time division multiplexes the transfers to output processor 505 such that consecutive cells from the same multi-function multiport are written to consecutive memory banks 105 (modulo N) in global data buffer 104.

Pointer 504 indicates the location in an associated memory bank to which the next cell will be written. Output processor 505 writes a cell to a memory location in a particular memory bank based on the next available address in the bank as is indicated by the associated pointer 504.

b) Key Reading and the Linking Process

Round robin data handler 500 includes a key reading engine 514 for determining the key information associated with a first cell in a packet and a linking engine 515 for linking cells in the same packet.

The process of reading key information is known in the art. After the key is determined for a given packet, it is stored temporarily in key buffer 516 in input switch 100 until the entire packet has been stored in global data buffer 104. Each entry in the key buffer is referred to as a notification or "info cell" and includes a key, full address, offsets and an indirect cell indicator and can include other information.

Linking engine 515 determines the starting address (full address) in memory for where the first cell in a given packet is to be stored in memory. The starting address includes the bank number in global data buffer 104 (the bank number which is assigned to store the cell by round robin data handler 500) and the first available address location in the designated bank (as is indicated by the associated pointer 504). The starting address is stored in key buffer 516 along with the associated key for the packet. When the next cell associated with the same packet arrives at switch 100, an offset associated with the offset at which the cell is to be written (relative to the full address) is computed and stored in key buffer 516. In one implementation, up to four offsets are stored. Each offset address is computed based on the relative offset in memory between the location of the last cell in memory and the value of the pointer 504 associated with the current memory bank which is to be written.

If more than five data cells are included in a packet, then the indirect cell indicator for that packet is set, and the last offset indicates the address in memory where the first indirect cell associated with the packet is stored. Indirect cells are described in greater detail below and in copending application entitled "Separation of Data and Control in a Switching Device" filed Dec. 17, 1999 and assigned U.S. patent application Ser. No. 09/466,864, the contents of which are expressly incorporated herein by reference.

After the packet has been stored in memory, the associated notification in key buffer 516 (a route lookup request) is forwarded through the controller interface 512 to the controller 106 for processing. Alternatively, the notification may be transferred after the first five cells have been stored in memory.

As described above, the data cells are stored in the global buffer upon receipt. The data path for the data packets flows directly from the input port on which a packet is received (the multi-function multiport 150) to the global data buffer 104. The data packets remain in the global data buffer 104 while a routing decision is made in a separate control path using controller 106. The separation of the data path and control path allows for the sharing of the memory resources among all of the input ports.

The linking or threading of cells for a packet is performed by using the offsets described above and indirect cells. Offsets are used to link cells in a packet. Offsets may be stored along with key information and routed through controller 106 (FIG. 2B) or may be stored in indirect cells. In one implementation, if a cell contains 5 cells or less, no indirect cells are required to be used. Indirect cell processor 510 performs the linking of cells in memory for a given packet. Indirect cell processor 510 generates indirect cells for storage in global data buffer 104. Indirect cells contain offset information associated with the relative offset in memory space between contiguous cells in the packet. Indirect cell processor includes indirect cell memory 520 for storing indirect cell data during the formation of indirect cells.

As was described above, when a packet is received, the linking engine processes the first five cells and stores linking information in the form of a start address and four offsets in key buffer 516. In the event more than five cells are contained within a packet, the indirect cell processor takes over for the linking engine and computes the offsets associated with the locations in memory where the remaining cells in the packet are stored. Round robin processor 500 passes cells to the output processor 505 for transfer to an associated memory bank in global data buffer 104. Round robin processor 500 enables the indirect cell processor when the packet being processed contains more than 5 cells (based on header information included within the first cell). At the time for writing the fifth cell to memory, indirect cell processor 510 stores in indirect cell memory 520 the address (the "indirect cell address") associated with the location in memory at which the fifth cell would have been written if it had been the last cell in the packet. The indirect cell address indicates the location in memory where the indirect cell is to be written when full (or when the last cell of the packet is processed).

When an indirect cell is full (having stored offsets in all available locations except the last field), then the indirect cell processor stores the offset associated with the location in memory where the next indirect cell is located. Thereafter, the full indirect cell is written to its appropriate place in memory. The writing of the indirect cell to memory coincides with the receipt of an indirect cell placeholder by the input switch 100 from the associated multi-function multiport 150. This process continues until the last cell in a packet is stored in memory. At that time, the last indirect cell is written to memory, and the associated entry from the key buffer 516 is transferred to the controller 106 for processing. For a given packet, all indirect cells are written to the same memory bank in the global memory buffer.

As often will be the case, the last cell of a packet will not coincide with the timing required to write the completed indirect cell immediately into memory. This is because packet length is completely arbitrary. The end of a packet will likely not coincide with the last available entry of an indirect cell. When a packet has completed (all cells have been received by the input switch) and a last entry in the indirect cell is written, the indirect cell is free to be written to memory. However, the writing will be delayed until the proper time, hence the term delayed indirect cell. A delayed indirect cell is a indirect cell that is the last indirect cell associated with a packet. It is delayed, because it is written to memory after the rest of the packet has been written to memory. The timing of the write to memory is dictated by the address which is reserved for the indirect cell. As was described above, at the time for the creation of an indirect cell, its position in memory is reserved. The delayed indirect cell will be written to memory at the next time slot available for the particular multi-function multiport to write to the particular memory bank after the packet has been completed. The timing of the write to memory of delayed indirect cells coincides with the receipt of a delayed indirect placeholder from the appropriate multi-function multiport 150.

c) Transfers to Memory

At each cell slot, output processor 505 generates a cell that includes a read request source field, read address, write address and data field (cell data received from multiport 150). The read request source field indicates the output port (in the particular multi-function multiport 150) requesting the read (destination output port). Output processor 505 receives read requests from read controller 517 and bundles the read request with any write request received from round robin data handler 500 destined for the same memory bank. At each cell slot, output processor 505 provides a cell which may include a write and read request to each memory bank 105 in global data buffer 104.

Read controller 517 controls the transfer of read request signals flowing from input switch 100 out memory interface 502 to the individual memory banks in global data buffer 104. Read controller 517 receives read requests from each multi-function multiport through output interfaces 506. The format of each request includes source identification (output port) and a full address in memory which is to be read. At each cell slot, each multifunction multiport port may generate a read request for processing by switch 100 to read a memory location in global data buffer 104, resulting in the reading of a cell (a read reply) from a memory bank 15 (on a subsequent cell slot) to output switch 102.

Read controller 517 loads a reservation table 508 as requests to transfer packets are received from the various multi-function multiports 150. The reservation table is loaded such that at every cell slot a single read request is generated for each bank of memory 105. The structure of the reservation table is described in greater detail in "Separation of Data and Control in a Switching Device". At each cell slot, each multi-function multiport is capable of requesting a read from a single memory bank 105 in global data buffer 104. Associated with reservation table 508 is a read pointer. The pointer points to a next row in the reservation table to be read. Rows ahead of the read pointer correspond to requests that will be queued at a later cell slot time. In one implementation, the pointer moves at least one row in each cell slot time.

Memory Architecture

Figure 6:
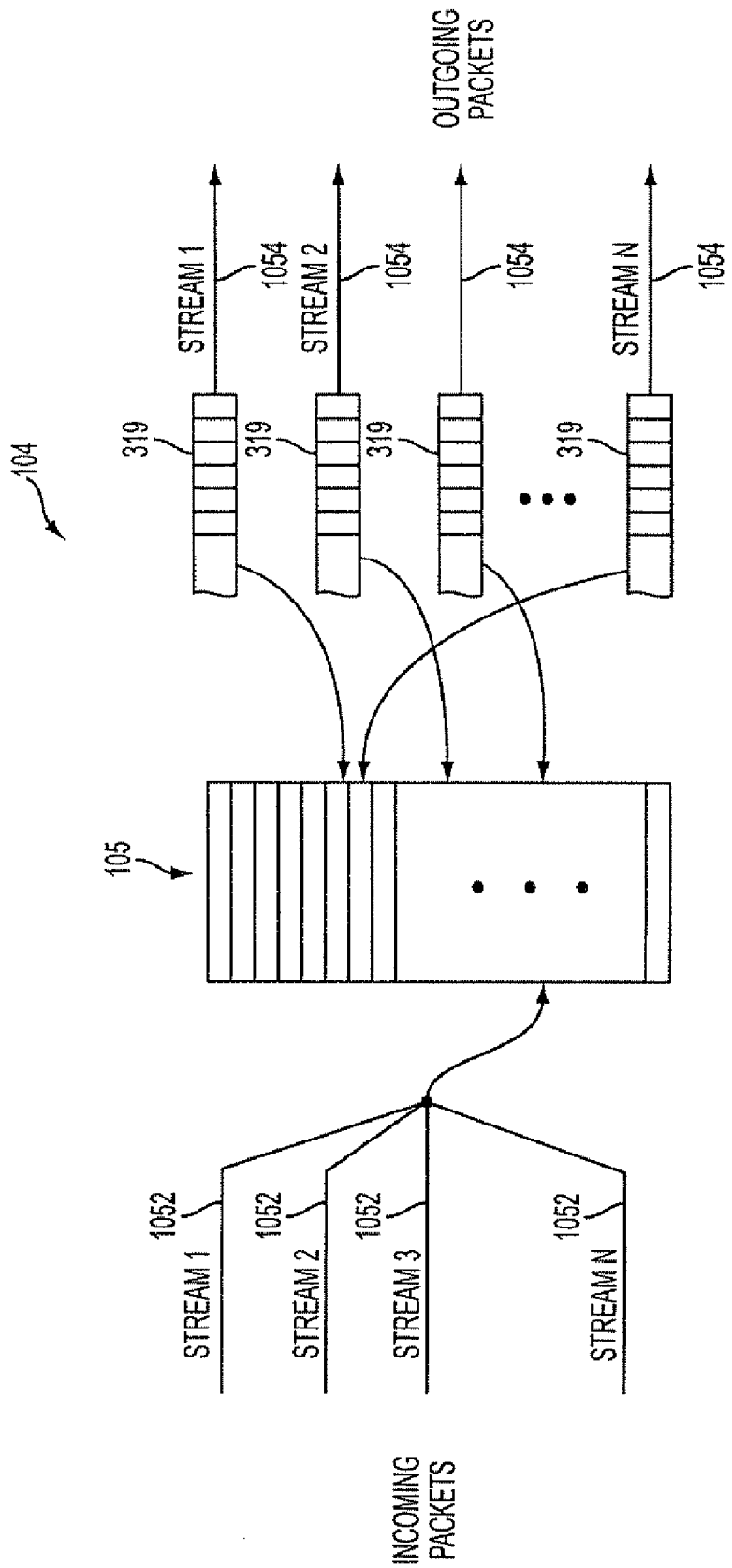
FIG. 6 is a schematic diagram of memory structure for the router.

Referring now to FIG. 6, main memory 104 is used as temporary buffer storage for packets flowing into the system on input streams 1052 and out of the system on output streams 1054. Main memory is divided into two distinct parts: a global data buffer 104 that is used to store incoming packets while one or more lookup engines in the controller 106 determine the outgoing stream for each packet; and packet notification queues 319 that are used to store packet pointers (notifications) after the outgoing stream has been determined. Notification queues 319 are associated with outgoing streams, whereas the global data buffer 104 forms a common pool shared amongst all the streams.

Figure 7:
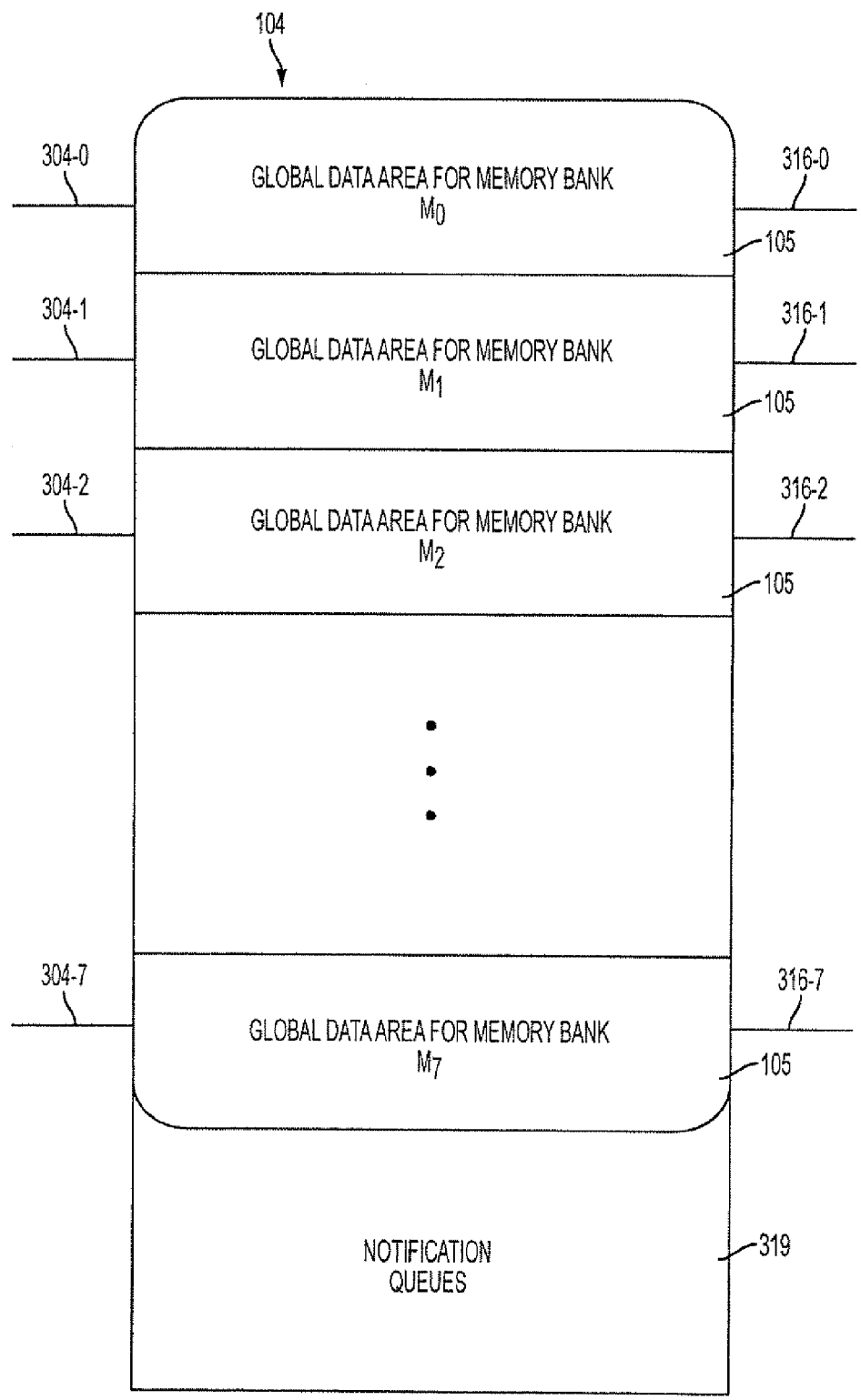
FIG. 7 is a schematic diagram of the global memory for the router.

Referring now to FIG. 7, main memory includes a plurality of memory banks. Associated with each memory bank is an input switch interface (an input port) 304 and output switch interface (an output port) 316. At each cell slot, each memory bank receives at most one write and one read request via input switch interface 304. The write requests are associated with cells received from a multi-function multiport 150. Read requests reflect a request for cell data to be transferred from a memory bank to output switch 102 for ultimate transfer to a requesting multi-function multiport 150.

The memory in the multi-function multiport configuration is physically distributed across a number of banks b, one bank for each active multi-function multiport in the system. Each bank is divided into two contiguous, non-overlapping regions referred to as global data area 105 and the notification area (notification queues 319). The global data area for a bank constitutes 1/b of the memory of the global data buffer 104. The notification area provides space for queuing notifications that will be sent out on the line output interface 308 for a given multi-function multiport. Typically, the global data area is four times larger than the notification area; this factor derives from the ratio between data size and notification size for the shortest packet.

In one implementation, each bank's memory bandwidth is sufficient for reading and writing packets from a full-duplex OC-48 interface as well as for queuing and dequeuing notifications for the worst-case example of single-cell packets. Thus, both the aggregate memory size and the aggregate memory bandwidth scale linearly with the number of active multi-function multiports b in the system.

In one implementation, each memory bank is implemented as two sub-banks using two 72-bit wide SDRAM (static dynamic random access memory) DIMM's (dynamic in-line memory modules) cycling at 125 MHZ. The sub-banks are transparent to the input and output switch resulting in what appears to be one continuous bank from the perspective of the switches. However, the sub-bank architecture allows for better throughput. Each DIMM has a 72-bit wide ECC (error correction code) protected data path going to 9 SDRAM chips each of which is 8 bits wide. The two DIMM's have separate address busses and are addressed independently of one another. The DIMM's are interleaved on bit 0 of the 23-bit address. In one implementation, the smallest memory bank configuration is 32 MBytes, using 16 Mbit chips and the largest is 512 MBytes, using 256 Mbit chips.

As was described above, a bank can receive at most one read request and one write request every cell slot. Since a cell slot is 20 clock cycles at 125 MHZ, this works out to a peak bandwidth demand of 400 MBytes/sec for reads and 400 MBytes/sec for writes. The worst case notification load occurs for single cell packets. For unicast traffic, this load is exactly ¼ the data bandwidth which works out to 100

MBytes/sec for reads and 100 MBytes/sec for writes. In this implementation, the total peak memory bandwidth needed is therefore 1 GByte/sec.

In this implementation, the peak transfer rate of each DIMM is 1 GByte/sec, but the sustained rate depends on the actual mix of reads and writes and how the addresses are distributed over the internal DIMM banks. In practice, each DIMM is expected to deliver a sustained data rate of around 650 MBytes/sec. The total of 1.3 GBytes/sec supplied by the two groups is 30% larger than the maximum sustained requirement of 1 GByte/sec. The 30% headroom provides a way to sustain instantaneous loads where one DIMM has more references directed to it than the other. The memory controller for the two DIMM's resides in the multi-function multiport.

In one implementation, all banks are made the same size and approximately 1/5th of the memory in each bank is allocated to the notification area and 4/5th to the global data area. The purpose of this allocation is to make it exceedingly unlikely for a stream to run out of memory because of space in its notification queue. With a worst case packet size of 64 bytes, notifications (sized at 16 bytes) need 1/4th the amount of storage that packet data needs, which is exactly the proportion allocated. Any cell in the global data buffer may be accessed via its physical cell pointer, which identifies the physical bank number and the address of the cell within the bank. The physical cell pointer defines a system-wide physical address space. To simplify address computations, as well as to provide a mechanism to detect old packets, accesses to the global packet buffer are performed through a system-wide virtual address space that maps to the physical address space.

Incoming packets are broken up into as many cells as needed and the cells are written to the global packet data buffer as they arrive as described above. The global data buffer is treated as a single large circular buffer. The input switch maintains an array of write pointers, one per active bank, to keep track of where to write the next cell. The pointers start out at one end of the buffer and advance until they eventually wrap around and overwrite packets that were written a long time ago. An ageing mechanism is used to guard against reading cells that may have been overwritten by subsequent packets. The cells of packets arriving on a given stream are interleaved strictly across the active banks to spread the bandwidth load.

Controller

Figure 8:
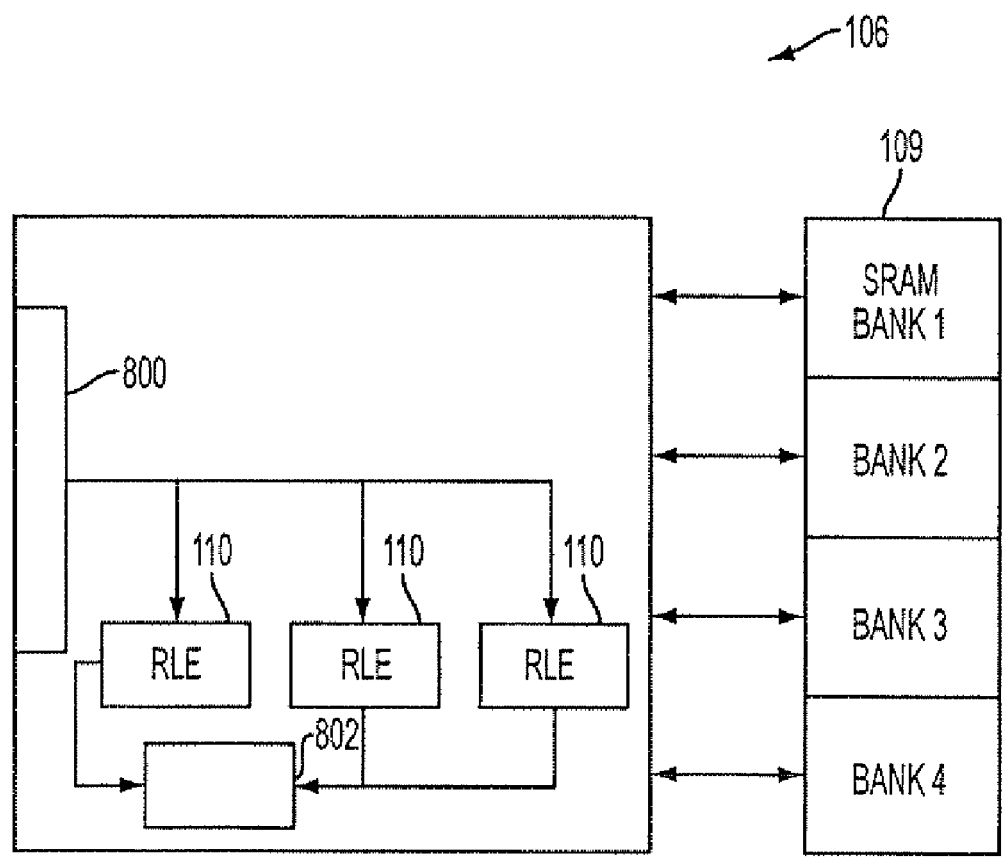
FIG. 8 is a schematic block diagram of a controller.

Referring now to FIG. 8, controller 106 includes controller memory 109, route lookup engine 110, input switch interface 800 and output switch interface 802. Controller 106 receives a route lookup request from input switch 100 at the input switch interface 800. In one implementation, a plurality of route lookup engines 110 are included in controller 106, each receiving lookup requests in round-robin fashion so as to speed the routing process. In one implementation, controller memory 109 is a four-bank static random access memory (SRAM) that requires thirty six route lookup engines 110 to service at full bandwidth.

The present invention is scalable with respect to performance. That is, the number of route lookup engines 110 included within the controller may be increased to provide higher performance without requiring an increase in memory size. In one implementation, the number of route lookup engines is nines times as great as the number of memory banks in controller memory 109. Alternatively, lesser cost and performance units may use lesser numbers of route lookup engines 110 or more engines as required.

a) Controller Operation

Referring to FIGS. 2B, 3 and 8, in operation, packets are received at an input port 150, transferred to input switch 100 and stored temporarily in memory 104. When the packet is received by switch 100, a key extraction engine reads the key from the packet and transfers the key and other information (the notification) to controller 106. The input switch also includes a transfer engine for transferring packets received from an input port 150 to memory 104.

The key includes at least destination information and may also include source information, a flow identifier and physical source information (input port ID). The key can be located in the header field associated with the first block of data in a packet. The header may contain other information (ISO layer 2 and layer 3 headers), such information is passed to memory for storage. The process of reading key information from a packet is known in the art. The present invention accommodates keys of various types. For example, keys for various protocols may be designated (IPV4, IPV6, etc.). The length of the key is user definable. In general, the key is derived from the header, but portions may also be derived from the payload (data field associated with the packet).

When the controller receives the notification information, it must determine a key type. In one implementation, a plurality of key types are defined. The user may define up to 4 types of keys, each having variable length. The key type can be defined by a two bit field in the header. A lookup of the two bit field is used to determine an appropriate starting hop (as described below).

Thereafter, an assigned route lookup engine 110 performs a lookup for the notification. The lookup can include a plurality of chained lookup operations, one of which can be a jtree search. A jtree (jtrie) is a data structure that is used to locate the best (longest) matching route for a given key. At the completion of the lookup, the route lookup engine returns a result which includes the output port associated with the destination. The result and other information (source ID, flow ID, packet length, quality of service and statistical information) for routing the packet through the router combine to form a result notification. The result notification is transferred from the controller 106 to the output switch 102. Upon receiving the result notification, the output switch 102 initiates the transfer of the packet from memory 104 to the respective output port 150 associated with the result.

In one implementation, the data structure for the result notification includes a destination mask, a next hop index pointer, full address, offsets and packet length. The destination mask is used to indicate which multi-function multiport connected to output switch 102 is to transfer the packet. In one implementation, the result notification may be sent to more than one multi-function multiport resulting in the broadcast of the associated packet. Associated with each multi-function multiport 150 is a storage 310. The next hop index pointer points to a location in storage (memory) 310. Storage 310 is used to store media header information associated with a particular type of packet transfer. Next hop addresses, media headers and storage 310 will be described in greater detail below in association with the output section of multi-function multiport 150. The full address indicates the starting address in the global data buffer where the first cell in the packet is stored. As was described above, offsets provide linking information for retrieving cells or an indirect cell associated with the packet. The packet length indicates the length of the associated packet and may be used to determine if indirect cells will have to be retrieved.

b) Route Lookup Engine

Each route lookup engine performs packet (key) processing. Packet processing is the process of examining the contents of a packet header and performing functions such as route lookup, filtering, or flow policing based on the values of fields in the header. The result of packet processing determines how a packet should be forwarded in the router.

Figure 9:
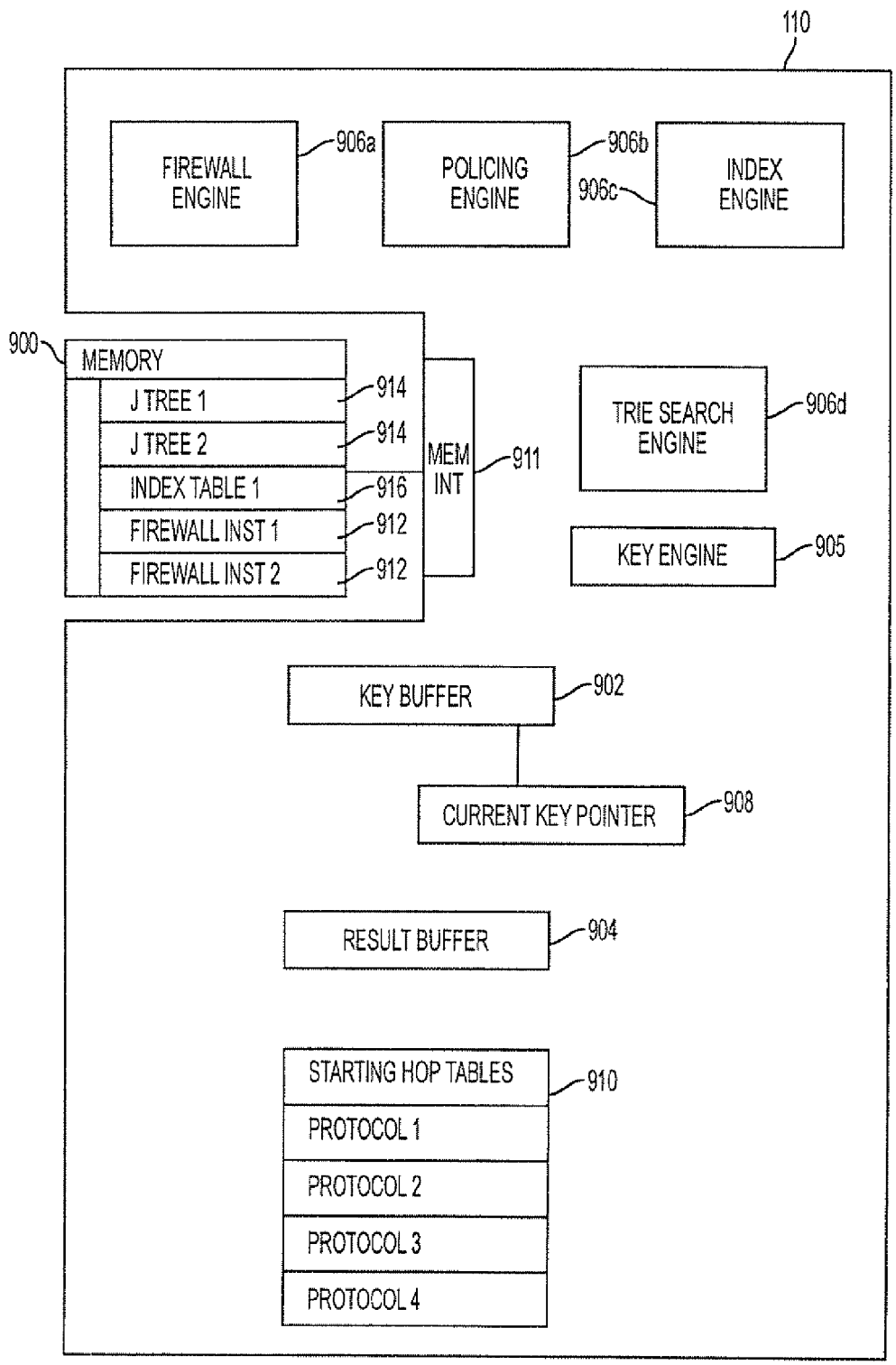
FIG. 9 shows a schematic block diagram for a key lookup engine.

Referring now to FIG. 9, each route lookup engine 110 includes a key buffer 902, a result buffer 904, a key engine 905, one or more specialized engines for processing packets 906, a current key pointer 908 and starting hop table 910. In one implementation, each route lookup engine 110 includes a general purpose key engine 905 and plural specialized engines 906. The general purpose key engine 905 receives the key from the input switch, loads the key and result buffers, performs initializations, unloads the buffers and performs other operations in support of the lookup process. Specialized engines operate on instructions or data structures stored in memory 920 to perform a particular function. Functions can be selected from lookup operations, filtering, policing, management or other functions. In one implementation, the specialized engines can be selected from the group of a firewall engine 906a, a policing engine 906b, index engine 906c and trie search engine 906d. Each of these engines can be invoked to perform an operation and assist in determining a forwarding decision for a packet. As will be described below, more than one engine can be invoked to operate on each packet.

Key engine 905 stores the fields from a packet that have been selected to be part of the key for packet processing in key buffer 902. Any part of a packet can be selected to be part of the key, depending on the application. The key extraction process is completed in the input switch 102 as described above. The results of the key extraction process (the extracted key) and other information forms the notification that is passed to the controller 106. Any part of the notification can be extracted by the key engine 905 and written to the key buffer 902. A 'key' can consist of two parts. In one implementation, the first eight bytes of the key are constructed either from the contents of the notification for the packet, or built from intermediate results of route lookups. The remaining bytes of the key, which are variable in length up to 41 bytes, are those extracted from the payload of the packet. In one implementation, key buffer 902 is a 64 byte buffer, physically located in the first 8 double words in the key engine's memory (not shown). Fixed data is stored in bytes 0-7 of the buffer while the variable key data is stored in bytes 8 and beyond.

The first 2 bytes of the key buffer are used as an overwrite area; various intermediate next hops may write data in this area to be accessed by subsequent lookup stages. These two bytes are initialized to zero. The first 4 bits of the second word are also used as an overwrite area for sampling indications. Sampling refers to a process of forwarding a copy of a packet to an external system for processing. A packet that is designated to be sampled is switched by the router as defined in the notification, but a copy of the packet (or portion of the packet) is created and forwarded to a system for further processing. The lookup process executed by the route lookup engine may include the designation of a packet for sampling. The further processing can include a management function that can be provided either on or, more typically, off the router. Packets can be designated to be forwarded to the management function for analysis. For example, a sampling of all of the packets that are from a particular source can be sent to the management function for further analysis. The sampling bits can be set to designate a packet as requiring further processing. In this way, when the (result) notification for the packet is processed, a copy of the packet (or portion of the packet) can be forwarded to the management function for further analysis. The sampling bits can be set and modified in the lookup process. As such, whether a particular packet is a candidate for a sampling operation can be decided based on a lookup result. In one implementation, the low order bit (sn[0]) is initialized to the value of an incoming sampling (SN) bit in the notification from the input switch, and the other three bits are initialized to zero. In this way, a device upstream from the controller (e.g., the input switch or the multifunction multiport) can designate some of the packets for sampling. In one implementation, the sampling bits are a mask for a predefined number of sampling operations. That is, the setting of a bit in the sample bits indicates a sampling operation to be performed. Alternatively, the sampling bits can be a set to indicate that a particular packet is a candidate for sampling. The decision as to whether or not the candidate is actually sampled can be made outside the lookup engine based on a programmable probability algorithm.

As various algorithms process the key, the key buffer can be used to communicate from one processing step to another. More specifically, the key buffer can include one or more rewrite bytes. The rewrite bytes form a data area that can be used by one processing step in a lookup (one lookup operation) to directly pass data to another processing step. In one implementation, key buffer 902 includes 2 rewrite bytes.

In one implementation, the format of the fixed and variable areas in the key buffer 902 is as shown in Table 1-1.

TABLE 1-1

Key Buffer Format

| 31 30 | 29 28 27 26 25 24 | 23 22 21 20 19 18 17 16 | 15 14 13 12 11 10 9 8 | 7 6 5 4 3 2 1 0 |
|---|---|---|---|---|
| rewrite1 | | rewrite0 | packet length | |
| sample sn [3:0] | TTE TCP QQ10 OP | 0 | 0 | incoming interface index |
| variable length key extracted from packet . . . | | | | |
| . . . | | | | |

Associated with key buffer 902 is the current key pointer 908 that points to the location in the key buffer 902 that should be treated as the beginning of the key in the current processing step. The current key pointer 908 can be moved from field to field in the key buffer 902 for different lookups that are chained together. By default, at the start of a lookup, the current key pointer points to the start of the variable length key. The current key pointer 908 is maintained by key engine 905.

The key engine 905 stores the result of packet processing which is information on how the packet should be forwarded in the result buffer 904. When multiple lookups are performed for the same packet, the result may be modified at the end of each lookup. The contents of the result buffer 904 at the end of the last lookup for a packet is the final result. In one implementation, the contents of the result buffer are as shown in Table 1-2.

TABLE 1-2

Result Buffer Format

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| next_hop_index | | | | | | | | | | | | dest_mask | | | | | | | | | | | | | n | 0 | s_x | x | s_PR | PR | | where:
- n=next hop set bit. If n is 1, some next hop has caused the next hop index and destination mask (dest_mask) fields to be set. If n is zero the next hop has not been set and the dest_mask is effectively zero.
- s_PR=priority set bit. Defaults to zero. If s_PR is 1, some next hop has caused the PR bits to be overwritten.
- PR=the priority bits. Set by default to the priority bits in the incoming notification. May be modified by next hops with the s_PR bit set.
- $s_x$='x' set bit. Defaults to zero. If s_x is 1, some next hop has caused the 'x' bit to be overwritten.
- x='extra' bit. Set by default to the P[2] bit in the incoming notification. May be modified by next hops with the s_x bit set.

Starting hop table 910 includes starting hops for each packet type. The starting hop table 920 can be shared by all of the route lookup engines 110 in controller 106. Entries in the starting hop table 920 can be of the form of a final next hop or an intermediate next hop. Next hop data structures and the processing of next hops are described in greater detail below.

c) Packet Processing

Packets are processed in accordance with a next hop instruction. A next hop is a data structure stored in memory that either contains the final result of packet processing for a packet or acts as a link to another lookup for the same packet. The key engine 905 receives a next hop instruction, and either processes the instruction directly, or invokes a specialized engine within the route lookup engine to process the next hop. A "final next hop" contains information on the final destination of the packet. An "intermediate next hop" is a link to the next lookup step and contains a command specifying the lookup algorithm type, a memory address pointer to the beginning of the lookup data structure, and an optional pointer offset for moving the current key pointer to a different key buffer field. An "extended next hop" is a special type of intermediate next hop that contains a memory address pointer to a list of instructions (more than one next hop can be pointing to the same list). These instructions specify whether to modify certain fields in the key buffer and may place lookup results in the result buffer. The list can end with an intermediate next hop, a final next hop or without a next hop (where no next hop is specified, the lookup process ends and the current contents of the result buffer are used as the result). A "starting next hop" is the next hop specifying the first lookup step for a packet and is either of the form of a final next hop or an intermediate next hop. Starting next hops are stored in the starting hop table 910. The data structure for the next hops is described in greater detail below.

Figure 10:
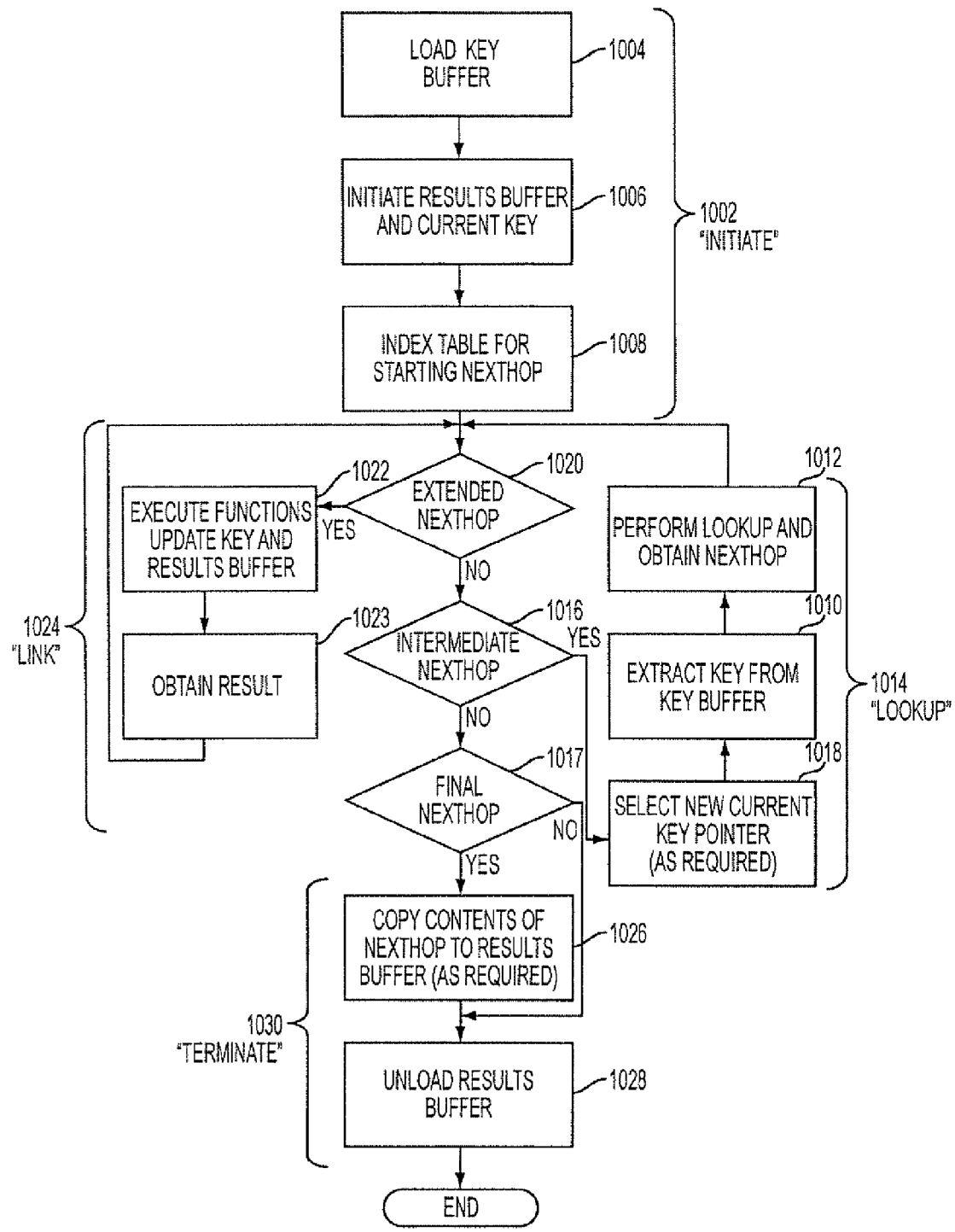
FIG. 10 shows a packet processing operation.

Referring now to FIGS. 9 and 10, a method 1000 for packet processing is shown. Packets are processed by the key engine 905 in four steps: initiate, lookup, link, and terminate.

In the initiate step 1002, the key buffer 902 is loaded with pre-selected fields from the notification 1004. The result buffer 904 and current key pointer 908 are initialized to a default values 1006. A pre-selected field from the packet is then used to index the starting hop table 910 1008. Different starting next hops correspond to independent packet processing paths. The protocol type of a packet can be used as the index for selecting the "starting next hop" so that each protocol can be processed in different ways.

Once the starting next hop is obtained, the link portion 1024 of the process begins. The link portion 1024 of the process includes three checks. Each of the checks evaluates a current next hop. By current next hop we refer to either the starting next hop, intermediate next hop returned from a lookup operation or a result returned after processing an extended next hop. First, a check is made to determine if the current next hop (the starting next hop, intermediate next hop or result) is an extended next hop 1020. If the next hop is an extended next hop, then the function specified by the extended next hop (e.g., policing, sampling, counting or other function) is executed 1022. The contents of the key buffer and the result buffer may be modified before the next lookup step is performed. By allowing the modification of the contents of the key buffer 902, a subsequent lookup operation can use the results from an earlier lookup step as part of its key. By allowing the modification of the contents of the result buffer 904, intermediate results can be stored. If not modified by a subsequent lookup step, the intermediate result, or some fields from it, may eventually form the final result. At the completion of the execution of the associated function and the modification of the buffers, a result is returned (1023). The result can be in the form of a next hop. Thereafter, the process continues back at step 1020.

In the second check of the link portion 1024, the current next hop is evaluated to determine if it is of the form of an intermediate next hop 1016. The check can be performed after the first check performed in step 1020 fails (i.e., the current next hop is not an extended next hop). If the current next hop is an intermediate next hop, then the process continues at step 1018 where the current key pointer is set to the location specified by the intermediate next hop and a lookup is performed on the packet. The intermediate next hop acts as a link between two lookups. The intermediate next hop specifies the type of the next lookup (e.g., lookup engine 906 to invoke), the memory location of the lookup data structure (e.g. index table, jtree, firewall filter program), and the new location of the current key pointer 908.

After the current key pointer is set to the new location in step 1018 (as required), the lookup portion 1014 of the process is invoked. In one implementation, the lookup portion can include the invocation of one or more specialized engines in the route lookup engine 110. In the lookup portion 1014, the key (or portion of the key or other notification data) to be operated on is extracted from the key buffer (1010) and a specified lookup operation is executed (1012). The lookup operation may go on for any number of clock cycles and any number of memory references until a result, in the form of a next hop, is obtained 1012. Thereafter, the process continues at step 1020.

If the current next hop returned is not an intermediate next hop, the third check of the link process 1024 is invoked. More specifically, if the check in step 1016 determines that the current next hop is not an intermediate next hop, then a check is made to determine if the current next hop is a final next hop (1017). This completes the linking portion 1024.

After the check in step 1017 is performed the terminate portion 1030 of the process is invoked. In the terminate portion, packet processing for the current packet is terminated and a result is returned. More specifically, if the current next hop is not a final next hop the process continues at step 1028. If the current next hop is a final next hop, then the process continues at step 1026 where any information in the current next hop relating to the final destination of the packet can be copied into the appropriate fields in the result buffer (1026), as required. The contents of the result buffer is then unloaded (1028) and used to forward the current packet through the router. Thereafter the process ends.

d) Processing Algorithms

The basic routing in a IP (internet protocol) network is done based on a longest match lookup on a field of bits in the packet header. To enhance this routing and make it more intelligent, the system adds processing features to be able to filter the packets based on some fields in the packet header. Enhancements have been added to allow some accounting ability and by also providing flow control based on a policing engine.

Packet processing includes processing the fields of a packet header, sometimes also known as a key, to perform the required functions like route lookup, filtering or flow policing. Key information for a packet can be processed using several different algorithms to generate a resultant notification (result) which is then used to forward the data packet appropriately.

In one implementation, three base algorithms can be selected from for packet processing and include an index table lookup, variable length best match lookup (i.e., a jtree lookup) and a firewall lookup. Each of the algorithms uses a next hop data structure to initiate processing. At the end of each processing step (after invoking an algorithm to operate on a designated portion of the key or executing a specified function) the result is also a data structure in the form of a next hop. Based on the variety of nexthops one can initiate new processing steps or end the overall packet processing function. The next hops thus form the primary data structure that can be used to initiate a lookup, chain different lookups and terminate a lookup. In addition, the next hop data structure also include provisions for supporting a variety of added features like packet counting, packet sampling and flow based policing of packets.

1) Index Engine

An index table lookup is performed by invoking the index engine 906c to extract the specified bits of index from the key and add the specified bits to a base pointer to compute the address of a next hop to read (see below for next hop data structure). Associated with the index engine 906c are one or more index tables 916 stored in a memory 920. Memory 920 includes the various data structures operated on by the various engines in the route lookup engine 110. In one implementation, memory 920 is separate from the route lookup engine 110 and can be accessed through a memory interface 911. In the implementation shown, memory 920 includes a single index table 916 but plural index tables can be included in memory 920. The key engine 905 reads a current next hop, and if the lookup calls for an index search, invokes the index engine 906c to perform an index lookup on a specified index table 916. An index search next hop includes a designator for the position in the key to use in the index search and the index table 916 to use.

In one implementation, an index table 916 includes a variable number of doublewords (at least one) and has a starting address located at a doubleword boundary. The first word of the index table 916 contains the table size and description of the location (relative to the current key pointer) and number of the key bits to be extracted as an index. The second word of the index table 916 holds the default next hop, which is read if the index exceeds the size of the index table 916. The base address of the index table 916, to which the index is added to compute an address to read if no overflow occurs, is implicitly the address of the third word (i.e. second doubleword) of the table. Each entry in an index table 916 includes a one word 'next hop'. The memory allocation for routes is rounded up to a doubleword boundary, but otherwise is the minimum necessary to hold the route information. An index table 916 can be defined to be a multiple of two words long in contiguous memory. In one implementation, the format of the start of an index table is shown in Table 1-3.

TABLE 1-3

Index Table Format

| 31 30 29 28 27 26 25 24 23 22 21 20 19 18 17 16 15 14 13 12 11 10 | 9 8 7 6 5 4 3 2 1 0 |
|---|---|
| table size in doublewords | dont care | i_off | idx_nbits |
| default next hop |||
| next hop 0 |||
| . . . ||| where:
the i_off field is a bit offset from the location of the current key pointer to the first bit of the index. The value can be set to 0-7 inclusive, which allows the start of the index to be anywhere in the byte the current key pointer points to.
the idx_nbits field indicates the number of bits that should be extracted to form the index. Valid values are 0-22 inclusive. A value of 0 in this field causes the default next hop to be unconditionally read. A value larger than 22 is invalid and causes the notification to be discarded.
The number of pairs of next hops in the table (exclusive of the default next hop) is indicated by the table size field. If the index extracted is index[21:0], the address of the (descriptor word of the) index table is table_address, and the table size in doublewords is table_descriptor[31:11], the address from which the next hop result is extracted is computed as:
if (index[21:1]>=table_description[31:11]) then
next_hop_address=table_address+1;
else
next_hop_address=table_address+2+index.

2) Trie Search Engine (i.e., Variable Length Best Match Lookup)

If the current next hop indicates a tree based search is to be performed, the key engine 905 invokes the trie search engine 906d to perform a lookup operation that includes a longest match lookup traversing a radix trie data structure (referred to herein as a "jtree"). The search is based on the specified number of bits at a particular starting point in the key buffer. The process for performing the longest best match lookup is described in greater detail in copending application "Separation of Data and Control in a Switching Device". The result of the longest match lookup of the key bits is a next hop. More specifically, a route in a jtree consists of a one word 'next hop', at a double-word aligned memory location, followed by zero or more words of prefix information. One or more jtrees 914 are stored in memory 920. A next hop specifying a jtree search includes identifying information for the particular jtree to be searched. The storage of a jtree in memory 920 is described in greater detail in "Separation of Data and Control in a Switching Device".

3) Firewall Engine

The firewall engine 906*a* is an instruction-based, protocol-independent match engine which operates on data in the key buffer. When a next hop specifies a firewall lookup, the key engine 905 invokes the firewall engine 906*a* which in turn retrieves a firewall filter program from memory 920. The program includes a stream of one or more instructions that can be executed to perform the requested firewall services. Most instructions are 'match' instructions, that is, the instruction takes some data from the key buffer and matches it to the instruction's operands. A 'true' match causes the next instruction in the stream to be executed, a 'false' match causes a forward branch to be taken. A byte index to the data item in the key buffer to be matched, and an offset for the branch forward, is included in the instruction word. The match data is included in the operands.

The other instruction type is an 'action' instruction. Action instructions may carry some fields unique to the instruction in the remainder of the 32-bit word, but typically don't have operands. Some action instructions terminate the search and indicate the result to return in the form of a next hop structure. The firewall engine 906*a* and firewall filter programs are described in greater detail below.

e) Next Hop

There are several 'next hop' formats. One of these is a "final" next hop, which terminates the search and contains a final result for the lookup. The others are "intermediate" next hops, which indicate how a further search should be performed.

1) Final Next Hop

In one implementation, bit 10 of the next hop is the 'final' bit. If the final bit is set, the next hop is in 'final' format, otherwise it is one of the 'intermediate' formats. In one implementation, the format for a final hop is as shown in Table 1-4.

TABLE 1-4

Final Next Hop Format

| 31 30 29 28 27 26 25 24 23 22 21 20 19 18 17 16 15 14 13 12 11 | 10 | 9 | 8 | 7 6 | 5 | 4 | 3 2 1 0 |
|---|---|---|---|---|---|---|---|
| next hop index | x | a | s | PR | f | m | dest_mask | where:

f=final bit. set to 1 for final next hops, set to 0 otherwise m=multicast bit. If set, and if this next hop is attached to a route in a jtree, a 14-bit 'interface index' is appended to the route prefix data which must be matched against the incoming interface index in the key buffer. If there is a mismatch the packet is discarded. The m-bit is ignored in index table lookups.

a=accounting bit. If set, and if this next hop is attached to a route in a jtree, a three word packet+byte counter pair is appended to the prefix (and multicast interface index, if present) data. These counters must be incremented to account for packets and bytes matching this route. This bit is ignored in index table lookups.

s=set bit for the x and PR bits. If 's' is 1, x and PR are copied into the corresponding fields in the result buffer. If 's' is 0, x and PR in the result buffer remain unchanged. The outgoing notification will have the final values of x and PR in the result buffer. Note that {x, PR} in the result buffer default to the incoming priority bits {P[2], P[1:0]}, so the outgoing notification will have the incoming priority bits if no next hop modifies them.

PR=new priority bits. If 's' is 1, the corresponding field in the result buffer will be overwritten by PR. As a result, the outgoing notification will have these new priority bits. The priority bits are not changed if 's' is 0.

x=new 'extra' bit. If 's' is 1, the corresponding field in the result buffer will be overwritten by 'x'. As a result, the outgoing notification will have this new 'x' bit. 'X' bit is not changed if 's' is 0. The hardware picks up this 'x' bit and forwards it to the output port.

the destination mask (dest_mask) field is a 9-bit mask indicating where the packet should be forwarded to. Bits 0 through 7, when set, indicate that the packet should be sent to physical banks 0 through 7, inclusive. When bit 8 is set the packet is locally destined.

the 'next hop index' is a 16-bit value used by other parts of the forwarding system to determine outgoing processing of the packet.

The execution of the final next hop causes the destination mask and next hop index fields to be copied into the result buffer. The lookup process then ends and key engine 905 uploads the latest results in the result buffer including forming an outgoing notification that includes the results. In one implementation, packet filtering (filtering or policing) can be performed based on the data included in the final next hop. For example, in one implementation, if the destination mask in the result buffer is set to a value of 9'h0 at the end of a lookup, the packet is discarded and a discard counter (CF_D-BR_CNTR) is incremented. Final next hops cause the lookup to end, so final next hops with dest_mask=9'h0 will always cause the packet to be dropped.

2) Intermediate Next Hops

All other next hops are 'intermediate format' next hops (hereinafter, intermediate next hop). Intermediate next hops can be chained to allow for plural lookup operations to be performed on a single packet. For example, a packet can be filtered, subject to a jtree lookup to determine a route, then subsequently filtered again prior to determining a final routing decision. The three lookup operations (filter, jtree search, filter) can be specified by chaining next hops. The process for chaining next hops is described in greater detail below. One implementation for the format of an intermediate next hop is as shown in Table 1-5.

TABLE 1-5

Intermediate Next Hop Format

| 31 30 29 28 27 26 25 24 23 22 21 20 19 18 17 16 15 14 13 12 11 | 10 | 9 8 7 6 5 4 3 2 | 1 0 |
|---|---|---|---|
|  | 0 |  | Fid | where fid is the format identifier (ID) for the intermediate next hop. In one implementation, there are 5 fid's including:

0—jtree lookup

1—firewall/index table lookup

2—jtree/index table ID lookup

3—multiple next hops

4—extended next hop

In one implementation, if an undefined intermediate next hop (e.g., fid=3'h5, 3'h6, 3'h7) is encountered, the lookup will end immediately, the packet is dropped, and a discard counter (CF_DBSFT_CNTR counter) is incremented.

a) Jtree Lookup Intermediate Next Hop (fid=0)

In one implementation, a jtree lookup has an intermediate next hop format as is shown in Table 1-6.

TABLE 1-6

Jtree Lookup Intermediate next hop format

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| 8-byte double-word memory address | 0 | R | 000 | byte_offset | where:
- bits [31:6] of the next hop, with bits [5:0] hardwired to zero, is a tree pointer to the root of a jtree to be searched,
- the byte_offset is the offset to change the current key pointer by. The value of the byte_offset field is added to the current key pointer modulus 64. That is, a byte_offset of 0 will keep the current key pointer unchanged, a byte_offset of 1 would move the current key pointer to the right (i.e. forward) one byte in the key, and a byte_offset of 63 would move the current key pointer one byte left (i.e. backward) in the key. If the current key pointer is moved to a location beyond the end of the key delivered from the input switch, an error occurs (equivalent to a truncated key error when doing tree lookups). The packet is dropped, and a discard counter (CF_DTK_CNTR discard counter) is incremented.

b) Firewall/Index Table Lookup Intermediate Next Hop (fid=1)

In one implementation, a firewall/index table lookup has a next hop format as is shown in Table 1-7.

TABLE 1-7

Firewall/Index Table Intermediate Next Hop Format

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| 8-byte double-word memory address | 0 | i | 001 | byte_offset | where:
- i=index table bit. If this bit is 1, the next lookup to be done is an index table lookup. If this bit is 0 the next lookup to be done is a firewall filter program.
- bits [31:10] of the next hop is the word address of the first word of the firewall filter program or index table, depending on the setting of the 'i' bit.
- the byte_offset is the offset to change the current key pointer by.

c) Jtree/Index Table ID Lookup (fid=2)

In one implementation, a jtree/index table ID lookup has a next hop format as is shown in Table 1-8.

TABLE 1-8

Jtree/Index Table ID Intermediate Next Hop Format

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| rewrite byte | r b | o | S_x | X | s_PR | PR | Byte_offset | 0 | i | 010 | table_id | where:
- i=index table lookup. If the 'i' bit is set to 1, the lookup that is done next is an index table lookup. The table_id refers to the entry in the 64-entry on-chip index table directory from which to get the index table descriptor and start the lookup. If the 'i' bit is set to zero, the lookup that is done next is a jtree lookup. The table_id refers to the on-chip jump (for table_id 0 or 1 and jump table enabled) or tid table (table_id 2 to 63 or jump table not enabled) entry from which to start the lookup.
- table_id is a 6 bit index. If the 'i' bit is set to 1, table_id is the index table descriptor pointing to the index table into which the search will be continued. If the 'i' bit is set to zero, table_id is the jtree root pointer pointing to the tree into which the search will be continued.
- byte_offset is the offset to the current key pointer (i.e. as in the fid=0 intermediate next hop above).
- s_x=set bit for the 'x' bit. If s_x is 1, 'x' is copied into the corresponding field in the result buffer. If s_x is 0, 'x' in the result buffer remains unchanged.
- x=extra bit. Copied into the corresponding field in the result buffer if s_x is set.
- s_PR=set bit for the PR bits. If s_PR is 1, PR is copied into the corresponding field in the result buffer. If s_PR is 0, PR in the result buffer remains unchanged.
- PR=the priority bits. Copied into the corresponding field in the result buffer if s_PR is set.
- o=set bit for the rewrite field. If 'o' is 1, the rewrite byte in location [31:24] is copied into one of the first 2 bytes of the key, with the rb (i.e. rewrite byte) field specifying which byte is rewritten.
- rb=specifies whether rewrite byte 0 (rb=0) or rewrite byte 1 (rb=1) should be overwritten if the 'o' bit is set.

The rewrite, x, and PR updates take effect before the jtree or index table ID lookup begin. For example, if {rb, o}={1, 1}, and byte_offset moves the current key pointer to point to rewrite1, the key buffer is updated with the new rewrite byte in the next hop, and then the fid=2 lookup is performed using the new rewrite byte value as the key.

d) Multiple Next Hop Intermediate Next Hop (fid=3)

A multiple next hop can be used to perform load balancing operations. Multiple next hops can be designated to alleviate loading conditions for any particular hop. In one implementation, the multiple next hops are listed, and a selection can be made based on loading or other considerations. In one implementation, the router can be configured for a balanced, unbalanced or incoming interface mode of operation.

In balanced mode, the particular next hop is randomly selected from the designated group of next hop candidates. In one implementation, the selection is made by taking a hash of the key and based on the hashed value, assigning the packet to a particular one of the candidate next hops. Alternatively, the selection can be made by selecting a random number or by pseudo random means that take into account history or other considerations in making the determination.

In unbalanced mode, weights can be assigned to individual candidate next hops, and a weight affected decision can be made to select a next hop from the candidate next hops. The weights can be assigned to support certain quality of service or priority service considerations.

The incoming interface mode can be used to screen packets depending on the type of next hop being processed. A multiple next hop includes a list that specifies candidate hops. The incoming interface mode can be used to select among the candidates. More specifically, if the incoming interface designator for a packet matches the incoming interface designator associated with a determined route, a first next hop in the multiple next hop list is selected as the next hop to be used in forwarding the packet. If the designators do not match, the second entry in the list can be selected as the next hop to be used in forwarding the packet. For all other next hop types, if the match bit (m-bit described below) is set and no match is detected, then the packet can be dropped and an appropriate discard counter can be set.

One implementation of a multiple next hop format is as shown in Table 1-9.

TABLE 1-9

Multiple Next Hop Intermediate Next Hop Format

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 8-byte double-word memory address | | | | | | | | | | | | | | | | | | | | | | 0 | m | 011 | | a | h | #hops | | | | where:
   m=multicast bit. If set, and if this next hop is attached to a route in a jtree, a 14-bit 'interface index' is appended to the route prefix data which must be matched against the incoming interface index in the key buffer. If there is a mismatch the packet is discarded unless the 'h' bit is set (see below). The m-bit is ignored in index table lookups.
   a=accounting bit. If set, and if this next hop is attached to a route in a jtree, a three word packet+byte counter pair is appended to the prefix (and multicast interface index, if present) data. These counters must be incremented to account for packets and bytes matching this route. The a-bit is ignored in index table lookups.
   bits [31:10] of the next hop form the memory address of the first entry in a list of next hops for this route, any of which may be used to forward the packet.
   #hops has a value between 1 and 15 inclusive, or 0. If the value is 0, the number of next hops is 16, otherwise the number of next hops is #hops. If #hops is 1, there is only 1 next hop, so the hardware will always choose the same next hop, regardless of the mode or the hash value.
   h=hash bit. Along with the 'm' bit, indicates how the hash value is reduced to the index of a next hop in the list. The modes can be selected from a balanced mode (m=X and h=0), an unbalanced mode (m=0 and h=1) and an incoming interface mode (iif mode) (m=1 and h=1). If the multiple next hop is read from a data structure that does not support multicast, the m-bit is interpreted as 0 even if it is set. For example, if a multiple next hop with {m, h}={1, 1} is read from an index table, unbalanced mode processing is performed, not iif mode. In the iif mode, there must be at least 2 next hops in the multiple next hops list.

e) Extended Next Hop Intermediate Next Hop (fid=4)

The extended next hop format allows the lookup process to implement one or more functions. Associated with an extended next hop is a extended next hop list that includes one or more functions to be executed. The functions can include policing operations. One implementation for an extended next hop format is as shown in Table 1-10.

TABLE 1-10

Extended Next Hop Intermediate Next Hop Format

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 8-byte double-word memory address | | | | | | | | | | | | | | | | | | | | | | 0 | m | 100 | | a | CA | I | CI | O | F | where:
   m=multicast bit. If set, and if this next hop is attached to a route in a jtree, a 14-bit 'interface index' is appended to the route prefix data which must be matched against the incoming interface index in the key buffer. If there is a mismatch the packet is discarded. The m-bit is ignored in index table lookups.
   a=accounting bit. If set, and if this next hop is attached to a route in a jtree, a three word packet+byte counter pair is appended to the prefix (and multicast interface index, if present) data. These counters must be incremented to account for packets and bytes matching this route. The a-bit is ignored in index table lookups.
   bits [31:10] of the next hop form the memory address of the first entry in the extended next hop list. The F, O, CI, I, and CA bits determine what is located in the extended next hop list.
   F=modified final bit. If this bit is set, the word pointed to by the address contains a modified final next hop, which causes results to be set into the result register.
   O=overwrite bit. If this bit is set, the extended next hop list includes an overwrite word, which includes data to be inserted in the rewrite bytes in the key, as well as settings for the precedence bits. The overwrite next hop is included after the modified final next hop, or at the start of the list if the F bit is clear.
   CI=counter indirect bit. If set, the next hop list includes a 32-bit counter pointer. This pointer contains information about the location of a counter and its type. If present this pointer is located after the modified final and overwrite words.
   I=intermediate bit. If set, the last word entry in the list is an intermediate next hop of one of the formats described previously. If no intermediate next hop is included in the list the lookup terminates. If the I-bit is not set, the lookup terminates immediately and the outgoing notification is built based on the current results in the result buffer. Software can terminate a lookup using an extended next hop with the I-bit not set or even none of the F, O, CI, I, CA bits set. In one implementation, the I-bit can be set and a final next hop can be put in the extended next hop list. Note that the modified final next hop is for placing a lookup result in result buffer to be used when the lookup ends. For example, a result can be put in result buffer before an output filter program is run. If the packet is not dropped by firewall filter, the lookup result stored in the result buffer will be used.

CA=counter attached bit. If set, the next hop list includes an attached, standard, byte-and-packet counter. The counter is attached to the end of the list, possibly with a single pad word to align the counter to an odd-word boundary.

f) Policing

In networking systems, there is a need to be able to count the data bits in a flow (flow is a logical unit of data transmitted for one place to another). Additionally it is also useful to be able to measure the rate of the data bits (in say bits per second) and further be able to shape the data flow as per requirements. The data flows can be shaped to be capped at a maximum bandwidth usage or otherwise restricted (e.g., after a bandwidth usage has been achieved, reduce the priority of service for the flow).

A number of terms are used in this section and are defined as follows. "Data Rate" as used herein refers to the measure of data transferred in a specified duration of time and is typically measured in bits per second (bps, or Kbps, Mbps, Gbps). "Accounting" as used herein refers to the ability to count the number of bits per flow. "Rate Measure" as used herein refers to the ability to measure the data rate of a flow. "Policing" as used herein refers to the ability to measure the rate and then shape it to a specified threshold.

In conventional systems, policing operations include two steps: measurement and flow policing. For a stream of data, a conventional system needed to have a counter which keeps a count of the number of bits of data in that stream that have been transferred. Additionally, a timer was needed which was used to set a data sampling interval. Given the number of data bits and a time reference, say 100 microseconds, a conventional system could count the number of data bits in that time and multiply by, say 10000, to get a bits per second data rate measure for the stream. If there are thousands of such streams monitored by the system, a large memory may be required to store the count information for the data bits.

In the monitoring step, for each chunk of data per stream, the system would read the counter and increment it with the number of bits in a packet. So for each packet transferred for a stream, the system would need to read the memory once and write to it once. Additionally if during this continuous process of counting the bits per stream, the system needed to measure the data rate for individually policing each flow, then an additional read of a threshold-count value is required every time the data counter is updated. Furthermore, this counter ideally is cleared every time interval so that the rate can be measured over a next time interval. Thus for rate measurements to make policing decisions for a flow, an additional read (every counter update) and a write (every time interval) to memory may be required. Assuming a time interval of 100 microseconds and have 10000 streams, then there is a fixed overhead of 100 million writes to memory per second required in such a system. The actual number of reads and writes to memory for counting the data bits per stream and the read for the threshold-count value varies with the number of packets/cells transferred in a time interval for each particular stream.

In addition, the time interval and the total number of streams determine the fixed overhead required for the computations. The smaller (finer) the time interval the more accurate the rate measurement would be however the proportion of fixed overhead bandwidth also increases. The overall memory bandwidth requirement is proportional to the fixed overhead and the rate of packet/cell transfers in the system. The drawbacks of this type of measurement technique is that one needs a significant memory bandwidth overhead. This requirement grows as the time interval reduces and the number of streams increases. The number of accesses required to count the data bits per packet/cell for each stream depends on the number of packets/cells transferred. This is very difficult to predict and thus any technique used for data rate computations will need to adapt to this need.

In the present system, a new approach is proposed. The approach is based on the observation that for policing a flow a system needs to make a memory reference to update the counts every time a packet/cell flows thru the device (i.e. router, switch). In a relatively busy system, where memory accesses are precious, the assumption is that in a set time interval there is a very high probability that each stream would have at least one packet/cell transfer per unit time interval. In such an environment the goal is to be able to compute the data bits, data rate and make a decision on policing each flow in a burst read and write operation to memory without the need for any global overhead to clear all the counters each time interval. This can be accomplished by saving (in memory) the last access time (referred to herein as last adjustment time) together with the data bit count for every flow. The policing decision can be made by computing how many bits of data are allowed in the time interval between the arrival of two packets belonging to the same flow, triggering access to the same counter.

More specifically, a policing function can be implemented as part of a lookup chain by designating an intermediate next hop that includes an extended next hop format having a list that includes a counter function. The counter can be updated by the policing engine as described below. Depending on the updates, policing decisions can be made on a packet by packet basis. A single burst read operation can be performed to read all of the data required to make the policing decision [the threshold count value (credit_limit), the data counter value (current_credit), the last time updated (last_adjustment_time), the amount to be updated per unit time (time_credit)].

The last time updated reflects the time of arrival of the last packet received for a given flow. A single burst write operation is performed to update the counter with a new count value and the time of arrival for the last packet processed. In the present system, the counters are not updated at a fixed time interval, and instead are updated only when traffic is received in the given flow. The burst operations result in a large savings on memory bandwidth in the system.

In one implementation, the format for a policing counter for use in an extended next hop is shown in Table 1-11.

TABLE 1-11

Policing Counter Format

| 31 30 29 28 27 26 25 24 23 22 21 20 | 19 18 17 16 15 14 13 12 11 10 | 9 8 7 6 5 4 3 2 1 0 |
|---|---|---|
| (double word aligned address) unused pad word ||| 
| out-of-spec packet counter |||
| credit_limit | current_credit ||
| time_credit | last-adjustment_time || where:
last_adjustment_time indicates the last time this policing counter was incremented. The timestamp is referenced to one of two on-chip global time counters, with the particular counter selected by the setting of the 'r' bit in the counter pointer data structure pointed to by an extended next hop. In one implementation, the high rate policing counter increments once every 8.192 us, the low rate every 262.144 us.
time_credit indicates the amount of credit this counter receives per time increment. The units are as specified in the counter-pointer units field.
credit_limit indicates the limit to which the current_credit field is allowed to increase. Units are as specified in the counter-pointer units field, times 16.
current_credit indicates the amount of credit currently accumulated.

An algorithm for updating the counter is as follows. The algorithm can be executed by the policing engine 906*b* in the route lookup engine 110. The policing engine 906*b* receives packet length from the notification, and rate and units information from the key engine 905. The packet length is first adjusted by rounding to units specified in the counter pointer data structure pointed to by an extended next hop, i.e.

```
if (units==2'b00) {
    adj_packet_length=packet_length;
} else if (units=2'b01) {
    adj_packet_length=(packet_length+2)>>2;
} else if (units 2'b10) {
    adj_packet_length=(packet_length+8)>>4;
} else {
    adj_packet_length=(packet_length+32)>>6;
}
```

The adjustment can be performed before the first word of the counter is read. When the first word of the counter is read, then the new credit is computed based on the last adjustment time and the current time, where the latter is selected by the rate bit. The new credit computation is defined by: new_credit=time_credit*(current_time−last_adjustment_time). In this implementation, the new credit value gets the lower 18 bits of the result of the multiplication. If the upper 14 bits of the result are non-zero then the notification is considered to be within specification and the current credit value is updated with the credit limit rather than the equation below. If the upper 14 bits are zero then the computations below should be performed to check if the notification will be out of specification and how the data structure needs to be updated.

When the second word arrives the boolean policing result can be computed as: out_of_spec=(adj_packet_length>(current_credit+new_credit)); where the add must maintain 19 bit precision. The values written back to the locations in the counter are:
time_credit=time_credit;
last_adjustment_time=current_time;
credit_limit=credit_limit;
```
if (out_of_spec) {
    temp=current_credit+new_credit;
} else {
    temp=current_credit+new_credit−adj_packet_length;
}
```
current_credit=min({credit_limit, 4'h0}, temp); where any out_of_spec result is returned to the key engine for packet disposal.

g) Firewall Filter

The firewall engine provides a filter by running an instruction engine over a portion of data extracted from the key buffer. For IP packets this data can include interface class, IP option flags, incoming interface, fragment offset, destination address, source address, protocol, source port, destination port and tcp flags.

A filter program includes a stream of instructions. The filter program is produced by a user and subsequently compiled to form executable instructions that are stored in a memory (i.e., memory 920 of FIG. 9). The filter is executed by a firewall engine (i.e., firewall engine 906*a*) in accordance with the processing of a next hop. In one implementation, the user can create a filter program using two basic types of instructions: match instructions and action instructions. Each basic instruction has a value to compare to a data quantity, and occasionally a mask (defaults to 0) to bit-fiddle the data before comparison. The match instructions are described in greater detail below. A branch can be taken when the comparison is true or false.

Each (logical) interface family (i.e., incoming interface in the routing device) may (or may not) have a filter program designated for incoming packets, a separate filter program for outgoing packets, and a configurable 'interface class' byte for use in choosing output filters based on the incoming interface for a packet.

The structure of a filter program is as follows. Each filter program includes a set of rules. Each rule has a set of zero or more match conditions, and an action which is taken if all match conditions are true. Rules are logically executed in the order they appear in the filter, with the action of the first matching rule being executed.

An example of an IP packet filter produced by a user is shown in Table 1-12 below.

TABLE 1-12

IP Filter

```
filter 3 ip {
    rule 5 {
        protocol udp,50-82 ;
        action count accept ;
    }
    rule 10 {
        protocol tcp,udp,50-82 ;
        source-port 7-64,512-777 ;
        destination-port 121-153 ;
        options lsrr|ssrr ;
        from 192.168/17 ;
        to 128.100/16 ;
        tcp-flags (syn & !ack)          #same as 'setup'
            | (rst | ack);# same as 'established'
        fragment-flags (df | mf);        # also 'dont-fragment'
                                         # and 'more-fragments'
```

TABLE 1-12-continued

IP Filter

```
    fragment-offset 1-8191;      # same as 'fragment'
    action count log reject host;
  }
  rule 20 {
    protocol icmp;
    icmptype 1-52;
    action discard;
  }
  rule 30 {
    action accept count;
  }
}
```

Rule numbering is provided to allow the user to identify either a rule itself (for modifications), or its relative ordering with respect to other rules (for additions).

In one implementation, matches can be of plural kinds. Matches on numeric fields (e.g. protocol, port numbers, fragment offset, icmp type) can specify a separate list of numeric ranges. Matches on bit fields (e.g. tcpflags, options, fragment-flags) can specify a set of bits combined with boolean operators. Matches on addresses are used to match prefixes. Some match conditions can have abbreviations (e.g. 'established' for 'tcp-flags rstlack').

The result of a successful match is to take the 'action'. The action may be one of 'accept', 'discard' or 'reject', with modifiers 'count' and/or 'log'. 'Count' counts the number of matches for a given rule, while 'log' can be used to sample a packet for further processing. The log action can include the setting of sample bits in the result buffer. The setting of sample bits can result in the copying of a packet to an external processor for evaluation in addition to the routing of the packet to its intended destination. Sampling is described in greater detail above.

Each filter program is provided to a compiler. The compiler can be separate from the route lookup engine. The compiler generates the final instructions which can be executed by the firewall engine. The firewall engine can be implemented in a software or hardware engine.

The compiler compiles each rule in the order it appears in the filter program, but can be configured to change the ordering of match condition evaluations to suit its own purposes. The compiler evaluates the match conditions one by one in the order it has decided upon, branching forward into another rule when a match evaluates false. When a match is found false, however, the filter engine knows that (1) all prior match conditions in the rule were true, while (2) the failing match condition was false. The compiler can reorganize the match order to make use of this type of information. For example, the compiler can skip over any immediately subsequent rules that cannot match (i.e. if 'protocol tcp;' fails, all subsequent rules with 'protocol tcp;' will also fail and may be skipped) and as far into the list of match conditions to a first feasible subsequent rule. The compiler can then remove dead match conditions before compiling to instruction code. This skip over feature allows the compiler to generate better instruction variants. For example, a set of rules with identical match conditions except for the source prefix, for example, can be compiled into a single evaluation of the common match conditions plus a tree lookup on the source address.

1. Instructions

As described above, the firewall engine is an instruction-based, protocol-independent match engine inside each route lookup engine that operates on the data in the 64-byte key buffer. In one implementation, each 'instruction' is a 4-byte quantity followed by zero or more 4-byte operands. Most instructions are 'match' instructions, that is they take some data from the key buffer and match it to their operands. A 'true' match causes the next instruction in the stream to be executed, a 'false' match causes a forward branch to be taken. A byte index to the data item in the key buffer to be matched, and an offset for the branch forward, is included in the instruction word. The match data is included in the operands. The other instruction type is an 'action' instruction. Action instructions may carry some fields unique to the instruction in the remainder of the 32-bit word, but usually don't include operands. Some action instructions terminate the search and indicate the result to return.

The firewall engine includes a current data pointer (not shown) that is a byte pointer pointing to the data in the 64-byte key buffer to be operated on by the firewall engine. The current data pointer is independent of the current key pointer used outside of firewall programs. In fact, the current key pointer remains at a fixed location during firewall program processing. When a firewall intermediate next hop (fid=1, i=0) is encountered and control is passed to the firewall engine for executing the indicated filter program, the current data pointer is initialized to the value of the current key pointer (current key pointer value is the value after adding byte offset specified in the intermediate next hop). The current data pointer is updated every time an instruction containing the data offset field is executed. The data offset is an absolute byte address, not an offset from the current value. This means that the current data pointer simply takes on the value of the data offset.

The data offset points to the data in the key buffer to be used for the current instruction (in the filter program). It is the byte offset from the beginning of the key buffer, not an offset from the current data pointer value. For instructions that do not have the data offset field, the current data offset, i.e. the current data pointer value is used as the data offset. In one implementation, the branch offsets in firewall instructions are self-referential word offsets. The firewall engine includes a program counter which keeps track of the 22-bit word address of the current instruction word being executed. The next instruction to be executed after a branch is set to be: the program counter (22-bit word addr)+1+branch offset (word offset, variable number of bits). By expressing all memory references in terms of an offset relative to the previous location read, the firewall program can be independent of the position into which it is placed in memory.

In one implementation, there are eight 'match' operations supported. The operation (op) field contains the unique operation code (opcode) indicating the type of match operation to be performed. In one implementations, each match operation is performed on 1-, 2- or 4-byte-wide data. The operation expects to operate on 'data' (that is data extracted at some offset into the key buffer), a 'value' (a value extracted from the instruction) and a 'mask' (a second value sometimes included with the instruction where the default is all-zeroes). In one implementation, the eight operations include: an equivalence operation, a greater than operation, exclusive "or", exclusive "and", non-equivalence operation, less than, exclusive "nor" and exclusive "nand" operations.

a) One-Byte Match Instructions

One-Byte Match with Mask

Byte-wide instructions are identified by a '01' in the low order bits. The first of these carries both data and a mask, but uses the current data offset.

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| byte value | byte mask | branch offset (10-bit) | op | 1 | 01 | where 'value' and 'mask' are included in the instruction and 'data' is the byte of data at the current data offset.

One-Byte Match without Mask

This second form of operation explicitly sets the data offset, but uses a default mask.

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| Byte value | branch offset (12-bit) | data offset | op | 0 | 01 | where 'value' is extracted from the instruction and 'mask' is all zeroes (by default). The current data offset is set from the instruction, and 'data' is extracted from the byte at that offset.

b) Two-Byte Match Instructions

Two-Byte Match with Mask

In a two byte match operation, the first byte match sets the data offset and both a 'value' and 'mask'. Note that the branch offset is actually an offset from the word after the second instruction word.

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| branch offset (20-bit) | data offset | op | 1 | 10 |
| short value | short mask |

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| short value | branch offset (10-bit) | op | 0 | 10 | c) Four-Byte Match Instructions

Finally, there are 4 byte instructions. For these the 'value' and 'mask' words, if any, are always appended in subsequent instructions.

Four-Byte Match without Mask

In this format, the branch offset is actually an offset from the word after the second instruction word.

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| branch offset (20-bit) | data offset | op | 0 | 11 |
| long value |

Four-Byte Match with Mask

Here the branch offset is actually an offset from the word after the third instruction word.

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| branch offset (20-bit) | data offset | op | 1 | 11 |
| long value |
| long mask | h) Action Instructions

The remaining instructions do not include a numeric match (as required by each of the matching instructions set forth above). As such, they are special instructions in the firewall instruction set.

Long Branch Instruction Format

The canonical format for a long branch instruction is:

| 3 3 2 2 2 2 2 2 2 2 2 2 1 1 1 1 1 1 1 1 1 1 9 8 7 6 5 4 3 2 1 0 |
|---|
| 1 0 9 8 7 6 5 4 3 2 1 0 9 8 7 6 5 4 3 2 1 0 |
| branch offset (22-bit) | data offset | 0 | 0 | 00 |

This instruction sets the data offset to that specified, and fetches the next instruction from 'branch offset' words past the next word. Note that setting the 'branch offset' to zero provides a method to reset the 'data offset' without branching.

Termination Action Instructions

There are 4 different regular termination instructions. They are distinguished by a field (the "res" field) in the instruction. The format for a regular termination instruction is:

res=2'b00—Discard notification. The lookup is terminated immediately and the packet is discarded. The CF_D-BR_CNTR (a 32-bit discard counter) is incremented. (If the corresponding discard diagnostic bit is set, a copy of the notification is sent to the host.) Note that the packet is discarded regardless of whether the OP or TE (TE enabled) bit is set.

res=2'b01—Send to Host. The lookup is terminated immediately and a notification is sent to the host by setting the destination mask (dest_mask=9'h100). The next_hop_index in the outgoing notification is set to the value of the next_hop_index field in the termination instruction. PR[1:0] is set to 2'b00 (i.e. low priority) regardless of its current value in the result buffer. The x field is not changed, i.e. goes out with its current result buffer value. The {rewrite, rb, o} fields in the instruction are used to modify the corresponding rewrite1 field in the key buffer which gets copied into the outgoing notification. The res=2'b01 termination can be used as a firewall "reject" instruction and the rewrite1 byte can be the "reject code".

res=2'b10—Next lookup is a jtree lookup (fid=2, i=0) in the jtree specified by table_id. Byte_offset is used to set the current key pointer for the next lookup. The {s_x, x} and {s_PR, PR} fields are used to modify the corresponding priority bits in the result register.

res=2'b11—Next lookup is an index table lookup (fid=2, i=1) in the table specified by table_id. Byte_offset is used to set the current key pointer for the next lookup. The {s_x, x} and {s_PR, PR} fields are used to modify the corresponding priority bits in the result register.

| 31 30 29 28 27 26 25 24 23 22 21 20 19 18 17 16 15 14 13 12 11 10 9 8 7 6 5 4 | 3 2 | 1 0 |
|---|---|---|
| reserved | res | 01 00 |

Regular Termination res2'b00 Instruction Format

| 31 30 29 28 27 26 25 24 23 22 21 20 19 18 17 16 15 14 13 12 11 10 | 9 8 7 6 5 4 | 3 | 2 | 1 0 |
|---|---|---|---|---|
| next_hop_index | rewrite | r b | o | res  01 00 |

Regular Termination res=2'b01 Instruction Format
where,
o=set bit for the rewrite field. If 'o' is 1, the rewrite byte in location [15:8] is copied into one of the first 2 bytes in the key buffer, with the rb (i.e. rewrite byte) field specifying which byte is rewritten.
rb=specifies whether rewrite byte 0 (rb=0) or rewrite byte 1 (rb=1) should be overwritten if the 'o' bit is set.

offset is a word offset. The CA, I, CI, O, and F bits are as in the jtree/index table extended next hop format. The extended next hop termination with the I-bit not set can be used as a firewall "accept" instruction. The outgoing notification will be built from the current contents of the result buffer. The result buffer should already have picked up the final next_hop_index and dest_mask from a route encountered before entering the output firewall filter. Note that an "accept" instruction may simply be an extended next hop termination with none of the 5 control bits set. If the I-bit is set, and the corresponding next hop in the extended next hop list is a final next hop, the result_buffer is updated and the lookup terminates normally.

An extended next hop termination instruction looks like:

| 31 30 29 28 27 26 25 24 23 22 21 20 19 18 17 16 15 14 13 12 11 10 | 9 8 7 6 5 4 3 | 2 | 1 0 |
|---|---|---|---|
| branch offset to extended next hop list (22-bit) | 0 CA I CI O F | 10 | 00 |

Tree Search Action Instructions

A tree search action instruction invokes a longest match operation on the field in the key buffer pointed to by the data offset using a jtree stored in memory 920. A tree search instruction can have the following form:

| 31 30 29 28 27 26 25 24 23 22 21 | 20 19 18 17 16 15 14 13 12 11 10 | 9 8 7 6 5 4 3 2 | 1 0 |
|---|---|---|---|
| branch offset to jtree (11-bit) | r R   bit to test | data offset | 11 00 |

Data offset sets the current data pointer prior to starting the tree search. The instruction word immediately following the word indicated by the current data pointer (can be any firewall instruction) is executed if no match is found during the tree

| 31 30 | 29 28 27 26 25 24 | 23 22 | 21 | 20 | 19 18 17 16 15 14 13 12 11 10 | 9 8 7 6 5 4 3 2 | 1 0 |
|---|---|---|---|---|---|---|---|
| rewrite1 | s_x x s_PR PR | o1 | byte_offset | table_id | res | 01 00 |

Regular Termination res2'b10, 2'b11 Instruction Format
o1=set bit for the rewrite1 field. If 'o1' is 1, the rewriter byte in location [31:24] is copied into the first byte in the key buffer.

Extended Next Hop Termination Instruction Format

An extended next hop termination instruction can invoke an extended next hop instruction set as described above. The branch offset to an extended next hop is used to compute the address of an extended next hop list. The extended next hop list is located at: program counter (22-bit word addr)+1+ branch offset to extended next hop list (22-bit word offset). Note that an extended next hop list linked to a firewall instruction may not be double word aligned because the branch lookup. No match here means the lookup falls off the top of the stack, i.e. stack underflow. The remaining fields are used to form a jtree pointer which points at the next tree node at: program counter (22-bit word addr)+1+branch offset to jtree (11-bit word offset). The jtree lookup performed is identical to a 'normal' jtree lookup, with the following exceptions. The 21-bit '8-byte double-word memory address' in any jtree pointer is a branch offset rather than an absolute address. This keeps firewall filter programs independent of memory location. The address of the next tree node is calculated like this: program counter (22-bit word addr)+1+branch offset (21-bit word offset). Note that since the tree search instruction and jtree pointers in firewall programs have branch offsets that are word offsets, tree nodes in firewall jtrees may not be double word aligned. In one implementation, multicast iif comparisons and route accounting is not done. The 'next hop' in a firewall jtree must be one of a long branch instruction, a regular termination instruction (any of the 4 res types) or an extended next hop termination instruction. The 'next hop' is restricted to these instructions because the word in memory immediately following it is the prefix. If the 'next hop' is not one of the allowed instructions, the packet is discarded as a bad software discard, and CF_DBSFT_CNTR (a 16-bit discard counter) is incremented. If a corresponding discard diagnostic bit is set, a copy of the notification is sent to the host.

Tree Search Fail Instruction

The tree search fail instruction allows firewall jtrees to have prefixes whose next hop means 'this search failed, execute the instruction after the tree search instruction'. In one implementation, the fail instruction is actually a tree search instruction. In this implementation, the free search instruction found in a firewall tree search is interpreted as a fail instruction.

i) Example of a Chained Lookup

As described above, lookups can be chained to allow for a combination of filtering and lookup operations to be invoked for each packet. An example of a chained lookup is: Index Table Lookup->Firewall Filter->Jtree Lookup->Firewall Filter. This sequence corresponds to index table lookup that is used to index a longest prefix match route lookup (jtree) with firewall filtering applied both before and after the jtree lookup. As described above, the data structures stored in memory in the lookup engine 110 include a table of "starting next hops". The starting next hop can be used to point to the first lookup operation (e.g., the index table lookup). "Intermediate Next Hops" are used to point to the subsequent lookup operations (to the first firewall filter program, one or more Jtrees for longest match prefix route lookup and one or more different firewall filter programs). The intermediate next hops are the result returned from each intermediate lookup operation.

The example above begins with a starting next hop of index table lookup type. That is, the index engine 906c is invoked to perform a lookup in an indicated index table 916. The index step points to an intermediate next hop that chooses an input firewall filter for the packet. In this example, the firewall filter could be selected based on the "incoming interface index". That is, the pointer offset field in the starting next hop moves the current key pointer to the incoming interface index field of the key. This index is used to look up the table in memory pointing to the different firewall filter programs.

The firewall filter programs are stored and associated with firewall engine 906a. The selected firewall filter program is executed by the firewall engine 906a just like a processor executing cpu instructions. Some firewall filter instructions refer to data in the key buffer to perform match operations. Depending on the contents of the packet, the program may decide to filter (drop) the packet and terminate the lookup, or it may exit and return an intermediate next hop (in this example of jtree lookup type) that updates the current key pointer (in this example to the "IP Destination Address" field of the key).

In this example, the third lookup operation is a jtree lookup. The tree search engine 906d performs a jtree lookup on the IP destination address in the key buffer to find the route with the longest matching prefix. The result is an extended next hop which contains instructions to place the final destination for the packet based on the jtree lookup result in the result buffer. This is the destination the packet should be forwarded to if the packet does not get dropped by the firewall filter in the final lookup step. The next hop returned as a result from this jtree lookup operation also contains an intermediate extended next hop of firewall filter type which points to a firewall program. The program may decide to filter (drop) the packet in which case the lookup will terminate and the packet will be dropped. If the program decides to keep the packet, the filter program will simply terminate without taking any special action. In this case, the current contents of the result buffer, which is the result of the jtree lookup in the previous step, will be used to forward the packet to its destination appropriately.

Output Switch

Figure 11:
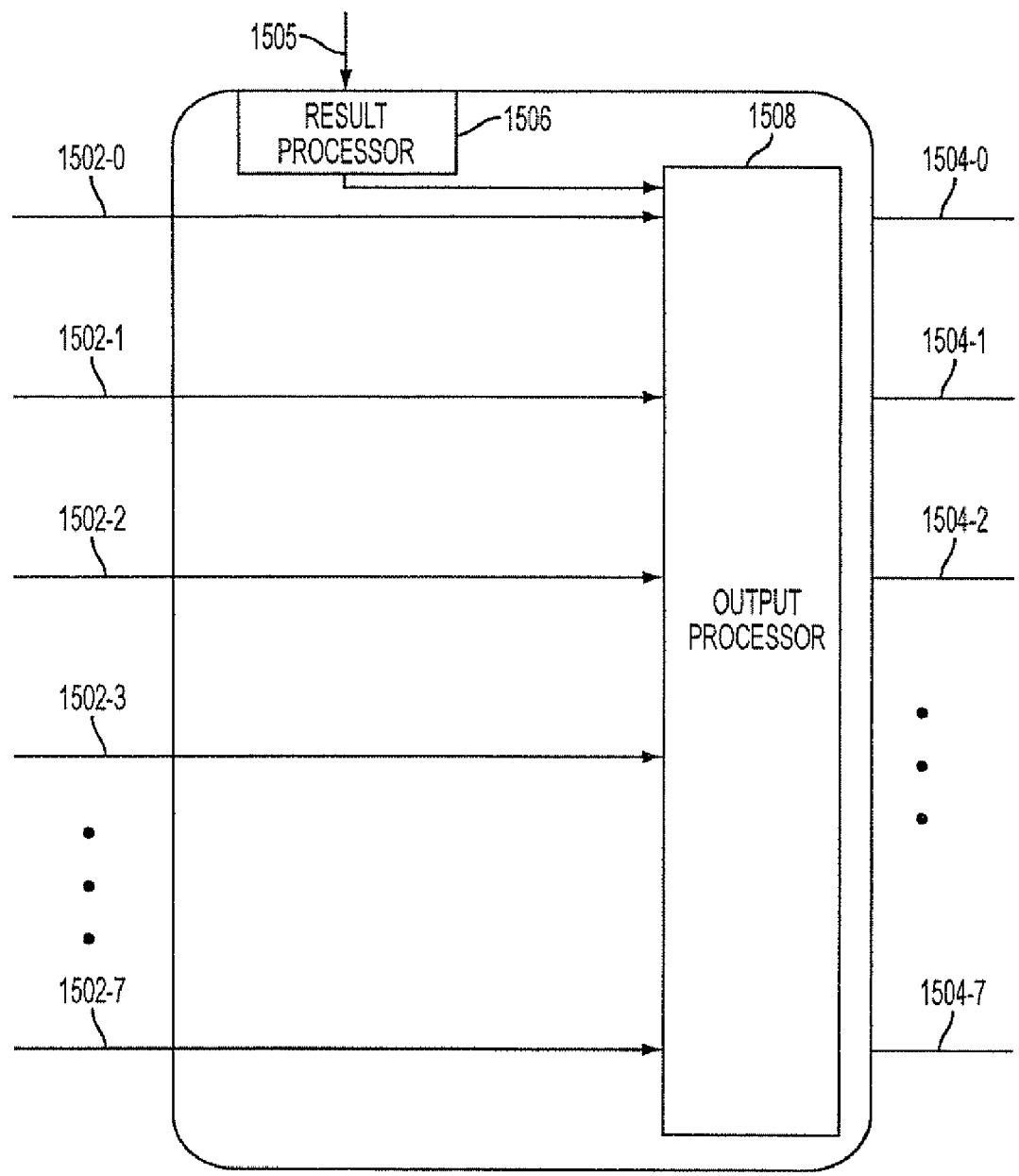
FIG. 11 is a schematic block diagram of an output switch.

Referring now to FIG. 11, output switch 102 includes a controller interface 1505, one or more memory inputs 1502 (1502-0 through 1502-7, one for each memory bank), one or more outputs 1504 (1504-0 through 1504-7, one for each multi-function multiport), a result processor 1506 and an output processor 1508. Output switch 102 performs four functions: receive output results, process output results, receive cells from memory and output cells to output ports.

a) Transfers from Memory to the Output Switch

Cells from memory are received at memory inputs 1502 and transferred to output processor 1508. Cells are transferred based on read requests received at the input switch from multi-function multiports. Each cell includes an output port identifier and cell data.

Output processor 1508 decodes the destination multi-function multiport from the cell information received from memory and transfers the cell data to the appropriate outputs 1502. At each cell slot, output switch 102 may receive a cell for processing from each bank in global data buffer 104.

b) Transfers from the Output Switch to the Multi-Function Multiports

Output switch 102 receives notification from controller 106 on controller interface 1505. Result processor 1506 decodes the result (route) and determines which multi-function multiport(s) 150 is (are) to receive the route data. Based on the mask in the notification, result processor 1506 transfers the notification to output processor 1508 for transfer to each multi-function multiport 150 indicated. At each cell slot, output processor 1508 provides (via outputs 1504) a notification cell to each multi-function multiport 150.

A notification cell includes a header and data field. The header includes memory bank source information and route information. The memory bank source information includes a source identifier for indicating which memory bank provided the cell in data field. The route information contains data from the notification including a next hop index, packet length, full address and offsets.

Output Section of a Multi-Function Multiport

Figure 12:
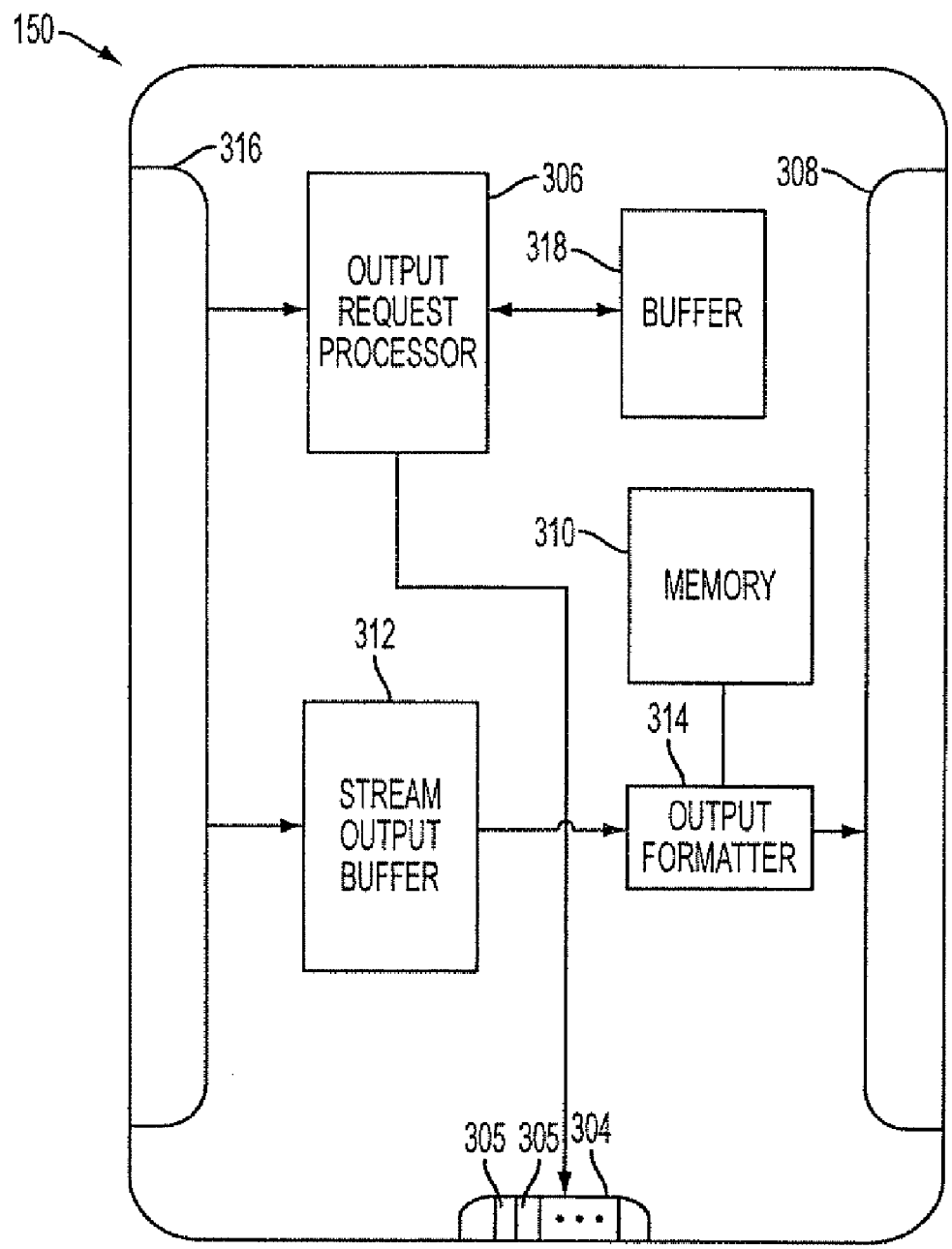
FIG. 12 is a schematic block diagram for an output section of a multi-function port.

Referring now to FIGS. 3 and 12 each multi-function multiport 150 includes an output switch interface 316, an input switch interface 304 including read request queues 305, head and tail queue buffer 318, an output request processor 306, an line output interface 308, storage device (memory) 310, stream output buffers 312 and output formatter 314.

a) Notification Queues

A multi-function multiport 150 receives notification that a packet is to be processed in the form of a notification cell received at the output switch interface 316.

Output request processor 306 processes notifications, storing each in an appropriate location in head and tail queue buffer 318 and servicing notification requests as they make their way through the various priority queues in head and tail queue buffer 318. The servicing of requests results in the generation of a read request to input switch 100 associated with the first address in memory where the packet (associated with the particular notification) is stored.

Figure 13:
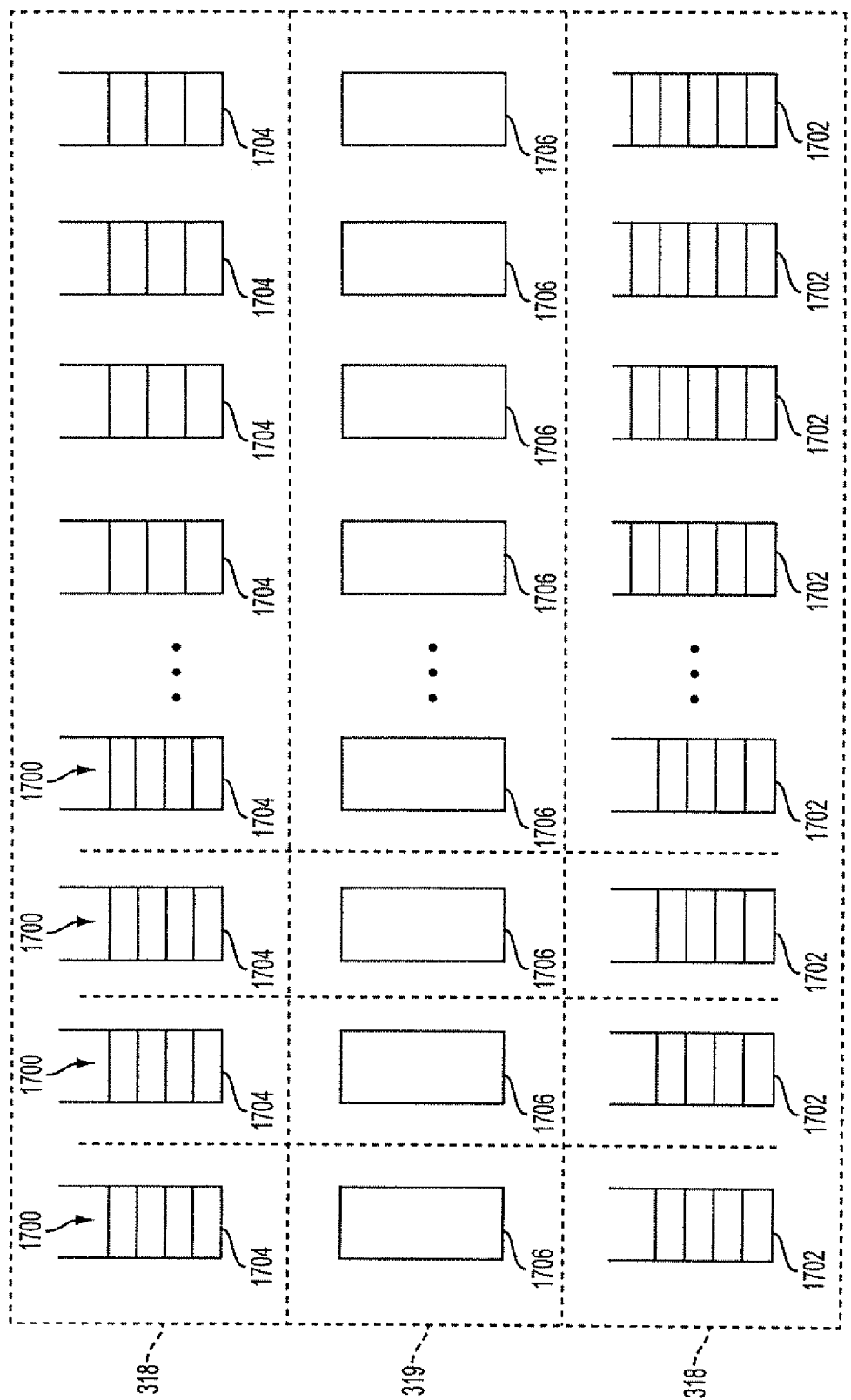
FIG. 13 is a schematic block diagram for a queue system for storing notifications.

Referring now to FIG. 13, head and tail queue buffer 319 includes a plurality of notification queues Q 1700, where Q=4*s, and where s is the number of active streams in the multi-function multiport. Unlike the global data buffer, the queues Q are implemented on a per-port basis. The queues in a respective multi-function multiport store only those notifications associated with streams to be outputted from the respective port of the multi-function multiport. Each queue is itself divided into a head region 1702, a tail region 1704 and a body region 1706. The head and tail region for a queue are stored in the head and tail queue buffer 318.

The size of the portion of the head and tail queue buffer dedicated to each stream is fixed at initialization time and is proportional to the peak bandwidth of its stream. The partitions between portions are "hard" in the sense that a stream cannot use more than the memory allocated to it. The partitions between queues associated with the same stream are "soft". The size of an individual queue is proportional to the nominal bandwidth allocated to its queue. The body region of the notification queue is stored in the notification area 319 (FIG. 3) of the memory section 290 of the multi-function multiport 150. Each stream is assigned 4 queues (the body portions of the priority queues) in the notification area 319 (FIG. 3). The body region can be sized to be ⅕ of the overall memory section.

Each queue associated with a given stream is serviced according to a priority scheme. Notifications that are received by the output request processor 306 are loaded into an appropriate queue associated with a stream based on the priority of the notification. Priority for notifications can be set by an external source and may be included in the packet received by the router. Alternatively, controller 106 (FIG. 3A) may set the priority depending on the amount of time required to perform the route lookup or other criteria.

Once a queue 1700 has been identified based on the priority information and stream ID, the output request processor 306 loads the notification into the appropriate tail queue 1704. Notifications are transferred between the respective head, tail and body portions of a queue based on available space by a queue manager (not shown). In one implementation, each notification is 16 bytes, and the notification area 319 is sized to hold 64 bytes. Accordingly, for reasons of bandwidth efficiency, all reads and writes to the notification area are done using 64-byte cells containing four 16-byte notifications each. The head and tail of each queue is sized to store only a small number of notifications, the bulk of queue storage being provided by the notification area in the multi-function multiport memory bank. As long as space is available on-chip (on the multiport) to hold the notifications for a queue, the notification area is completely bypassed. When on-chip space runs out, the notification area acts as the large "middle" of the queue, with a few notifications at the head and tail being held on-chip.

While the size of the notification area will tend to limit the numbers of dropped packets, occasionally a queue will become full. Output request processor includes a drop engine (not shown) for determining which entries in a particular queue are to be dropped based on a predefined algorithm. In one implementation, the drop engine institutes a programmable random early drop routine. The routine is programmable in that the user can define one or more parameters, random in that a random number generator is used to determine whether a entry will be dropped. Early refers dropping from the head of the queue.

The programmable random early drop routine may be implemented in software and when executed performs the following sequence of operations. The process begins by calculating the amount of data stored in a particular queue. This information is stored in the form of a fraction (or percentage) of fullness. Thereafter, a drop criterion is determined based on the fraction of fullness. In one implementation, a table of drop criterion values ranging from zero to one is mapped against fullness fractional values. The drop engine then derives a random number from zero to one. The random number may be generated by a random number generator or other means as is known in the art. A comparison is made between the random number generated and the drop criterion value. Thereafter, the entry at the head of the particular queue is dropped if the random number generated is larger than the drop criterion. Alternatively, the drop engine could avoid the drop if the random number generated is less than the drop criterion. The drop engine operates on each queue at a regular interval to assure that the queues do not overflow and a orderly method of dropping packets is achieved if required. This process is extremely helpful when transmitting packets across the Internet.

b) Per Bank Notification Queues

Each stream includes four queues 1700 that are serviced using a weighted round robin discipline. The weighting is used to reflect the priority associated with a given queue. For example, the four queues for a given stream may be serviced in the following ratios: Q1 at 50%, Q2 at 25%, Q3 at 15% and Q4 at 10%.

The multi-function multiport maintains four cell pointers for each queue: start, end, head, and tail. In one implementation, each pointer is 23 bits long and can address the entire memory associated with the multi-function multiport. The start and end pointers mark the boundaries of the queue's region, while the head and tail pointers point to the next cell (notification) to read and next cell to write respectively. The head and tail pointers are restricted to align within the region defined by the start and end pointers, and standard wrap-around arithmetic is performed when incrementing these pointers.

Given the description above, it should be clear that the region for a queue can be as small as one cell and as large as the entire memory bank. It is up to the software to configure the pointers at initialization time to define the sizes of the regions, and to ensure that regions are non-overlapping with each other and with the memory allocated to the global packet buffer.

Typically, the software is used to allocate memory to a stream proportional to the stream's bandwidth.

c) Read Request Generation

Output request processor 306 services the queues to extract notifications from the head regions of queues 1700. Output request processor generates a first read request based on the full address received from output switch 102. Thereafter subsequent read requests are generated for transmission to the input switch based on the offset information provided in the request (in the notification cell) or indirect cells (as will be described below). Read requests include a stream identifier and a full address. Read requests are sent by the output request processor to an appropriate read request queue 305. One read request queue 305 is provided for each bank of memory.

In one implementation, if the packet length, as determined from the route information provided with the notification cell, is greater than five (5) cells, then the output request processor first requests the transfer (read from memory) of the first indirect cell associated with the packet. This is accomplished by computing the address of the indirect cell based on the full address and the offsets provided in the notification cell. After the indirect cell request is generated, the output request processor generates read requests for the remaining cells in the packet based on the full address and the offsets provided in the notification cell. Upon receipt of a indirect cell from the output switch 102, output request processor continues to generate read requests for the remaining cells in the packet based on the offset information contained within the indirect cell.

Subsequent indirect cells are retrieved in a similar fashion. That is, at the time for reading the next indirect cell, the address of the next indirect cell is computed based on the last offset stored in the previous indirect cell. The timing of retrieving the indirect cells is accomplished such that no delays in the output stream are incurred. Each subsequent indirect cell is retrieved prior to the end of the processing of the prior indirect cell. In this way, once the output stream is initialized, no buffering of data is required and no interruptions due to the latency associated with the retrieval process are experienced.

Output requests to an individual memory bank are processed strictly in order. That is, the multi-function multiport may track each request issued to a memory bank (through the read request queues) and is assured that the data received in response to a series of requests to the same memory bank will be strictly delivered according to the sequence or pattern in which they were issued. Output request processor 306 keeps track of requests generated for each memory bank through the use of reply queues (not shown). The request queue contains a stream number and a read address. When a request is issued to memory, the entry is removed from the request queue and the stream number portion is placed in an associated reply queue. When a reply is received, the entry at the head of the reply queue is removed and the reply is sent to the stream number (in stream output buffer 312) indicated by the stream number retrieved from the reply queue.

As cells are received back at the multi-function multiport 150 (responsive to the read requests), they are stored in an associated stream output buffer 312. Stream output buffer 312 includes a plurality of FIFOs, one for each stream. Each cell received for a stream is placed in the streams associated FIFO. For given packet, the multi-function multiport stores a fixed number of cells (in the FIFO) required to provide a streamed output prior to initializing the output of the stream to line output interface 308. In one implementation of the present invention, twelve cells are stored prior to beginning output (stream data) from the output port. The selection of the number of cells for storage in output buffer 312 is based on the latency in the read process (number of clock cycles between a read request from an multi-function multiport and the arrival of the cell associated with the read request to the output port).

Output formatter 314 receives the cells from output buffer 312 and couples the data with media header information stored in memory 310. Each request (notification) received from output switch 102 includes a next hop index. The next hop index indicates the starting address in memory 310 of the media header information associated with a given type of transmission (derived from the destination of the packet). Media header information stored in memory 310 may be loaded upon initialization of the router and updated by the controller as required. Output formatter 314 couples the cell data returned from memory with the appropriate media header to generate a proper packet for transfer out of router 20 on the line output interface 308.

Packet Routing Overview

Figure 14:
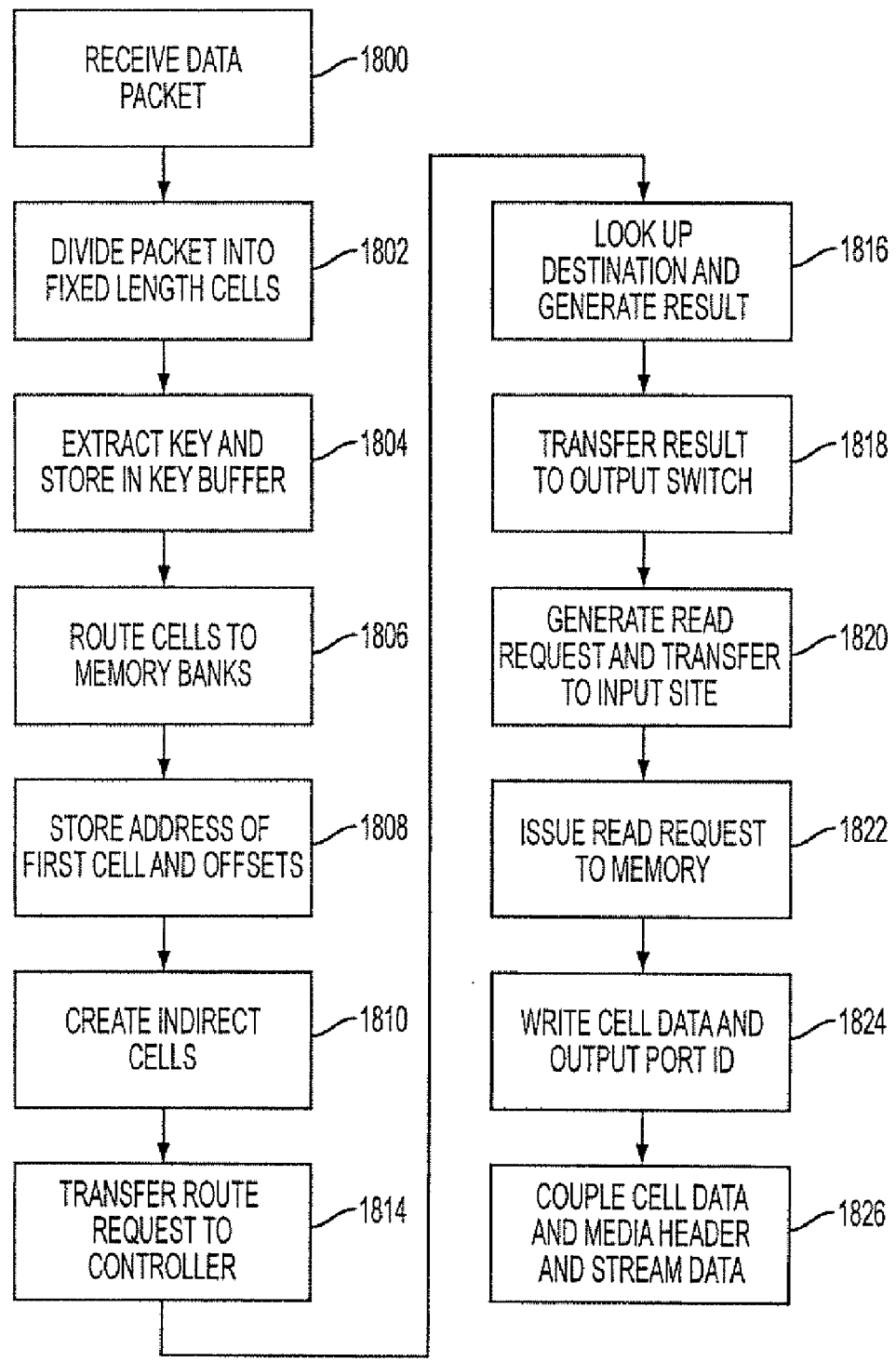
FIG. 14 is a flow diagram for a process of routing a packet through a router.

Referring now to FIG. 14, in a method of routing packets through a switch a packet is received at a multi-function multiport (1800). The multi-function multiport divides the packet into fixed length cells and transfers the cells to an input switch (1802). Input switch removes the key information from the first cell in a packet and stores it temporarily in a key buffer (1804). Thereafter the input switch routes the cells to memory banks resident in the multi-function multiports in a time division multiplexed manner (1806). The input switch stores the first address in memory where the first cell is stored and computes offsets for each additional cell associated with the offset in memory for the next contiguous memory bank into which the next cell is written (1808). The input switch creates indirect cells to store linking information for the packet if the packet length exceeds five cells (1810). If the number of cells exceeds the number of available offsets in an indirect cell, then the old indirect cell is stored in memory and a new indirect cell is created and loaded based on the offsets calculated for each new cell received at the input switch.

When the packet (and its indirect cells if any) have been stored in memory, then the key, full address of the first cell and offset information is transferred as a lookup request to a controller (1814). The controller performs a lookup operation that can include a plurality of chained lookup operations and generates a result. The result includes the destination port (multi-function multiport), address, offset information and next hop index (1816). A notification including the result is transferred to the output switch for transfer to the appropriate multi-function multiport (1818).

Upon receipt of a notification, the multi-function multiport generates read requests a cell at a time to the input switch for the data associated with the packet (1820). The input switch issues the read requests in a time division multiplexed fashion generating a single request to each memory bank per cell slot (1822). When the memory bank receives the request from the input switch, cell data and a multi-function multiport identifier associated with the request are transferred to the output switch (1824). Again, at each cell slot, the output switch transfers a single cell to each of the multi-function multiports. Upon receipt, the multi-function multiport couples the cell data with media header information and streams the data to the destination (1826).

Alternative Implementations

The present invention has been described in terms of specific embodiments, which are illustrative of the invention and not to be construed as limiting.

For example, the system can be configured to run the same jtree over two different fields in the key (this is so the system can support a match which is true when one of a list of prefixes matches either the destination address or the source address in a packet).

Next hops can be designed to support many features in addition to packet forwarding. Additional packet processing features that are possible include but are not limited to accounting, sampling, quality of service, flow policing, and load balancing.

For accounting, fields in an intermediate or extended next hop can indicate that a specific counter should be incremented. For example, the routes in a jtree for longest prefix match lookup are next hops. If these next hops point to different counters, the counters can be used to count the number of packets taking each route. Note that more than one next hop can be set up to point to the same counter. For supporting sampling and quality of service, next hops can contain fields that modify sampling enable bits and quality of service values stored in the result buffer. A lookup step can be added to the chain of lookups to test certain fields in the key to select the next hop to make the desired modification.

For supporting flow policing, next hops can contain pointers to data structures storing policing parameters. A firewall filtering step can be inserted into a chain of lookups to select a set of policing parameters based on different fields in the key buffer.

For supporting load balancing, an intermediate next hop can be designed to point to more than one final next hop for selection.

The data structures (jtrees, index tables, filter programs) stored in memory 920 (of FIG. 9) to support the various lookup operations can be atomically updated so that updates to the data structures can be performed at the same time lookup operations are being executed. Each of the data structures includes a pointer to a next operation. The pointers are of the form of a next hop. The next hop may be an intermediate next hop, or a final next hop. Modifications can be made to a chain (a series of lookups that are to be performed for a particular type of packet (e.g., incoming interface)) without requiring a current lookup operation to be terminated. That is, an entry in the chain can be removed by updating the pointer in the lookup specified one entry in the chain above the item to be removed to point to the entry in the chain that is one entry after the deleted item. The update is atomic, in that existing operations are not affected, and any subsequent results returned after the update will branch to the appropriate next entry in the lookup chain. All changes can be resolved to a single write operation. Similarly, a lookup can be added to the chain by adding the data structure to memory including designating the result that is returned by the added entry point to the entry in the chain at the point just after where the new entry is to be included in the chain. Finally, the pointer in the entry (the result returned) just above the point where the new entry in the chain is to be included is updated to point to the new entry. Again, existing operations are not required to be terminated and subsequent chain processing operations (that are executed after the change) will include the added lookup.

Similarly, within the data structures, updates to individual portions of the branching operations (e.g., branches in a tree, a branch in a filter program, or a result returned in an index search) can be performed atomically.

The Internet may become the fundamental communications infrastructure for public network access, for private networking, and for next-generation voice and video applications. Implementations consistent with the principles of the present invention boost packet forwarding performance to match the speed and capacity of the emerging optical infrastructure. Implementations add IP intelligence to raw forwarding performance. The result is a substantial and predictable increase in packet processing performance when compared to software-based solutions. Consequently, packet forwarding performance does not have to be sacrificed to deploy the IP services that subscribers demand, thereby creating a competitive advantage in a rapidly evolving marketplace.

ASIC-based packet processors consistent with the principles of the invention, configured using appropriate software, deliver the tools needed to scale security management at any bandwidth and at any point in the network. Not only does the ASIC-based packet processor deliver wire-rate forwarding performance and unprecedented visibility into network operations, it also supports packet filtering, packet sampling and logging, packet counting, and load balancing.

Implementations of the ASIC-based packet processor are first in the industry to support wire-rate forwarding performance. The ASIC-based packet processor retains this performance while adding a rich set of features that can be deployed both in the core and at the edges of a network.

The ASIC-based packet processor provides breakthrough technology that allows routers to forward traffic at wire-rate speeds. A benchmark of forwarding 40-byte packets at 40 Mbps with an 80,000-prefix routing table may be achieved. In addition to wire-rate forwarding, this ASIC supports industrial-strength routing protocol implementations, a routing policy definition language, reliable performance under stress, flexible multiprotocol label switching (MPLS) traffic engineering, and class-of-service (CoS) queuing. The ASIC-based packet processor delivers best-of-class functionality in the network core.

The ASIC-based packet processor delivers 40-Mpps forwarding rate; it also adds the packet processing features needed to build a competitive advantage in a rapidly evolving industry. Offering rich packet processing, such as filtering, sampling, logging, counting, and load balancing, the ASIC-based packet processor maintains high performance. Implementations may be used in Internet backbone routers. Software may be downloaded to activate the ASIC-based packet processor features on all interfaces, now and in the future.

The ASIC-based packet processor may reside on the packet forwarding engine, which may be cleanly separated from the routing engine. The separation of forwarding and routing functions ensures that stress experienced by one component does not adversely affect the performance of the other because there is no overlap of required resources. Routing fluctuations and network instability do not limit the forwarding of packets. The wire-rate forwarding performance of 40 Mpps ensures that the ASIC-based packet processor scales well with large, complex forwarding tables. Predictable performance with advanced features, such as filtering, is maintained because of the ASIC-based packet processor's inherent over-sized design with respect to interfaces, as well as the fact that once configured, the routing engine compiles and optimizes filters before sending them to the ASIC-based packet processor. Additionally, the packet forwarding engine pooled resource design combines with the over-sized ASIC-based packet processor to ensure additional performance headroom, even with value-added features enabled.

Given the ASIC-based packet processor may be over-sized relative to realistic routing configurations and realistic traffic (in terms of interface utilization and distribution of packet sizes), in practice the packet load is not expected to exceed the capacity of the ASIC-based packet processor. This expectation is particularly true for the smaller routers where the ASIC-based packet processor may be even more over-sized. These routers may be used in access roles, where services are usually implemented and hence, where the increased amount of packet-processing capacity is a competitive advantage.

Designing a set of tests to characterize a router's basic forwarding performance may be a relatively straightforward task because few variables need to be taken into account. However, developing a meaningful set of benchmarks to describe a router's forwarding performance with filtering enabled may be significantly more complex because of the large number of variables involved. Such variables may include the number of router interfaces that are configured with packet filters, the number of input and output filters installed on each interface, the size and complexity of the filters used during the test, the volume of traffic arriving at each interface, the distribution of packet sizes on each interface, the aggregate volume of traffic entering the system at any time, and the content of the traffic's packet headers.

Figure 15:
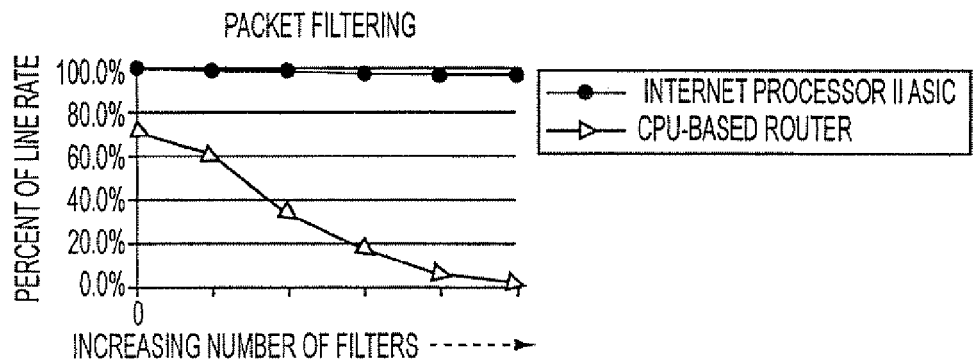
FIG. 15 is a graph of performance testing results.

In the absence of standard benchmark tests, the best approach to quantifying filtering performance is to test the platform under extreme conditions, for example, using fully configured systems with full Internet routing tables and multiple unique and complex packet filters. The results, as shown in FIG. 15, may demonstrate that the ASIC-based packet processor delivers predictably high forwarding performance while filtering packets for any traffic profile and any filter set likely encountered in a production network.

Three of the applications delivered by the ASIC-based packet processor include packet filtering, traffic analysis, and load balancing.

Packet Filtering

Packet filtering is the ability to selectively control the flow of packets to or from an interface by examining information in each packet's header. The ASIC-based packet processor provides performance-based packet filtering of inbound and outbound traffic based on any combination of fields such as source and destination IP addresses, IP protocol (such as TCP, UDP, and ICMP), source and destination UDP and TCP ports, DiffServ byte, IP fragmentation offset and control fields, and TCP control bits.

High-performance filtering is accomplished using a flexible method of programming the ASIC-based packet processor. Filters may be written and downloaded onto the ASIC-based packet processor using an easy-to-use command-line interface. A compiler then optimizes and compiles the filters for the ASIC-based packet processor for quick and efficient packet processing.

When a packet matches a user-configured filter rule, the router may take any of a number of actions, such as accept the packet, silently discard the packet without sending an ICMP message, reject the packet and send an ICMP message, etc. In addition to these actions, the router may be configured to perform processes, such as sampling the packet, incrementing a counter, and logging the packet. For example, a packet can be configured to be accepted and sampled, to be discarded, counted, and logged, or to be rejected and logged.

Filtering may be useful for a variety of applications, including protecting the core and protecting subscriber networks. For example, ASIC-based packet filters may be used to protect the network core from unwanted traffic, source address spoofing, and other types of unauthorized management access.

Traditionally, two types of tools are used in a layered fashion to protect core routers. The first line of defense is the router's remote access management policy, which is essentially an IP address list. Management access to the router (for example, using Telnet or SNMP) requires an allowed source IP address. After the source IP address is verified, a second tool, such as passwords or one-time passwords, provides a second layer of security.

Figure 16:
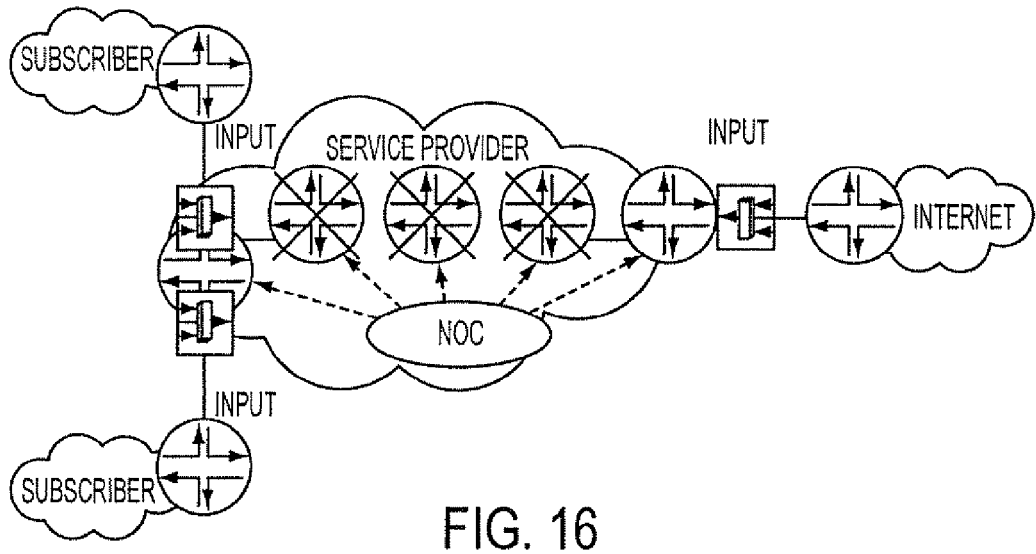
FIG. 16 is a schematic block diagram of an exemplary network configuration.

The ASIC-based packet processor adds a third layer of security to protect against attacks to the core. Applying filters that perform source address verification at network ingress points ensures that hackers cannot spoof the source address of network operation center (NOC) systems at the ingress' edge of the network. An exemplary configuration is illustrated in FIG. 16.

Source address verification can also play an important role in prohibiting the launch of denial-of-service (DoS) attacks from subscriber sites. Many hackers attempt to obscure true identities by using a forged IP source address. The filtering, sampling, and logging capabilities of the ASIC-based packet processor can be used to trace a DoS attack back to the source without negatively impacting the forwarding performance in the network core.

These robust filters run all the time, examining and, if needed, dropping packets before they enter a network. Never before has it been possible to implement this type of network armor using traditional filters because the forwarding performance of traditional routers using software-based filtering degrades to unacceptable levels.

The added benefits of using ASIC-based filters for core router fortification include an additional layer of security provided to protect routers from unauthorized access, and permanent filters do not impact packet forwarding performance. Historically, the burden of packet filtering has been placed on the subscriber. Filters were configured on subscriber edge routers (customer premise equipment (CPE)) to examine incoming traffic from the provider side of the subscriber-provider circuit. Network administrators at the subscriber site were heavily tasked with creating and managing the traffic filters.

Figure 17:
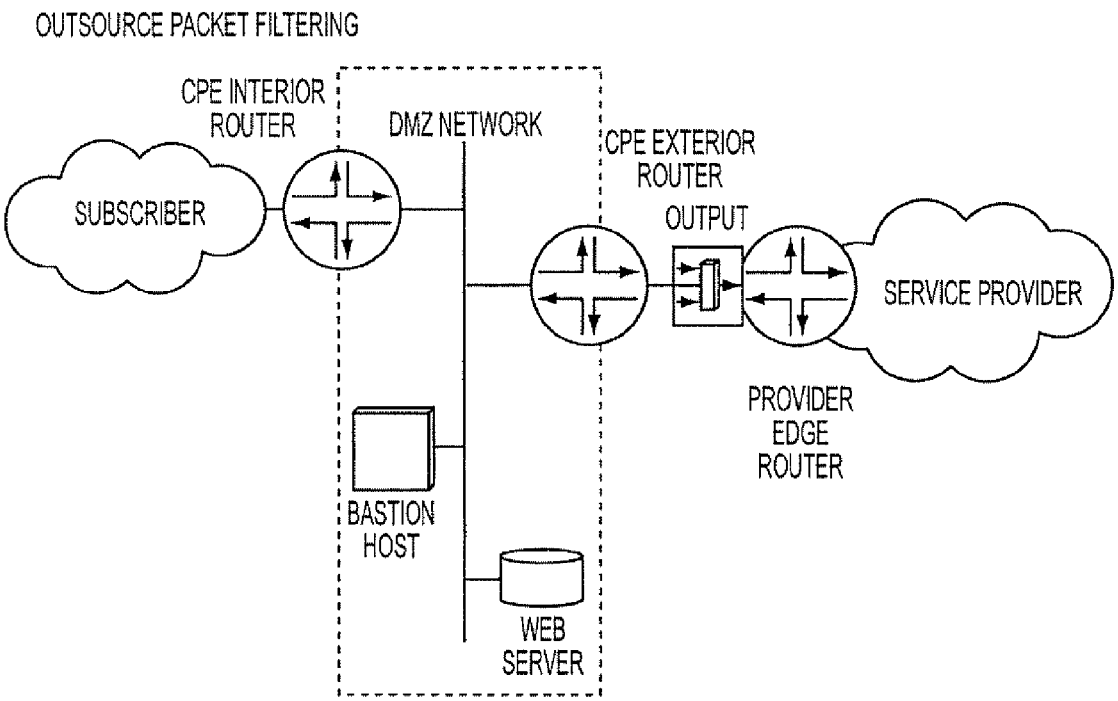
FIG. 17 is a schematic block diagram of an exemplary network configuration.

As increasing numbers of subscribers migrate to high-bandwidth circuits, existing CPE platforms are unable to offer predictable and stable performance when filtering is enabled. Operationally, it is more attractive either to manage filtering on the provider side of the circuit or to deploy equipment that delivers full performance at the CPE for high-bandwidth subscribers. ASIC-based filtering enables protection of subscriber networks using outsourced packet filters configured in the provider edge routers. For example, outsourced packet filters can be configured to accept, discard, or reject packets on the egress interface facing the subscriber edge. An exemplary configuration is illustrated in FIG. 17.

Outsourced packet filters implemented using the ASIC-based packet processor offer several distinct advantages over traditionally architected filters. For example, bandwidth on the provider-subscriber circuit is conserved. Outbound filters can be applied before traffic ever leaves the network. These filters eliminate unwanted and unnecessary traffic from ever wasting bandwidth on the provider-subscriber circuit. The subscriber does not have to deal with the complexity of creating and managing filters. Forwarding performance on the edge router is not negatively impacted. The structured, database-like configuration tools supported in commercially available software significantly ease the burden of managing customer filtering configurations at the edge router. Outsourced packet filtering services can be offered as a value-added, revenue-generating differentiator.

Figure 18:
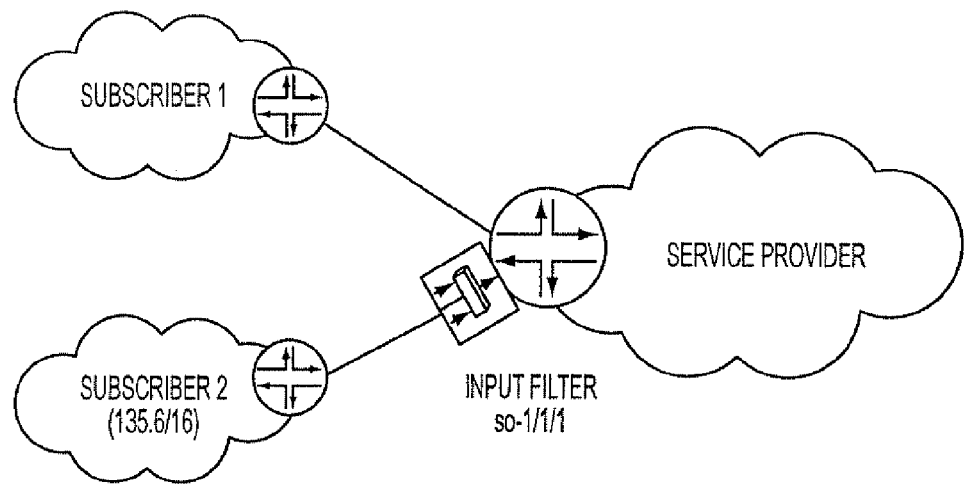
FIG. 18 is a schematic block diagram of an exemplary network configuration.

Packet filtering can be used on an aggregation router to prevent source address spoofing from subscriber subnets. FIG. 18 shows a typical aggregation router that provides access for Subscriber 2 across an OC-3/STM-1 circuit assigned to interface so-1/1/1. Unlike a classic firewall filter, which rejects all traffic that is not explicitly accepted by a filter term, the default action for this filter is to accept all traffic that is not explicitly rejected. A key assumption in this example is that the subscriber is single-homed. Otherwise, source address verification may not be possible on a single circuit without knowledge of the source addresses provided by other service providers.

The filter installed on the ingress interface of the service provider's edge router verifies that the source address of each subscriber packet is within the prefix range assigned to the subscriber. By logging and counting each packet with an invalid source address, a spoofing problem and its magnitude can quickly be identified. The pseudo code for this example is as follows:

```
IF (source address < >subscriber's prefixes)
THEN
    COUNT PACKET sub-2-unauth-src-addr
    LOG PACKET
    DISCARD PACKET
ENDIF
```

The actual filter consists of two terms. The first term, sub-2-prefix-check, examines each packet for an unauthorized source address; if there is a match, the packet is silently discarded, logged, and counted. The second term, default-action, has no match statements, so it matches all packets that fall through and are processed by this term. The default action for this filter is to accept all packets that were not explicitly rejected by previous filter terms.

Assuming that the subscriber's source address prefix is 135.6/16, the software syntax to implement the filter is as follows:

```
[edit firewall]
filter subscriber-2-ingress {
    term sub-2-prefix-check {
        from {
            source-address {
                0.0.0.0/0;
                135.6/16 except;
            }
        }
        then {
            count sub-2-unauth-src-addr;
            log;
            discard;
        }
    }
    term default-action {
        then accept;
    }
}
```

To assign this filter to interface so-1/1/1, the software syntax is as follows:

```
[edit interface]
interfaces so-1/1/1 {.
    unit 0 {
        family inet {
            filter {
                input subscriber-2-ingress;
            }
        }
    }
}
```

DOS Attack Packet Filtering and Tracing

The ASIC-based packet processor provides a powerful set of tools that allows filtering and tracing of DoS attacks over high-speed circuits while still maintaining predictable router forwarding performance. Packet filtering is an effective means of countering smurf and other DoS attacks by blocking intrusive packets before they reach their victim. Log filters enable one to trace the origin of a DoS attack across a provider's network to the assault's ingress point.

Figure 19:
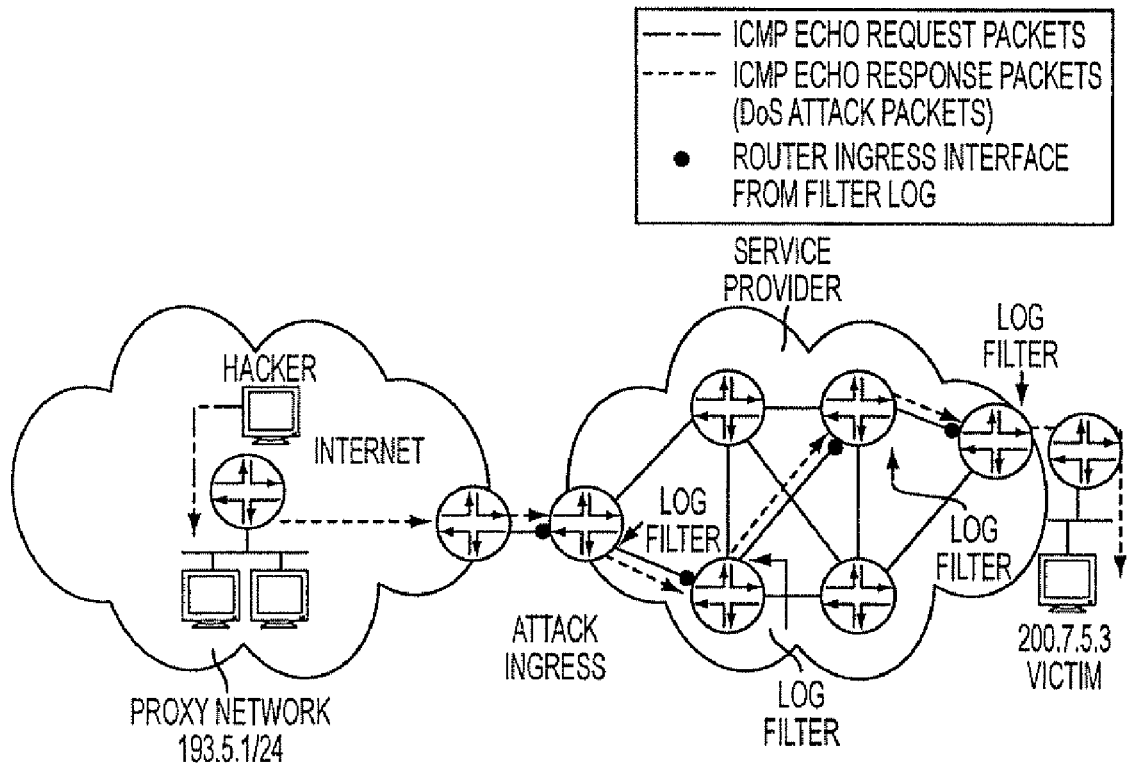
FIG. 19 is a schematic block diagram of an exemplary network configuration.

This example demonstrates how to use packet filtering and logging to trace a smurf-based DoS attack. FIG. 19 shows how a hacker launching a smurf attack by sending an ICMP echo request (ping) packet with a spoofed source address. The source address that the hacker uses in the ICMP echo request packet is the address of the target of the attack. The ICMP echo request packet is transmitted to the directed broadcast address of the proxy network. When hosts on the proxy network receive the hacker's ICMP echo request, they respond by transmitting ICMP echo response messages to the victim. Using the directed broadcast address allows the hacker to amplify the number of ICMP echo responses that the victim receives. Using multiple proxy networks, the hacker can further intensify this attack.

The pseudo code to discard and log all packets belonging to a smurf attack is as follows:

```
IF (destination address=victim) AND
    protocol address=victim) AND
    (ICMP-type=echo response)
THEN
    LOG PACKET
    DISCARD PACKET
ENDIF
```

Figure 20:
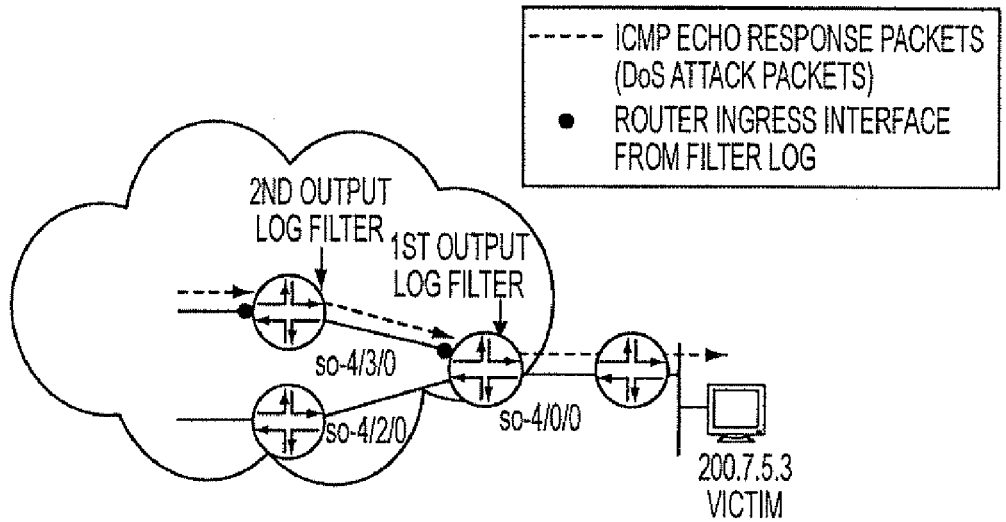
FIG. 20 is a schematic block diagram of an exemplary network configuration.

The software filter for this example contains two terms. The first term logs and then discards ICMP echo response packets, while the second term executes the filter's default action and accepts all other packets. As shown in FIG. 20, the address of the victim is 200.7.5.3 and the provider edge router interface toward the victim's network is so-4/0/0.

```
[edit firewall]
filter dos-tracer {
    term dos-discard-log {
        from {
            destination-address 200.7.5.3;
            protocol icmp;
            icmp-type echo response;
        }
        then {
            log;
            discard;
        }
    }
    term default-action {
        then accept;
    }
}
```

The following software syntax applies the filter to the provider edge router's outbound interface toward the victim's network.

```
[edit interfaces]
interfaces so-4/0/0 {
    unit 0 {
        family inet {
            filter {
                output dos-tracer;
            }
        }
    }
}
```

A sample log generated by the filter is as follows:

```
user@host> show firewall log
```

| Time doc-log | Interface | Pro | Src address | Dest address |
|---|---|---|---|---|
| 03:09:07 - A | so-4/3/0 | ICM | 193.5.1.2 | 200.7.5.3 |
| 03:09:07 - A | so-4/3/0 | ICM | 193.5.1.3 | 200.7.5.3 |
| 03:09:07 - A | so-4/3/0 | ICM | 193.5.1.7 | 200.7.5.3 |
| 03:09:08 - A | so-4/3/0 | ICM | 193.5.1.8 | 200.7.5.3 |

The log lists the following data for each logged packet: the time the packet was received; the router interface on which the logged packet is received (so-4/3/0); the protocol (ICMP); the source address (a host on the proxy network), and the destination address (200.7.5.3, the victim). Once it is known that attack packets arrive on interface so-4/3/0 of the provider edge router, the upstream neighbor can easily be identified and the software filter installed on the outbound interface of the previous hop router. By repeating this process hop by hop, the attack can be traced back to the point that it enters the network.

Fortifying Core Routers Against NOC Spoofing Attacks

The ASIC-based packet filtering features can be used to increase the security of service provider core routers by preventing hackers from spoofing NOC addresses. In this example, a filter discards packets arriving on the inbound circuit at a peering point if they contain a spoofed NOC source address. A packet received on this interface with a NOC prefix indicates that an attack is currently underway using a spoofed NOC address.

Figure 21:
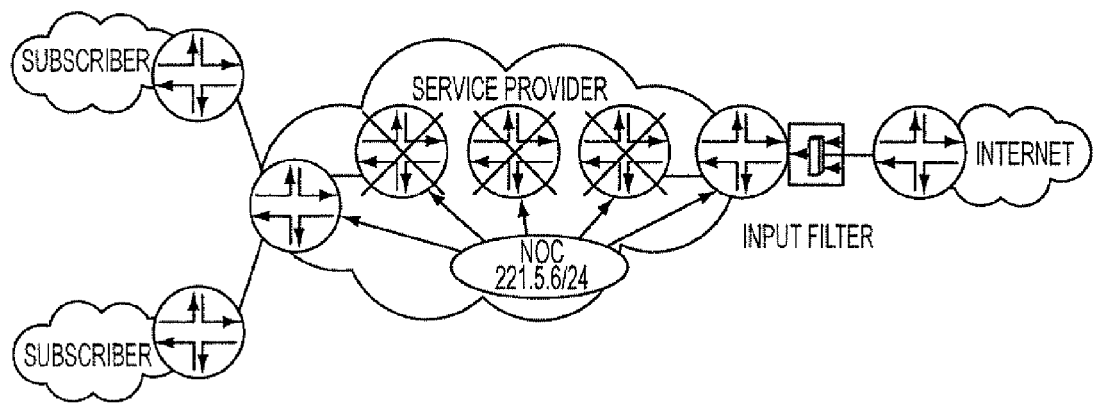
FIG. 21 is a schematic block diagram of an exemplary network configuration.

FIG. 21 shows a typical service provider with a peering point to other service providers on the Internet. The pseudo code and the software filter syntax for this example are as follows:

```
IF (source-address = NOC)
THEN
        LOG PACKET
        DISCARD PACKET
ENDIF
[edit firewall]
filter peer-input {
    term chk-NOC-address {
        from {
            source-address 221.5.6/24;
        }
        then {
            log;
            discard;
        }
    }
    term default-action {
        then accept;
    }
}
```

This filter complements, rather than replaces, security measures on each router, including remote management access control and strong authentication. The filter makes it significantly more difficult for hackers to break into routers and tamper with configuration parameters. Note that this example assumes subscriber source address verification is enabled on all aggregation routers as described in the first example. Subscriber verification filters prevent NOC source address spoofing attacks from entering the network at subscriber ingress points.

Fortifying the Routing Engine with Packet Filtering

This example illustrates how the packet filtering features of the ASIC-based packet processor can be used to protect the routing engine of a router. The routing engine can be protected by applying packet filters to either a physical interface or to the router's loopback interface.

Example: Router Physical Interface

Figure 22:
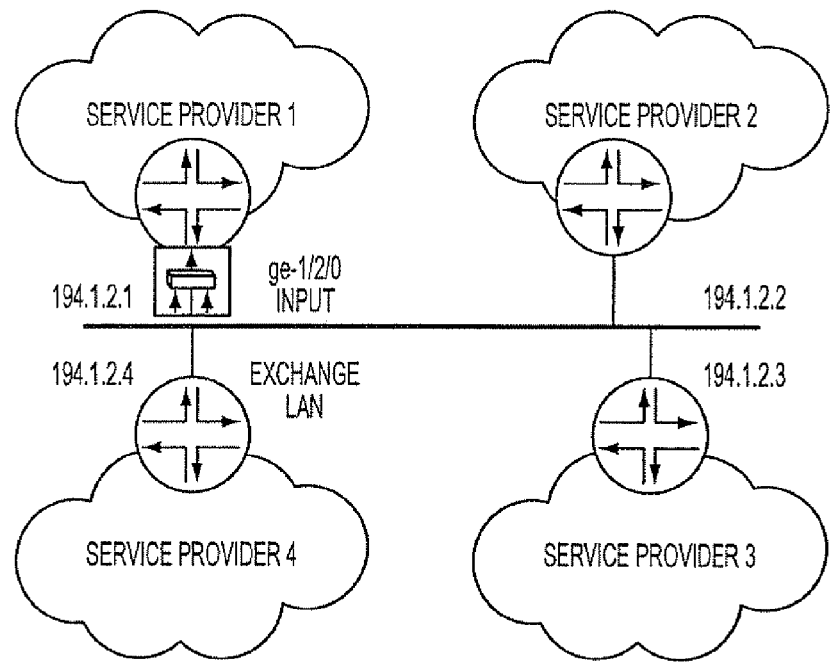
FIG. 22 is a schematic block diagram of an exemplary network configuration.

ASIC-based filtering can eliminate unnecessary processing by the routing engine, while still maintaining predictable router forwarding performance. In FIG. 22, Service Provider 1 wants to peer only with Service Provider 4, but not Service Provider 2 or Service Provider 3. Since the filter operates on an interface to an exchange point, the default action for the filter is to accept all packets that are not explicitly rejected by prevous filter terms. The pseudo code and software syntax to implement this filter are as follows:

```
IF (source address < > valid peer)
THEN
        COUNT PACKET illegal-bgp-peers
        DISCARD PACKET
ENDIF
[edit firewall]
fitter peer-input {
    .
    .
    .
    term illicit-bgp-peers;
        from {
            source-address {
                0.0.0.0/0;
                194.1.2.4/32 except;
            }
            protocol tcp;
            destination-port bgp;
        }
        then {
            count illegal-bgp-peers;
            discard;
        }
    }
    .
    .
    .
    term default-action {
        then accept;
    }
}
```

The following software syntax applies the peer-input filter to the router's inbound Gigabit Ethernet interface attached to the exchange LAN:

```
[edit interfaces]
interfaces ge-1/2/0 {
    unit 0 {
        family inet {
            filter {
                input peer-input;
            }
        }
    }
}
```

As with the NOC example, packet filtering complements, rather than substitutes for prudent security measures. For BGP, such measures would include using MD5 to authenticate each peer and BGP group that accepts only specified BGP systems as peers.

Example: Router Loopback Interface

Figure 23:
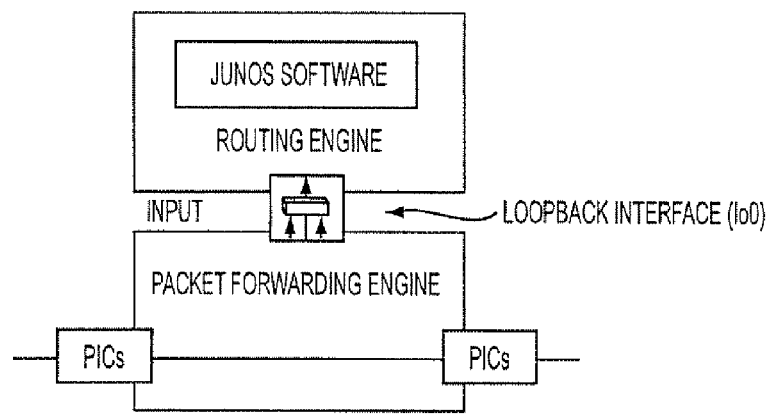
FIG. 23 is a schematic block diagram of an exemplary loopback interface.

ASIC-based packet filtering can be used to restrict the packets that can pass from any of the router's physical interfaces to the routing engine. Such filters are useful in protecting the IP services that run on the routing engine, such as Telnet, SSH, or BGP, from DoS attacks. Instead of assigning these filters to a specific physical interface, they can be assigned to the router's loopback interface, lo0, which is the interface to the routing engine, and as such, carries no transit traffic. As shown in FIG. 23, if a filter is applied to the lo0 interface, the filter affects only those packets received or transmitted by the routing engine.

For example, to discard Telnet and SSH access to all but the 192.168.1/24 subnet on all interfaces, the following software syntax can be used. The terminal-access term also logs unauthorized Telnet or SSH traffic to the loopback interface's log buffer.

```
[edit firewall]
filter routing-engine-input {
    .
    .
    .
    term terminal-access {
        from {
            source-address {
                0.0.0.0/0
                192.168.1/24 except;
            }
            protocol tcp;
            destination-port [ssh | telnet];
        }
        then {
            log;
            discard;
        }
    }
}
```

The following software syntax applies the routing-engine-input filter to the router's loopback interface:

```
[edit interfaces]
interfaces lo0 {
    unit 0 {
        family inet {
            filter {
                input routing-engine-input;
            }
        }
    }
}
```

Traffic Analysis

As network bandwidth becomes ever higher and networks rapidly grow, scalable data capture and analysis tools are needed to allow visibility into the operations of the networks. Traffic analysis tools used in conjunction with packet filters enable such visibility. The filter identifies specific packets to be examined, and the traffic analysis tools sample, log, and count the selected packets.

Traffic analysis tools allow traffic to be examined, and networks to be planned and designed, for example, in understanding the nature of the network traffic. Traffic can be characterized in a number of dimensions, including distribution of packet sizes, transport protocols, popular applications (such as the Web voice and video) tunneled protocols and IP multicast. Future capacity network design and deployment can be planned for both internal circuits (intradomain) and external circuits (interdomain) as well as determining whether new peering relationships need to be established. Future equipment requirements can be identified by analyzing the network performance to determine necessary forwarding rates for prevalent packets of a specific size. Profiles can be developed that define normal network operations and a plan of action can be developed, for instance, when the operation of the network is outside of the defined boundaries.

Packet sampling and logging allow the router to examine packets as they traverse the system. One of the inherent problems in packet sampling is that it is orthogonal to the system's main function: processing the greatest number of packets as quickly as possible. A major benefit of routing architecture in which the CPU is not directly involved in the processing of transit traffic, is that the router remains lightly utilized and is available for storing packet headers and performing online analysis for local display.

ASIC-based packet processors use statistical sampling that examines a user-configurable percentage of the traffic traversing the system. Sampling theory shows that statistical sampling can be quite accurate if the sampling parameters are properly selected. When a packet matches the filtering conditions, the router marks it as a candidate for sampling by setting a bit in the packet notification. Typically, the router sets the sample bit if the packet matches a filter. However, having the sample bit set does not mean that the packet notification is sampled, only that the specific packet notification is a candidate for sampling.

The packet filter on the configured interface sets the sample bit on all the sampled packets. For each packet that has the sample bit set, the ASIC-based packet processor generates a random number. If the random number is less than a user-defined threshold, the packet is sampled. If a packet is sampled, the router can sample the next user-specified number of packets without running the random number generator.

When a packet is sampled, the router writes the packet headers to a file on the hard disk of the routing engine. The information may include source and destination IP addresses, IP protocol, source and destination port, packet length, DiffServ byte, IP fragment flags, and TCP flags.

Logging is similar to sampling. However, logging can be used for instant notification of ongoing network events. Logging examines every packet that matches the filter and displays the matches in realtime on the console. The router does not log data on the hard disk; the logged data can be accessed by using the routers command line interface.

Packet Sampling

The ASIC-based packet processor allows sampling of IP traffic based on particular input interfaces or various fields in the packet header. Traffic sampling can be used to monitor all logical interfaces, specific logical interfaces, specific protocols on one or more interfaces, a range of addresses on a logical interface, or individual IP addresses. Information about the sampled packets is saved to files on the router's hard disk drive.

Using packet sampling filters, a representative sampling of packet headers from those packets that match a filter's conditions can be easily captured and stored. A randomized approach is a more practical solution than attempting to sample each and every packet (as executed in traditional routers) given the amount of data flowing through an OC 192c/STM-64 circuit. Randomization determines whether a particular packet is sampling based on a user configurable sampling rate. The sampling rate is defined as one divided by a user-specified integer. This user specified sample rate is compared to a random number generated by the ASIC-based packet processor. If the resulting value is below the specified rate, then the packet is sampled. Over the course of many samples the sampling rate equals the rate specified in the user configuration. Our implementation eliminates the bias from sampling just every nth packet, and thus makes the data more statistically meaningful.

All packets that match the conditions of a sampling filter are marked as candidates for sampling. By configuring a user specified run length of up to 20 packets, marked packets can be sampled that are adjacent to the packet currently being sampled. For example, if a sampling rate of 1,000 is configured to trigger the sampling of 1 out of every 1,000 marked packets and also the run-length is set to a value of 3, the software also samples the next two packets that are marked for sampling. By default, five adjacent packets are sampled after the initial trigger event.

Below is the output of a typical sample file containing captured header information:

```
user<host> monitor start /var/log/sample•file
# Apr  5 20:31:21
#     Dest         Src    Dest   Src   Proto  TOS   Pkt   Intf      IP      TCP
#     addr         addr   port   port                len   num     frag    flags
211.211.221.1   10.2.0.25   60     39      6    0x0    40     9     0x0    0x10
211.211.221.1   10.2.0.25   66   1024      6    0x0    60     9   0x4000    0x2
211.211.221.1   10.2.0.25   80     39      6    0x0    10     9     0x0    0x10
211.211.221.1   10.2.0.25   56     39      6    0x0    40     9     0x0     0x2
```

A typical application for packet sampling is to determine the ultimate destination, volume, and content of traffic flowing between service provider networks. This information can be used to decide if additional capacity needs to be provisioned or if new peering relationships need to be established.

Figure 24:
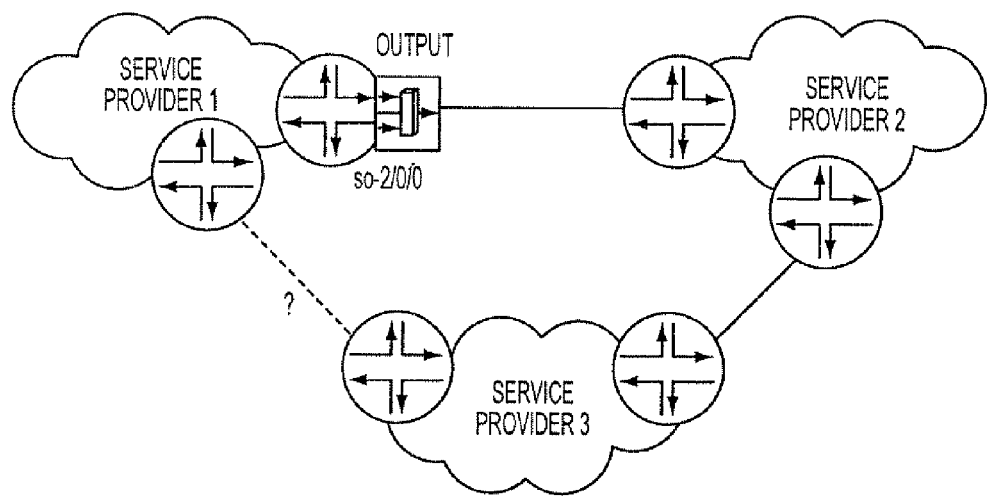
FIG. 24 is a schematic block diagram of an exemplary network configuration.

FIG. 24 shows a topology where Service Provider 1 uses packet sampling to determine if it should establish a direct peering relationship with Service Provider 3, rather than relying on Service Provider 2 to furnish transit service.

For this example, the filter provider-1-out is applied to the circuit between Service Provider 1 and Service Provider 2. The filter term sample-all-to-provider-2 samples all packets forwarded on this circuit. The syntax to define the filter and assign it to interface so/2/2/0 is as follows:

```
[edit firewall]
filter provider-1-out {
    .
    .
    .
    term sample-all-to-provider-2 {
        from
        {
            destination-address 0.0.0.0/0;
        }
        then {
            sample;
            accept;
        }
    }
    .
    .
    .
    term default-action
        then accept;
    }
}
[edit interfaces]
interfaces so-2/2/0 {
    unit 0 {
        family inet {
            filter {
                output provider-1-out;
            }
        }
    }
}
```

To specify a sampling rate of 1 in 1,000 packets and to direct the sampling output to the file provider-two-out.txt, the following syntax may be used:

```
[edit forwarding-options]
sampling
    input {
        family met rate 1000;
        rate 1000;
```

-continued

```
    }
  }
output
    file filename provider-two-out.txt;
  }
}
```

After the sampled data is collected, an off-line analysis toot can be used to examine the sample file and determine whether the volume of traffic flowing to Service Provider 3 merits a direct peering relationship between Service Provider 1 and Service Provider 3.

Sampling Example

Figure 25:
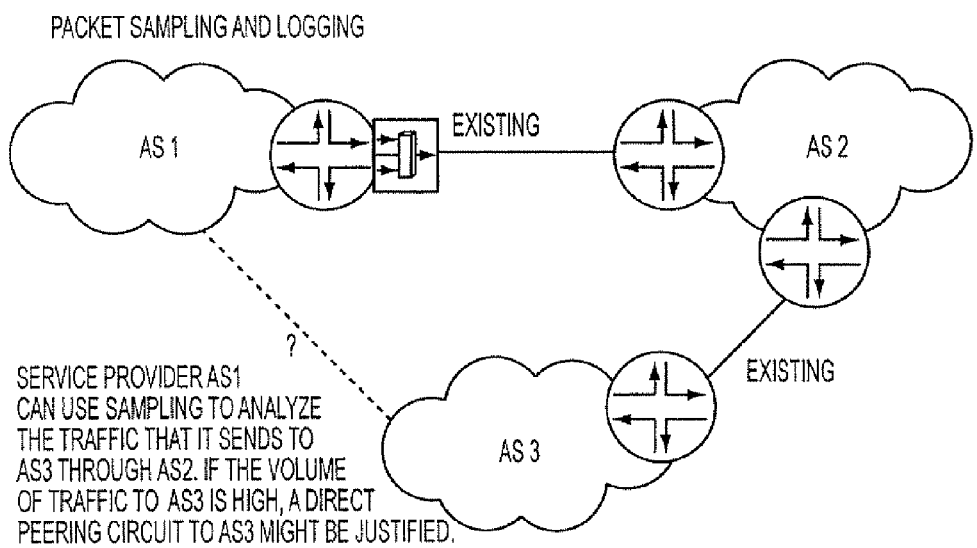
FIG. 25 is a schematic block diagram of an exemplary network configuration.

By combining this sampling capability with filtering, strategic traffic analysis can be performed. Example analyses include determining whether adding a direct peering circuit would improve efficiency and response time, and determining how much traffic from a specific source address is reaching a hosting site. An exemplary configuration is illustrated in FIG. 25.

Packet Counting

Packet counting operates in real time and at the highest priority. Packet counters are 100% accurate even when they run over OC-48c/STM-16 or OC192c/STM-64 interfaces. Even at these speeds, filters and counters can be customized to provide the information to effectively operate, maintain, and plan a network.

Counters run in the ASIC-based packet processor at wire speed and completely independent, from the CPU. The ASIC-based packet processor can be configured to run full time to track particular traffic types or to run part time to explore or track the state of the network.

Counting Example

Filters can be configured to target the exact nature of traffic on a network and, by counting different packets, provide visibility into the packet types that are traversing the system. For example, a filter can be configured that counts all packets sourced from a range of specific/24 IP address prefixes entering a network by way of a peering connection.

Real-Time Packet Counters

Packet counting provides a very powerful tool for characterizing traffic on service provider networks. Packet counters can be used to perform capacity planning and identify bottlenecks in the core of a network; determine the types of packets transiting or destined to the core and the relative ratio of one packet type to another (for example, the ratio of mail versus FTP packets); and analyze attacks on service provider or subscriber networks by counting packets for commonly used attacks (e.g., ICMP request response packets used in a smurf attack).

The ASIC-based packet processor supports realtime packet counters on all interfaces at speeds up to OC-192c/STM-64. The match conditions in a software filter term are used to determine which packets are counted. These terms may be applied to a single circuit or to a group of circuits and to either the input and/or output packet stream. Moreover, because these filters are implemented in an ASIC, permanent filters may be configured to gather historical data, identify traffic trends, determine the nature of an attack, or to analyze traffic without significantly impacting router forwarding performance.

Figure 26:
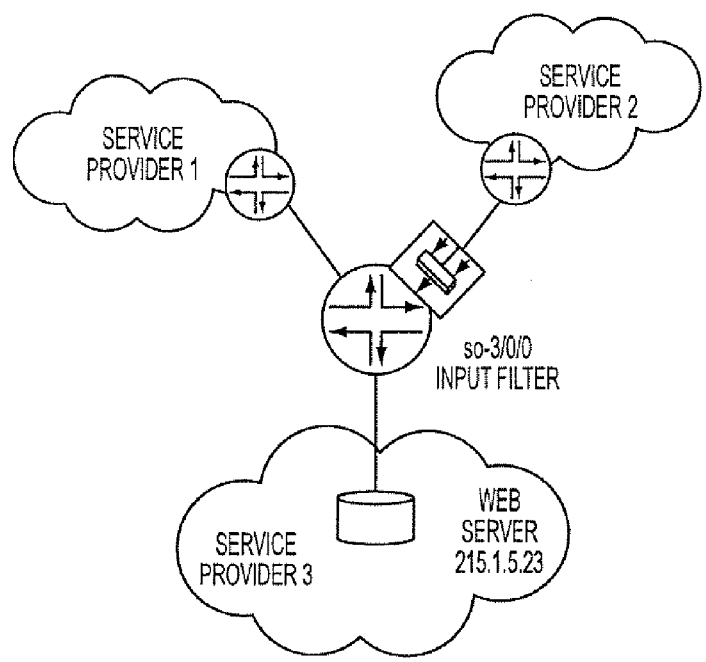
FIG. 26 is a schematic block diagram of an exemplary network configuration.

FIG. 26 shows a typical application where Service Provider 3 counts the number of HTTP packets that are received from Service Provider 2 and are addressed to the Web server (215.1.5.23). The pseudo code to implement this counter is as follows:

IF (destination address=Web Server) AND
(protocol TCP) AND
(destination port=HTTP)
THEN
COUNT http-to-web-server
ACCEPT
ENDIF The following syntax defines a filter term that implements the packet counting application specified by the pseudo code:

```
[edit firewall]
filter traffic-from-provider-2 {
    .
    .
    .
    term http-to-web-server
        from {
            source-address {
                0.0.0.0/0;
            }
            destination-address {
                215.1.5.23;
            }
            protocol tcp;
            destination-port http;
        }
        then {
            count http-to-web-server;
            accept;
        }
    }
    .
    .
    .
    term default-term {
        then accept;
    }
}
```

The filter is assigned to Interface so 3/0/0 using the following command syntax:

```
[edit interfaces]
interfaces so-3/0/0 {
    unit 0 {
```

-continued

```
        family inet {
            filter {
                input traffic-from-provider-2;
            }
        }
    }
}
```

A data collection program could be written to periodically access and archive the counter http-to-web-server. This data is useful for historical or trend analysis and to provide an alamn if a specific threshold value is exceeded over a period of time.

Real-Time Packet Logging

The ASIC-based packet processor allows logging to be performed in real time and at wire-rate speeds up to OC-192c/STM-64. At times, using this logging capability might be more appropriate than just counting packets. For instance, logging packets that meet certain criteria is a very powerful diagnostic tool for characterizing packet traffic in a service provider core network.

The ASIC-based packet processor can be configured with software to log packets that satisfy the match conditions specified in a filter term. The log is implemented as a buffer that can be viewed using the software command-line interface. The log entry for a packet includes the time it was logged, the input circuit, the protocol type, the source address, and the destination address.

Figure 27:
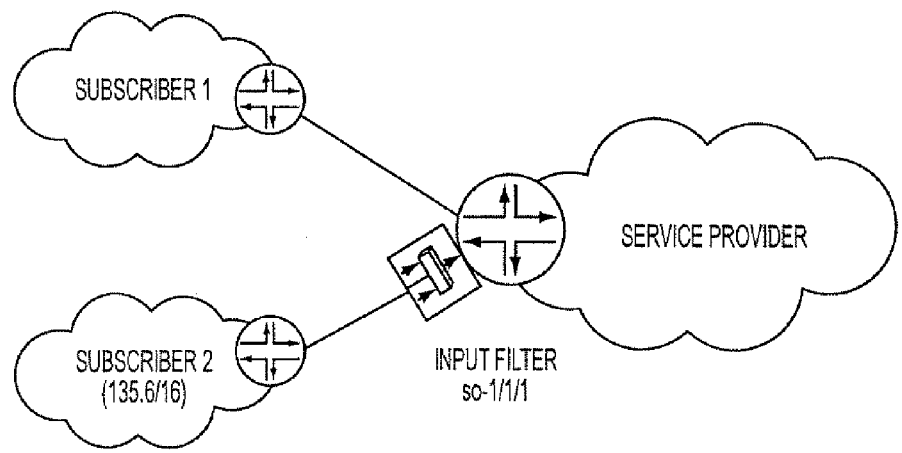
FIG. 27 is a schematic block diagram of an exemplary network configuration.

This example illustrates how the logging and counting capabilities can be used of the ASIC-based packet processor to support the creation of tools that permit quick and accurate determination of the magnitude of a wide range of network problems. Specifically, FIG. 27 shows how a packet filter can be used to identify traffic containing an unauthorized source address on the input circuit from Subscriber 2. The packets that match this filter term are counted, logged, and then silently discarded.

IF (source address < >subscriber's prefix)
THEN
COUNT unauth-src-addr-sub-2
LOG
DISCARD
ENDIF Assuming that the subscriber's source address prefix is 135.6/16, the software syntax to implement the log filter is as follows:

```
[edit firewall]
filter subscribor-2-ingress
    term sub-2-prefix-check
        from
            source-address
                0.0.0.0/0;
                135.6/16 except;
            }
        }
        then {
            count unauth-src-addr-sub-2
            log;
            discard;
        }
    }
    term default-action {
        then accept;
    }
}
```

To assign this filter to interface so-1/1/1, the software syntax is as follows:

```
[edit interfaces]
interfaces so-1/1/1 {
    unit 0 {
        family inet {
            filter
                input subscriber- 2-ingress;
        }
    }
}
```

A sample log generated by the execution of the subscriber-2-ingress filter is as follows:

| user@host> show firewall log | | | | |
|---|---|---|---|---|
| Time doc-log | Interface | Pro | Src address | Dest address |
| 03:09:07 - A | so-1/1/1 | ICM | 193.5.2.2 | 200.7.5.3 |
| 03:09:07 - A | so-1/1/1 | ICM | 193.5.2.3 | 200.7.5.3 |
| 03:09:07 - A | so-1/1/1 | ICM | 193.5.2.7 | 200.7.5.3 |
| 03:09:08 - A | so-1/1/1 | ICM | 193.5.2.8 | 200.7.5.3 |

These specific packets are logged because their source addresses are not included in the authorized prefix for the subscriber's network (135.6/16). This situation could indicate that some type of source address spoofing is occurring. Since the protocol is ICMP, the above packets could possibly be ICMP echo responses that are part of a smurf attack.

Load Balancing

On a router with parallel circuits, packets are evenly distributed across the circuits on a per-packet basis. The ASIC-based packet processor allows flows to be streamed onto each of the circuits so that packets that contain a particular source-destination/port-address pair are forwarded out the same physical interface. In other words, all packets from a particular flow are transmitted over the same circuit.

Load balancing has two primary benefits: providing extra bandwidth over parallel circuits or equal-cost paths, and reserving packet ordering so that user TCP sessions operate at peak efficiency. Maintaining packet order ensures that TCP implementations that support fast retransmit and fast recovery do not slow down because of packet misordering.

The ASIC-based packet processor manipulates the information contained in the packet header, assigning each packet hash value. This manipulation guarantees that all traffic with the same hash value is transmitted out the same interface and ensures that the packet order within a TCP flow is maintained.

Load Balancing Example

Figure 28:
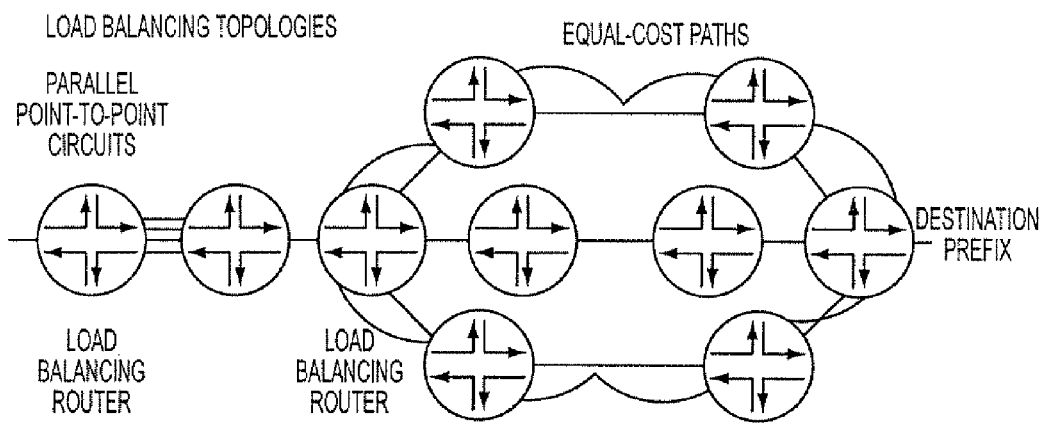
FIG. 28 is a schematic block diagram of an exemplary network configuration.

Load balancing is particularly useful for at least two topologies. Load balancing can be used across parallel, point-to-point circuits towards a destination. In this topology, load balancing is effective especially when moving up to the next step in the bandwidth hierarchy cannot be justified. Load balancing can be used across three equal-cost, multihop paths. Enabling load balancing allows the system to pick from a number of equal-cost paths and select the same path for the traffic belonging to each TCP session. An exemplary configuration is illustrated in FIG. 28.

Rate Limiting

Sustained congestion is a consequence of under-provisioned, statistically-multiplexed networks. When an access circuit is first provisioned, the subscriber and service provider agree on the average rate (and burstiness) of data transmission over the link. As long as the subscriber fulfills their part of the contract and transmits packets according to the service level agreement (SLA), the service provider attempts to deliver them in a timely manner. While timely delivery is not a requirement for traditional data applications, it is critical for emerging, real-time applications, such as VoIP and desktop conferencing that are intolerant of delay and jitter resulting from network congestion.

To support a diverse set of SLAs across all subscribers, it is critical that a service provider regulate traffic flows to protect the shared resources in the core of its network and ensure that each subscriber does not consume more than its fair share of bandwidth. To do this, service providers need tools that allow them to determine whether each subscriber is honoring their SLA and what actions should be taken if a subscriber attempts to inject out-of-profile traffic into the network.

There are two fundamental approaches to protecting the shared resources in the core of a service provider network: traffic shaping and traffic policing. Traffic shaping seeks to reduce the potential for network congestion by placing packets in a queue with a shaper at the head of the queue. These tools smooth out packet flows and regulate the rate and volume of traffic admitted to the network. There are two fundamental traffic-shaping, rate-limiting tools. A traffic-smoothing tool eliminates bursts and presents a steady stream of traffic to the network. This rate-limiting function is commonly implemented using a leaky bucket algorithm. A long-term average traffic rate-shaping tool permits bursts of a predetermined size and presents a burst-regulated stream of traffic to the network. This rate-limiting function is commonly implemented using a token bucket algorithm. Each of these tools supports different rate-limiting capabilities and results in output streams with different characteristics.

Traffic-Smoothing Tool Using a Leaky Bucket Algorithm

Figure 29:
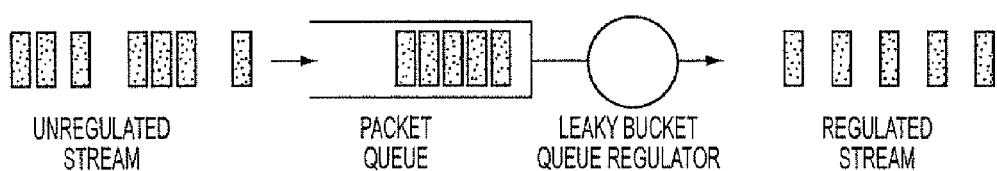
FIG. 29 illustrates an exemplary operation of a traffic shaping algorithm.

The leaky bucket rate-limiting algorithm turns a bursty stream of packets into a regular stream of equally spaced packets. FIG. 29 illustrates how the leaky bucket rate limiting algorithm operates. With the leaky bucket rate-limiting algorithm, an unregulated stream of packets is placed into a packet queue controlled by a leaky bucket queue regulator. If the flow presents more packets than the queue can store, the extra packets are discarded. When packets reach the head of the queue, they are forwarded into the network at a constant rate determined by the configuration of the queue regulator.

Leaky bucket rate-limiting tools can be used to manage the flow of data so that packets are not forwarded into the network at a rate greater than the network can or is willing to absorb. The length (or depth) of the packet queue bounds the amount of delay that a packet can incur at this traffic shaper in the end-to-end path. However, a packet can incur additional delay at downstream hops if the remainder of the network is not adequately provisioned to support the offered load.

Burst-Shaping Tool Using a Token Bucket Algorithm

Figure 30:
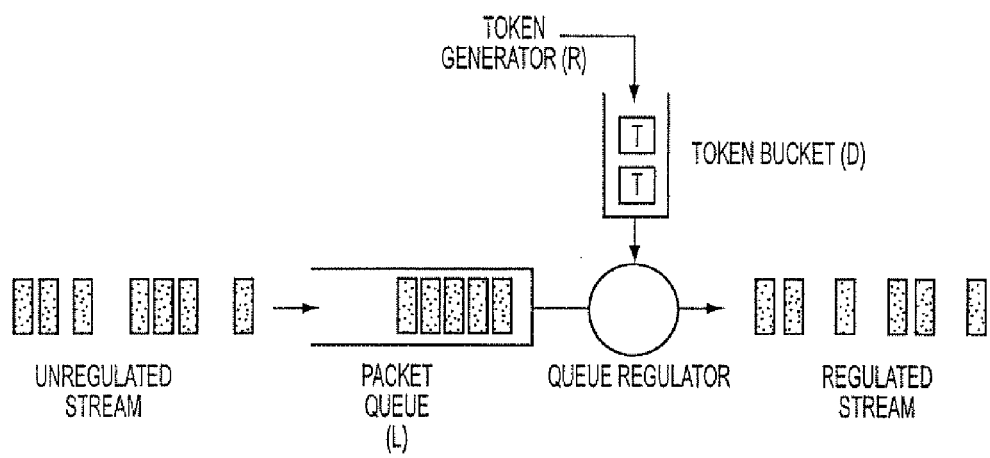
FIG. 30 illustrates an exemplary operation of a traffic shaping algorithm.

The token bucket rate-limiting algorithm enforces a long-term average transmission rate while permitting bounded bursts. In this approach, a token bucket is used to manage the queue regulator that controls the rate of packet flow into the network. FIG. 30 illustrates how the token bucket rate-limiting algorithm operates.

A token generator constantly produces tokens at a rate of R tokens per second and places them into a token bucket with a depth of D tokens. Assuming that each token grants the ability to transmit a fixed number of bytes, if the token bucket fills, newly generated tokens are discarded. At the same time, an unregulated stream of packets arrive and are placed into a packet queue that has a maximum length of L. If the flow delivers more packets than the queue can store, the excess packets are discarded.

The queue regulator has to consider a number of factors when deciding whether a packet of size P tokens can be forwarded into the network. If the token bucket is full, the packet is forwarded into the network and P token are removed from the bucket. If the token bucket is empty the packet waits at the head of the queue until P tokens are generated and placed in the bucket. When the bucket eventually contains P tokens, that many tokens are removed from the bucket and the packet is sent into the network. Finally assume that the token bucket is only partially full and contains T tokens. If P is less than or equal to T, P tokens are removed from the bucket and the packet is forwarded into the network. If P is greater than T, the packet must wait for the remaining P minus T tokens before it can be sent into the network. When the bucket contains the required P tokens, that many tokens are removed from the bucket and the packet is forwarded into the network.

Token bucket rate-limiting tools can used to regulate the long-term average transmission rate while still permitting bursts of a predetermined size. The rate of the token generator defines the long-term average traffic rate, the depth of the token bucket defines the maximum burst size that the shaper allows, and the length of the packet queue bounds the amount of delay that a packet can incur at this traffic shaper.

Traffic Policing

Traffic-policing tools allow subscriber traffic flows to be examined and packets that exceed SLAs to be either discarded or marked. The traffic-policing function uses a token bucket algorithm, but the packet queue is replaced with a packet discard or a packet marking function. If the policing function determines that a particular packet is in-profile, the packet is admitted to the network. If the policing function determines that the packet is out-of-profile, the packet is either dropped immediately (hard policing) or admitted to the network but marked as out-of-profile (soft policing).

Figure 31:
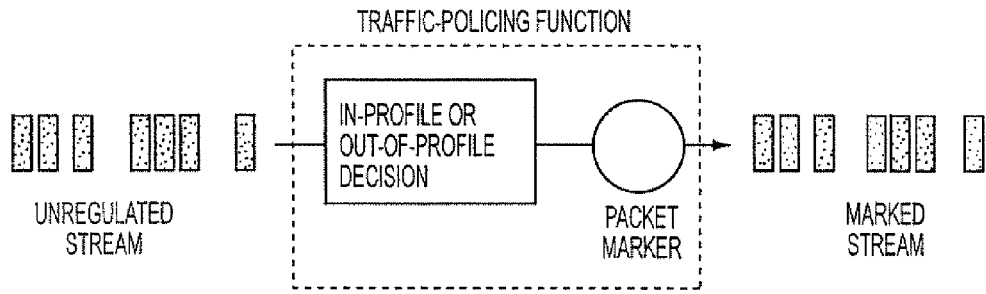
FIG. 31 illustrates exemplary soft traffic-policing function.

Marking out-of-profile traffic (FIG. 31) allows in-profile and out-of-profile packets to be handled differently at hops downstream from the router performing the traffic-policing function. For example, a traffic-policing access router can be configured to mark a packet by changing its drop precedence so that core routers give the packet an elevated discard precedence during periods of congestion while they continue to deliver in-profile traffic.

When using a traffic policer to mark packets, the policer should be configured to maintain packet ordering within a flow. Marking a packet by increasing its drop precedence simply raises the probability that a core router will drop the packet during periods of network congestion. Packet ordering is preserved because all packets in the flow are assigned to the same queue at each hop across the networks.

Marking a packet by assigning it to a different transmission queue based on the in-profile or out-of-profile decision of a traffic policer should be avoided. Separating a single traffic flow across multiple queues can result in packet reordering that can negatively impact the flow's throughput performance. The probability that packet reordering will occur is increased when the divided flow traverses multiple hops (with different queues at each hop) across the core of the network.

Rate limiting using traffic-shaping tools has demonstrated its value by precisely controlling the rate and volume of traffic as it enters the network, but these tools do not support dynamic feedback mechanisms that allow them to adapt to, and take advantage of, temporarily available capacity in the network core. Rate limiting using traffic-policing tools provides a more flexible approach than traffic shaping because it allows resource protection schemes to adapt to changing network conditions.

While hard traffic policing (packet dropping) is similar to traffic shaping, soft traffic policing (packet marking) is a fundamentally different approach. The ability to defer the decision to drop a packet to systems residing in the interior of the network allows traffic to be discarded only when congestion actually exists in the core of the network. During periods of abundant bandwidth, soft traffic policing allows service providers to deliver higher levels of service to all its subscribers, while still providing the ability to protect shared resources and meet subscriber SLAs during periods of scarce bandwidth.

Hard and Soft Traffic-Policing Applications

Figure 32:
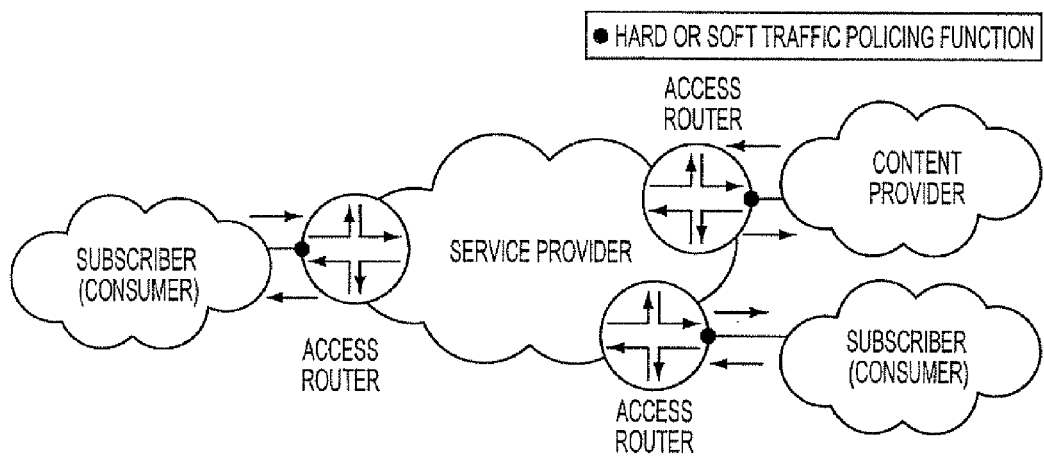
FIG. 32 is a schematic block diagram of an exemplary network configuration.

Hard and soft traffic-policing tools can be deployed at the edges of the network to deliver tiered subscriber services and protect shared resources. FIG. 32 illustrates how these tools can be used to limit the flow of subscriber traffic into the core of your network and manage outbound bandwidth to subscribers or other service providers.

Because of the fundamental nature of Internet applications, asymmetrical traffic flows are often required to be handled at the edges of the CPE network. For example, content consumers accessing the Web typically requires 10 times as much pull (download) bandwidth as push (upload) bandwidth. On the other hand, content providers need more push bandwidth than pull bandwidth. Traffic policing provides the tools to precisely control bandwidth and deliver tiered SLAs based on specific subscriber or application requirements.

Traffic policing can be used to provision a subrate access circuit over a T1 (or E1) interface. For example, traffic policers can be configured to support asymmetric traffic loads by offering 256 Kbps in the subscriber push direction and 512 Kbps in the subscriber pull direction. Traffic policing can be used on a logical interface to apply a single rate limit to all packets in the traffic stream. For example, traffic policing can be used to create a tiered VPN service based on the amount of bandwidth delivered to the subscriber's logical interface. Traffic policing can be used to rate-limit flows based on pet-class SLAs within a logical interface. For example, on a subscriber DS3 (45-Mbps) access circuit, 2 Mbps of traffic marked with a gold DiffServ Code Point value can be allowed, 5 Mbps of traffic marked with a silver DiffServ Code Point value, and an unlimited amount of traffic marked with a bronze DiffServ Code Point value. Traffic policing can be used to rate-limit flows based on a Layer 4 profile within a logical interface. For example, an unlimited amount of subscriber HTTP traffic can be allowed, but NNTP traffic to some bandwidth threshold can be rate limited. Traffic policing can be used to rate limit ICMP traffic to protect against denial-of-service (DoS) attacks. For example, a sniurf attack can result in a large number of ICMP Echo Reply packets being transmitted to the target of the attack, This can result in severe network congestion or outages. Traffic policing can be used in combination with other packet-filtering tools to protect network resources from these types of DoS attacks. Packet filtering (without rate limiting) can be used within a logical interface to queue traffic based on a Layer 4 profile. For example, SMTP traffic can be assigned to a low-priority queue and assign VoIP traffic to a high-priority queue.

When evaluating the appropriateness of deploying traffic-policing tools in different regions of a service provider network, a number of factors, for example, the granularity of the implementation's packet classification tools, may be considered. If traffic-policing mechanisms are fully integrated with fine-grained packet-filtering tools, precisely classifying and regulating traffic flows based on a detailed examination of packet headers should be considered. Another example is the performance impact of enabling traffic-policing features. If the traffic-policing function executes in hardware, a predictable impact on router forwarding performance can be expected. This allows traffic policing to be deployed in the network without the performance degradation usually associated with conventional software-based solutions.

Asic-Based Packet Processor: Hard and Soft Traffic Policing Operational Model

Figures 33, 34:
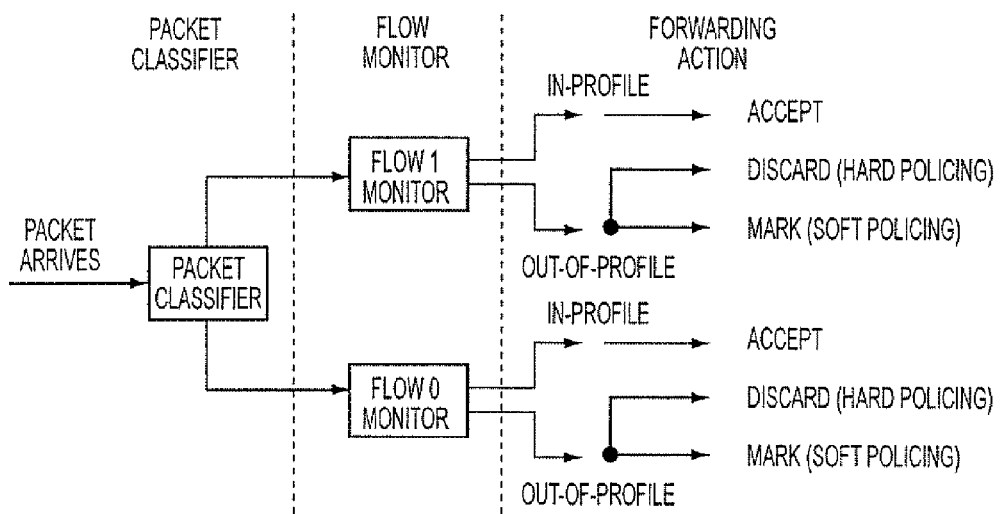
FIG. 33 illustrates an exemplary traffic policing operational model.
FIG. 34 shows an exemplary packet classification table.

The Layer 3 hard and soft traffic-policing tools supported by the ASIC-based packet processor perform their tasks using three distinct processing components (FIG. 33): Packet classifier, Flow monitor, and Forwarding action.

The packet classifier examines the packets in a stream of packets and divides them into policing equivalence classes (PECs). A PEC is a set of packets that is treated the same by the packet classifier. For example, consider a packet classifier that classifies based on a packet's IP destination address and DiffServ byte. For simplicity, assume that the packet classification table contains only the three rules shown in FIG. 34.

In this example, consider a pair of packets, Packet A and Packet B. Assume that Packet A has an IP destination address 192.100.5.13 and a Diffserv byte value of 101110. Assume that Packet B has an IP destination address 192.100.34.102 and a Diffserv byte value of 101110. Packet A and Packet B are in the same PEC (PEC 2) because they both match the classification table according to rule 2. Consider a third packet, Packet C, that has an IP destination address, 208.167.169.55, and a DiffServ byte value of 010100. Packet A and Packet C are not in the same PEC, because Packet A matches rule 2 and Packet C matches rule 1. Rule 0 is the default rule which matches each packet that does not match any other rule in the packet classification table.

The flow monitor maintains state concerning the limits on the load that a given PEC can place on the network. The flow monitor tracks two critical parameters for each PEC, the average bandwidth and the maximum burst size. The values configured for each of these limits can be different for each PEC. The flow monitor for each PEC performs accounting operations on each packet to determine whether a packet is in-profile or out-of-profile.

The forwarding action for each packet assigned to a PEC depends on whether the packet is in-profile or out-of-profile. If the packet is in-profile, it is simply accepted and forwarded without being affected by the rate limiter or traffic policer. If the packet is out-of-profile, it can be either discarded or marked. A packet is marked by setting the PLP bit in the packet notification record to cause it to be processed differently by the packet processing engines downstream from the traffic policing function. The term downstream can refer to either a process in the local router or a subsequent router in the packet's path across the network.

ASIC-Based Packet Processor: Traffic-Policing Configuration EXAMPLES

Figure 35:
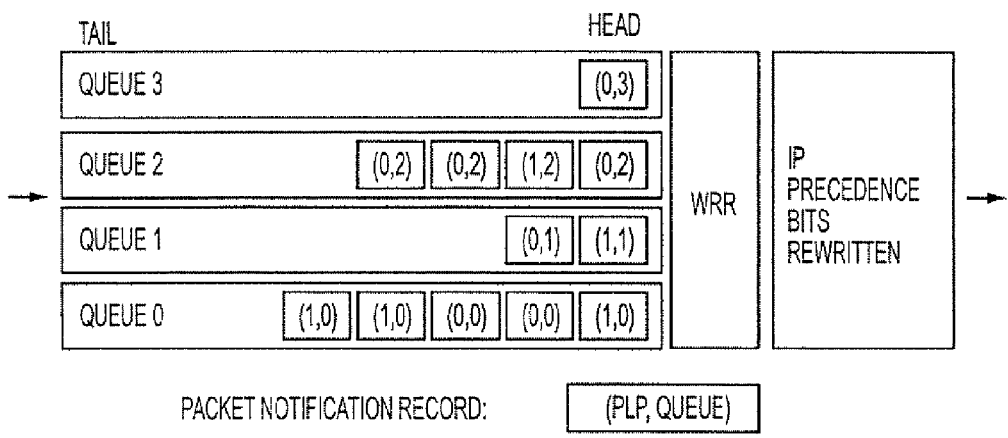
FIG. 35 shows an exemplary packet notification record.

Each traffic stream has up to four output transmission queues, numbered 0 through 3, with each queue receiving a configured percentage of the stream's available queue buffer size (FIG. 35). A router determines the output queue for each packet by reading the value of the two queue priority bits (00, 01, 10, 11) carried in the packet notification record.

While the WRR algorithm services the output queues, a RED algorithm constantly monitors each queue for congestion. If a packet is out of profile, the RED algorithm can use a more aggressive drop probability than if the packet is in-profile. A router determines whether each packet is in-profile (PLP=0) or out-of-profile (PLP=1) by reading the packet loss priority (PLP) bit carried in the packet notification record.

Finally, a router executing the policing function can be configured to write the PLP bit to cause the local router to select a specific RED drop profile. Additionally, the router executing the policing function can be configured to rewrite the RED drop priority bit in the IP precedence bits before transmitting the packet. By rewriting the IFP precedence bits before transmitting a packet, the policing router can instruct downstream routers to use a specific RED drop profile when it is queues marked packets.

Specifying the Traffic Policer

Traffic policing allows the amount of traffic that passes into or out of a router interface to be limited. Two types of limits to packets in a PEC can be applied: bandwidth limit, which defines the average number of bits permitted per second, and burst size limit, which defines the total number of bytes per second over and above the bandwidth limit allowed in a burst.

The general format for specifying a traffic policer is given by the following syntax:

```
policer sample-policer {
    if-exceeding
        bandwidth-limit value;
        burst-size-limit value;
    }
    then {
        /* Execute if and only if (iff) traffic is out of profile */
    }
}
```

The unit for the bandwidth-limit is expressed in bits per second (bps), while the unit for the burst-size-limit is expressed in bytes. The suffixes k, m, and g can be used to denote multipliers of one thousand (kilo), one million (mega), and one billion (giga), respectively, For example, suppose it is desirable to specify a traffic policer with a bandwidth limit of 20 megabits per second (Mbps) and a burst size limit of 125 kilobytes (KB). This can be achieved with the following configuration:

```
policer sample-policer {
    if-exceeding C
        bandwidth-limit 20m;
        burst-size-limit 125k;
    }
    then {
        /* Execute iff traffic is out of profile */
    }
}
```

The possible actions for a traffic policer when the packet is out-of-profile are to either discard the packet or mark the packet. When marking a packet, the PLP bit can be written to select the RED drop profile for a packet. The PLP bit can have a value of 0 or 1. For example, to discard an out-of-profile packet, the following configuration can be used:

```
policer sample-policer {
    if-exceeding {
        bandwidth-limit 20m;
```

```
            burst-size-limit 125k;
        }
        then {
            discard;
        }
    }
```

To accept an out-of-profile packet and set the PLP bit to 1, the following configuration can be used:

```
    policer sample-policer {
        if-exceeding {
            bandwidth-limit 20m;
            burst-size-limit 125k;
        }
        then {
            plp 1;
            accept;
        }
    }
```

It is not necessary to explicitly configure a counter for out-of-profile packets in the then clause of a traffic policer specification. The software automatically maintains out-of-profile statistics for each policer specification.

Example: Rate Limiting Using a Coarse-Grained Hard Traffic Policer

This example illustrates how you can use a coarse-grained, hard traffic-policing filter to deliver rate-limited services at an interface granularity. For example, hard traffic policing can used to provision a 256-kbps subscriber access service on a TI (or E1) circuit. When the subscriber desires to increase its bandwidth to 512 Kbps, the hard traffic policing configuration parameters can simply be changed to grant additional bandwidth to the subscriber.

Performing rate limiting using Layer 3 hard traffic policing rather than conventional Layer 1 DSU configuration simplifies service creation, operation, and support. Coordinating the reconfiguration of layer 1 DSUs at both ends of the access circuit is difficult and time consuming. In many cases, doing this requires extremely close coordination between the service provider that delivers the IP service and the carrier that provides the access circuit. Also, until the DSUs at both ends of the access circuit are reconfigured, the circuit cannot become operational. Increasing subscriber bandwidth requires only the reconfiguration of the traffic policer on the provider access router, rather than the complexity and expense of reconfiguring multiple devices. Unlike the traditional DSU configuration model, rate limiting using Layer 3 traffic policing does not have to be symmetrical. A traffic policer with a specific rate limit for traffic flowing from the subscriber into the network can be configured. A traffic policer with a differentiate limit for traffic flowing from the network to the subscriber can also be configured.

Figure 36:
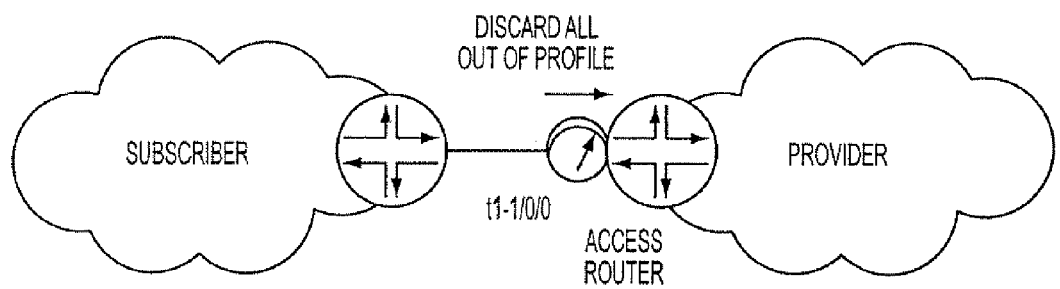
FIG. 36 is a schematic block diagram of an exemplary network configuration.

The filter in this example delivers a substrate service by implementing a hard traffic policer for all packets arriving at interface t1-1/0/0 of the provider access router (see FIG. 36). If the policer determines that a subscriber packet is out-of-profile, the packet is discarded. If the policer determines that a packet is in-profile, the packet is counted and accepted.

This example illustrates a number of details about the configuration and operation of packet filters that invoke the traffic-policing function. Once a policer is specified, it can be referenced in the then clause of a filter term. The standard actions permitted in the then clause of a filter term (such as accept, discard, count, and log) are also permitted in the then clause of a policer specification. The traffic policer is applied to each packet that matches a filter term before the other actions in the then clause of the filter term are executed. If the policer determines that a packet is out-of-profile, the actions in the then clause of the policer specification term are executed and those in the then clause of the filter term that invoked the policing function are not executed. If the policer determines that a packet is in-profile, the actions in the then clause of the of the filter term that invoked the policing function are executed, and those in the then clause of the policer specification term are not executed.

The following configuration specifies the coarse-grained, hard traffic-policing filter:

```
filter coarse-hard-policer {
    policer monitor-subscriber {        /* Specify policer */
        if-exceeding {,
            bandwidth-limit 256k;       /* Bandwidth limitations */
            burst-size-limit 2k;
        }
        then {                          /* Execute iff out of profile */
            discard;                    /* Discard out of profile */
        }
    }
    term rate-limit-subscriber {        /* Match all traffic */
        then {
            policer monitor-subscriber; /* Invoke policer */
            count in-profile;           /* Count in profile */
            accept;                     /* Accept in profile */
        }
    }
}
```

The following configuration assigns this filter to input interface t1-1/0/0 on the provider access router:

```
    interfaces t1-1/0/0 {
        unit 0 {
            family inet {
                filter {
                    input coarse-hard-policer;
                }
            }
        }
    }
```

The policer specification monitor-subscriber defines the parameters for the traffic policer, specifying a bandwidth limit of 256 kbps and a burst size of 2 KB. If a filter term invokes monitor-subscriber and the policer determines that the packet is out-of-profile, the packet is silently discarded.

The filter term rate-limit-subscriber matches all packets in the traffic stream because the filter term does not contain a from clause. If the policer monitor-subscriber determines that a matching packet is out-of-profile, the packet is silently discarded. If the policer determines that a matching packet is in-profile, the counter in-profile is incremented and the packet is accepted.

Example: Rate Limiting Using a Fine-Grained Hard Traffic Policer

Figure 37:
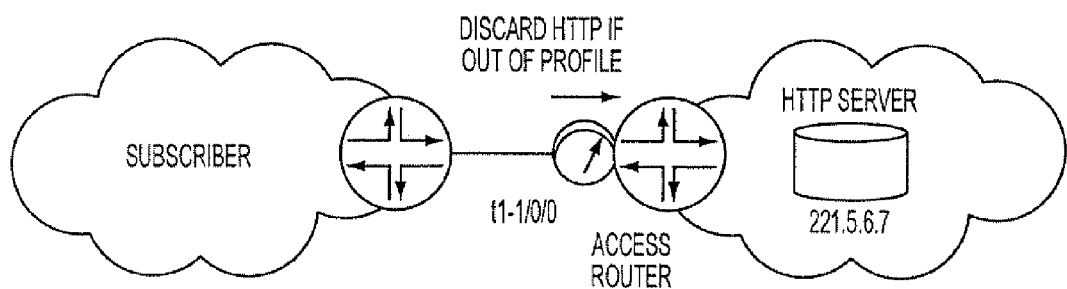
FIG. 37 is a schematic block diagram of an exemplary network configuration.

This example illustrates how a fine-grained, hard traffic-policing filter can be used to rate limit a specific subscriber application. The filter in this example polices all HTTP traffic that arrives at provider access router interface t1-1/0/0 and is addressed to server 221.5.6.7 (see FIG. 37). If the policer determines that the packet is out-of-profile, the packet is discarded. If the policer determines that the packet is in-profile, the packet is counted and accepted.

The following configuration specifies the fine-grained, hard traffic-policing filter:

```
filter fine-hard-policer {
    policer monitor-http {              /* Specify policer */
        if-exceeding {,
            bandwidth-limit 155k;       /* Bandwidth limitations */
            burst-size-limit 1k;
        }
        then {                          /* Execute iff out of profile */
            discard;                    /* Discard out of profile */
        }
    }
    term rate-limit-http {              /* Police all HTTP to server */
        then {
            policer monitor-subscriber; /* Invoke policer */
            count in-profile;           /* Count in profile */
            accept;                     /* Accept in profile */
        }
    }
    term default-action {               /* Accept all traffic not */
        then accept;                    /* matching a filter term */
    }
}
```

The policer specification monitor-http defines the parameters for the traffic policer, specifying a bandwidth limit of 155 kbps and a burst size of 1 KB. If a filter invokes monitor-http and the policer determines that the packet is out-of-profile, the packet is silently discarded. The filter term rate-limit-http-server examines all packets in the stream and matches those addressed to the HTTP server. If the policer monitor-to-http determines that a matching packet is out-of-profile, the packet is silently discarded. If the policer determines that a matching packet is in-profile, the counter http-in-profile is incremented and the packet is accepted. The filter term default-action accepts all packets that do not match the packet classification conditions of the rate-limit-http-server filter term.

Example: Rate Limiting Using a Fine-Grained Soft Traffic Policer

Rate-limiting subscriber traffic can be achieved by deploying hard traffic-policing filters that simply drops out-of-profile packets. Rate-limiting subscriber traffic may be achieved by deploying fine-grained, soft traffic-policing filters that defer the drop decision to downstream routers by marking the RED drop profile for specific packets. To control the behavior of downstream routers in the core of the network, any changes made to the packet notification record by a rate-limiting, traffic-policing filter should be rewritten to the IP precedence bits before the packet is transmitted into the core of the network.

This example describes how to rate-limit subscriber traffic using a soft traffic-policing filter within the context of a single service queue and marking packets with either a low or a high priority RED drop profile. The primary benefit of this approach is that it does not require the management complexity of enabling DiffServ on all systems across the network. Although DiffServ will play an increasingly important role as the Internet continues to mature, service providers are still trying to understand how to best market, deploy, bill, operate, inter-network, and perform capacity planning for Diffserv networks.

IP Precedence Rewrite Configuration

Figure 38:
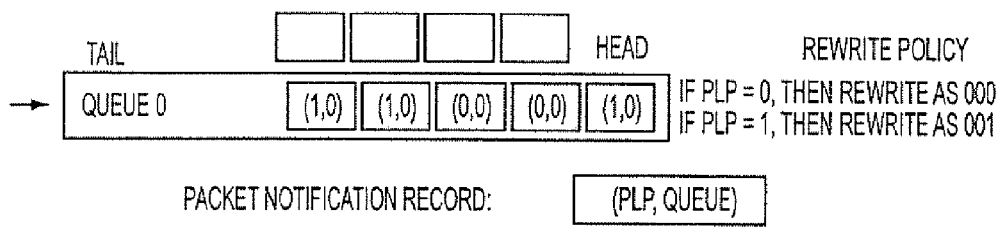
FIG. 38 shows an exemplary packet notification record.

Before examining the soft traffic-policing filter, consider how the software may allow an access router to be configured to rewrite the IP precedence bits before a packet is transmitted to the next-hop router. This is accomplished by configuring CoS to specify exactly how the bits are rewritten when the packet notification record is removed from the output queue and the referenced packet is reassembled from the shared memory architecture. FIG. 38 illustrates the following CoS configuration that rewrites the IP precedence bits and assigns the new configuration to output interface so-6/0/0:

```
class-of-service {
    output {
        interfaces {
            so-6/0/0 {
                unit 0 {
                    precedence-rewrite {
                        output-queue 0 {
                            plp-clear rewrite-bits 000;
                            plp-set rewrite-bits 001;
                        {
                        }
                    }
                }
            }
        }
    }
}
```

The default configuration for a router is to support a single queue, queue 0, on each output interface. If the PLP bit in the packet notification record removed from queue 0 is cleared to 0, the IP precedence bits in the referenced packet are rewritten to 000. These bits inform downstream routers that the packet should be assigned to queue 0 with the PLP bit cleared to 0. If the PLP bit in the packet notification record removed from queue 0 is set to 1, the IP precedence bits in the referenced packet are rewritten to 001. These bits inform downstream routers that the packet should be assigned to queue 0 with the PLP bit set to 1.

Figure 39:
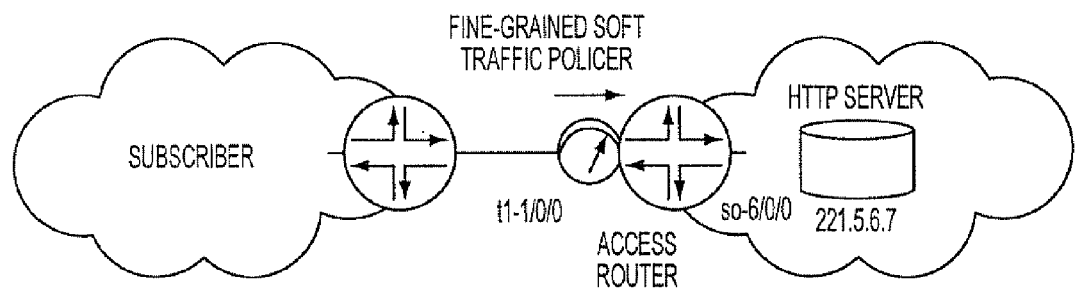
FIG. 39 is a schematic block diagram of an exemplary network configuration.

The filter in this example polices all HTTP traffic that arrives at provider access router interface t1-1/0/0 and is addressed to server 221.5.6.7 (see FIG. 39). If the policer determines that the packet is out-of-profile, the IP precedence bits are rewritten so downstream routers give it a higher priority RED drop profile. If the policer determines that the packet is in-profile, the IP precedence bits are rewritten so downstream routers give the packet a lower priority RED drop profile.

Assume that a provider access router has the following configuration:

```
interfaces t1-1/0/0 {                   /* Assign filter to input interface */
    unit 0 {
        family inet {
            filter {
                input sample-rewrite;
            }
        }
```

-continued

```
            }
        }
    }
}
class-of-service {                              /* Define IP precedence rewrite */
    output {
        interfaces {
            so-6/0/0 {
                unit 0 {
                    precedence-rewrite {
                        output-queue 0 {
                            plp-clear rewrite-bits 000;    /* If PLP=0 */
                            plp-set rewrite-bits 001;      /* If PLP=1 */
                        {
                        }
                    }
                }
            }
        }
    }
}
filter sample-rewrite {
    policer monitor-http {                      /* Specify policer */
        if-exceeding {
            bandwidth-limit 155k;               /* Bandwidth limitations */
            burst-size-limit 1k;
        }
        then {                                  /* Execute iff out of profile */
            plp 1; /* If out of profile, PLP =1 */
            accept; /* Accept out of profile */
        }
    }
    term police-to-http-server {                /* Police HTTP traffic */
        from {
            destination-address 221.5.6.7;
            protocol tcp;
            destination-port http;
        }
        then {
            policer monitor-http;               /* Invoke policer */
            plp 0;                              /* If in profile, PLP = 0 */
            accept;                             /* Accept in profile */
        }
    }
    term default-action {                       /* Accept all traffic not */
        then accept;                            /* matching a filter term */
    }
}
```

The interfaces t1-1/0/0 statement assigns the sample-rewrite packet filter to input interface t1-1/0/0. The class-of-service precedence-rewrite statements specify how the IP precedence hits are to be rewritten before a packet is transmitted on interface so-6/0/0 to the next-hop router. For a packet notification record emerging from the head of queue 0 with a PLP=0, the configuration causes the IP precedence bits in the referenced packet to be rewritten to 000 (queue=0, PLP=0). For a packet notification record emerging from the head of queue 0 with a PLP=1, the configuration causes the IP precedence bits in the referenced packet to be rewritten to 001 (queue=0, PLP=1).

The sample-rewrite filter classifies and appropriately marks packets based on packet header fields. The policer specification monitor-http defines the parameters for the traffic policer, specifying a bandwidth limit of 155 kbps and a burst size of 1 KB. If a filter term invokes monitor-http and the policer determines that the packet is out-of-profile, the PLP bit is set to 1 and the packet is accepted.

The filter term, police-to-http-server, examines all packets in the stream and identifies the packets addressed to the HTTP server. If the policer monitor-http determines that the matching packet is out-of-profile, the PLP bit is set to 1 and the packet is accepted. When the packet notification record for the out-of-profile packet is removed from queue 0, the referenced packet has its IP precedence bits rewritten to 001 before it is transmitted to the next-hop router. If the policer determines that the matching packet is in-profile, the PLP bit is cleared to 0 and the packet is accepted. When the packet notification record for the in-profile packet is removed from queue 0, the referenced packet has its IP precedence bits rewritten to 000 before it is transmitted to the next hop-router.

The filter term, default-action, accepts all packets that do not match the packet classification conditions of the term, police-to-http-server, and allows them to be accepted by the packet filter.

This example includes steps to configure a soft traffic policer on a router deployed at the edge of the network. The traffic policer rewrites the drop priority bit in then precedence bits to communicate the in-profile or out-of-profile decision made at the access router to downstream routers in the core of the network.

Example: Queue Selection Using a Fine-Grained Packet Filter

Figure 40:
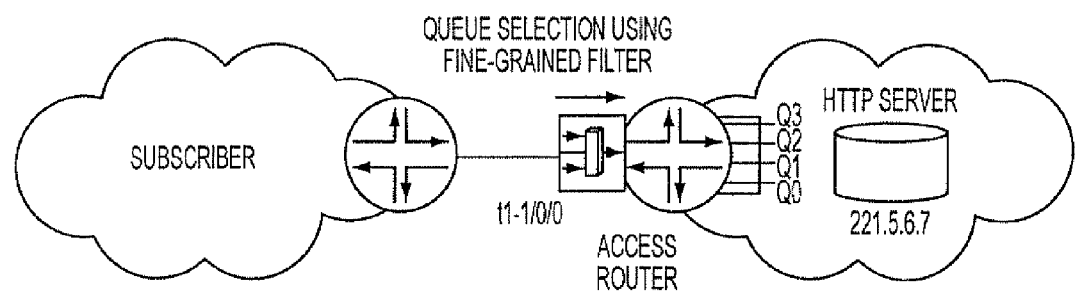
FIG. 40 is a schematic block diagram of an exemplary network configuration.

Packets may be assigned to an output transmission queue based on an examination of packet header fields. The filter in this example identifies all HTTP packets that arrive on provider access router interface t1-1/0/0 and are addressed to server 221.5.6.7. If a packet matches the filter, the packet is assigned to output queue 1 (FIG. 40).

The following configuration specifies the fine-grained, packet classification filter:

```
filter sample-filter {
    term queue-http {                   /* Queue HTTP traffic */
        from {
            destination-address 221.5.6.7;
            protocol tcp;
            destination-port http;
        }
        then {
            output-queue 1;             /* Assign all HTTP to Queue 1 */
            accept;                     /* Accept HTTP packets */
        }
    }
    term default-action {               /* Accept all traffic not */
        then accept;                    /* matching a filter term */
    }
}
```

The filter term, queue-http examines all packets in the traffic stream. If the packet is HTTP and addressed to server 221.5.6.7, the queue priority bits in the packet notification records are set to 1, causing the packet to be assigned to queue 1 on the output interface. The filter term, default-action, accepts all packets that do not match the filter term queue-http and allows them to be accepted by the filter.

This filter does not cause packet reordering because all HTTP packets matching the filter conditions are assigned to queue 1 in the local router. However, the configuration in this example is incomplete because the configuration does not rewrite the queue priority bits in the IP precedence bits to communicate the queue selection to downstream routers in the core of the network. To complete this configuration, one needs to configure multiple queues on the access router, configure CoS to rewrite the IP precedence bits on the output interface of the access router, and configure core routers to read the IP precedence bits and assign packets to the proper output transmission queue.

Other embodiments are within the scope of the following claims.

What is claimed is:

1. A method performed by one or more devices, the method comprising:
   filtering, by the one or more devices, received packets based on a filter rule associated with the received packets;
   marking, for sampling, by the one or more devices, a first one of the received packets by setting a bit in a packet notification when the first received packet matches the filter rule; and
   sampling, by the one or more devices, the marked packet based on a randomly generated number associated with the marked packet.

2. The method of claim 1, where the sampling is performed based on a comparison of the randomly generated number to a predetermined threshold.

3. The method of claim 1, where the received packets include header information comprising at least one of: a source Internet protocol (IP) address, a destination IP address, an IP type, a source port, a destination port, a differentiated service (DiffServ) byte, an IP fragmentation offset field, an IP fragmentation control field, or a transmission control protocol (TCP) control bit, and where the filtering is based on the header information.

4. The method of claim 1, further comprising at least one of:
   accepting the marked packet;
   discarding the marked packet; or
   rejecting the marked packet and transmitting an Internet control message protocol (ICMP) message.

5. The method of claim 1, where the filtering comprises accepting an unmarked packet when the unmarked packet is not rejected based on the filter rule.

6. The method of claim 1, further comprising:
   writing header information associated with the sampled packet to a routing engine of the one or more devices.

7. The method of claim 1, further comprising at least one of:
   monitoring all logical interfaces associated with the one or more devices;
   monitoring designated logical interfaces associated with the one or more devices;
   monitoring designated protocols associated with the received packets;
   monitoring a range of addresses associated with the received packets; or
   monitoring individual addresses associated with the received packets.

8. The method of claim 1, where the filtering identifies at least one of respective destinations of the received packets, a volume of the received packets, or respective contents of the received packets.

9. The method of claim 1, further comprising:
   logging the marked packet, a log entry associated with the logged packet being accessible for display via an interface associated with the one or more devices, the log entry including at least one of a log time, an input circuit, a protocol type, a source address, or a destination address.

10. The method of claim 1, where the filtering comprises performing source address verification to prevent source address spoofing of a network operation center system.

11. The method of claim 1, further comprising:
    load balancing the received packets.

12. The method of claim 11, where the load balancing comprises forwarding received packets associated with a designated source port or a designated source address to a designated destination port or a designated destination address.

13. The method of claim 12, where the forwarding the received packets comprises maintaining an order and a travel path for a TCP session associated with the forwarded packets.

14. A method performed by one or more devices, comprising:
    randomly sampling, by the one or more devices, received packets based on a predetermined sampling rate of 1/n, where n is a specified integer;
    comparing, by the one or more devices, the predetermined sampling rate to a randomly generated number to form a resulting value; and
    performing, by the one or more devices, the random sampling based on the resulting value.

15. A system comprising one or more devices to:
    accept a packet, when the packet is not rejected by a filter, when a filtering criterion is satisfied, by setting a bit in a packet notification; and
    mark the accepted packet for sampling when a randomly generated number is less than a predetermined value.

16. The system of claim 15, where the one or more devices are further to:
    discard the packet when the packet contains a spoofed network operation center source address.

* * * * *

UNITED STATES PATENT AND TRADEMARK OFFICE
CERTIFICATE OF CORRECTION

| | | |
|---|---|---|
| PATENT NO. | : 7,688,727 B1 | |
| APPLICATION NO. | : 11/614583 | |
| DATED | : March 30, 2010 | |
| INVENTOR(S) | : Dennis C. Ferguson et al. | |

It is certified that error appears in the above-identified patent and that said Letters Patent is hereby corrected as shown below:

On the Title Page Item [60]
Related U.S. Application Data should spell: "Continuation of Application No. 10/017,719, filed on Dec. 14, 2001, now Patent No. 7,215,637, which is a continuation-in-part of Application No. 09/550,413, filed on Apr. 17, 2000, now patent 6,798,777; and claims benefit of provisional Application No. 60/258,882, filed Jan. 2, 2001, provisional Application No. 60/258,886 filed Jan. 2, 2001, provisional Application No. 60/258,887 filed Jan. 2, 2001, and provisional Application No. 60/258,888 filed Jan. 2, 2001."

Signed and Sealed this

Nineteenth Day of October, 2010

David J. Kappos
*Director of the United States Patent and Trademark Office*